United States Patent [19]

Ninomiya

[11] 4,165,524
[45] Aug. 21, 1979

[54] VELOCITY ERROR CONTROL APPARATUS

[75] Inventor: Takeshi Ninomiya, Chiba, Japan

[73] Assignee: Sony Corporation, Tokyo, Japan

[21] Appl. No.: 911,286

[22] Filed: May 31, 1978

[30] Foreign Application Priority Data

May 31, 1977 [JP] Japan .................................. 52/63727

[51] Int. Cl.$^2$ ............................................. H04N 5/78
[52] U.S. Cl. ............................................. 360/36; 358/8
[58] Field of Search ..................... 360/36, 26; 358/8

[56] References Cited

U.S. PATENT DOCUMENTS

| | | | |
|---|---|---|---|
| 3,994,013 | 11/1976 | Lemoine et al. | 360/36 X |
| 4,053,926 | 10/1977 | Lemoine et al. | 360/36 X |
| 4,054,903 | 10/1977 | Ninomiya | 360/36 X |
| 4,054,921 | 10/1977 | Tatami | 360/36 X |
| 4,069,499 | 1/1978 | Ninomiya | 360/36 X |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

Velocity error control apparatus for use in a video signal time base corrector of the type including a main memory having addressable storage locations for storing successive lines of video signals, write-in circuitry including a write-in clock signal generator synchronized with time base errors in the video signal for writing successive lines of video signals into addressed storage locations at a write-in clock signal rate, and read-out circuitry including a controllable read-out clock signal generator for reading out successive lines of video signals from addressed storage locations at a substantially constant read-out clock rate. The velocity error control apparatus includes a velocity error detector for detecting velocity errors in successive lines of the video signals which are written into the main memory. A velocity error store has a plurality of storage locations, each being operative to store a velocity error signal representing the velocity error of an associated line of video signals, and a velocity error read-out circuit reads out the velocity error signal from the velocity error store, which velocity error signal is associated with a line of video signals when the associated line of video signals is read out from the main memory. A modifying circuit modifies the read out velocity error signal as a function of at least one velocity error signal which is associated with at least one adjacent line of video signals. The modified velocity error signal is used to modulate the read-out clock signals so as to compensate for the velocity errors in successive lines of video signals.

11 Claims, 73 Drawing Figures

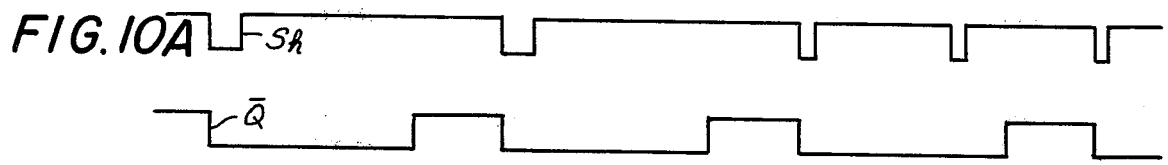
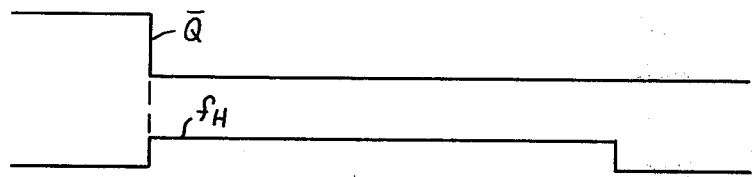
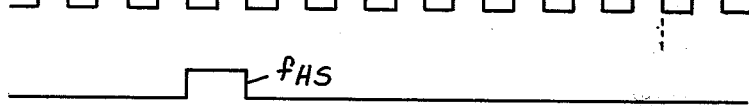

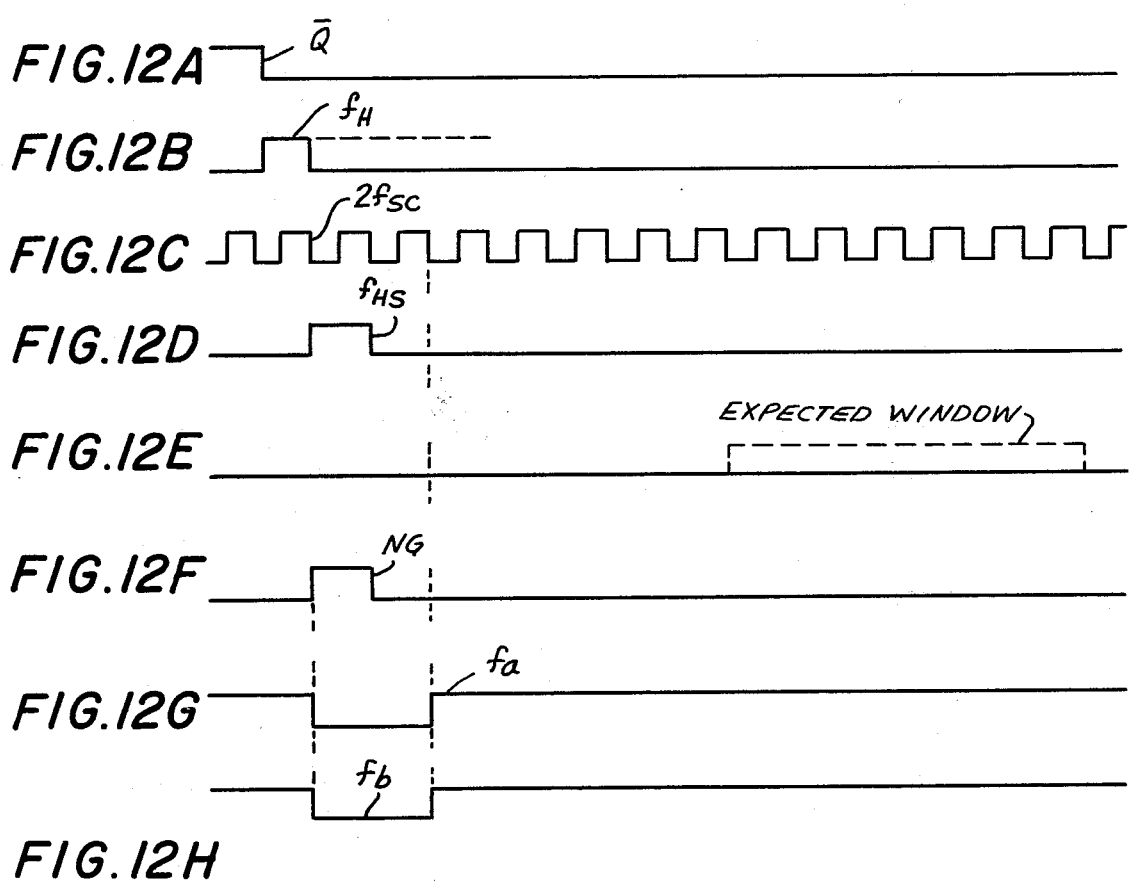

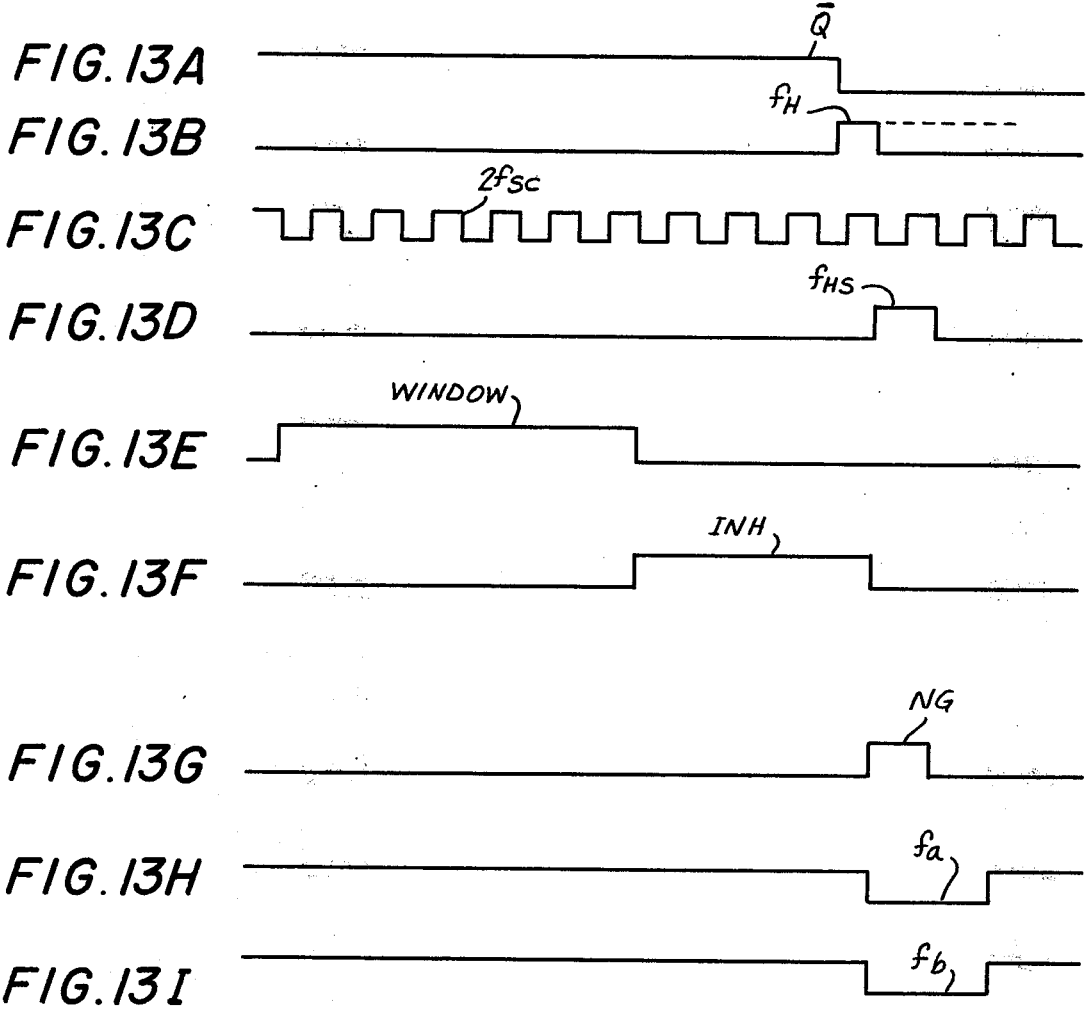

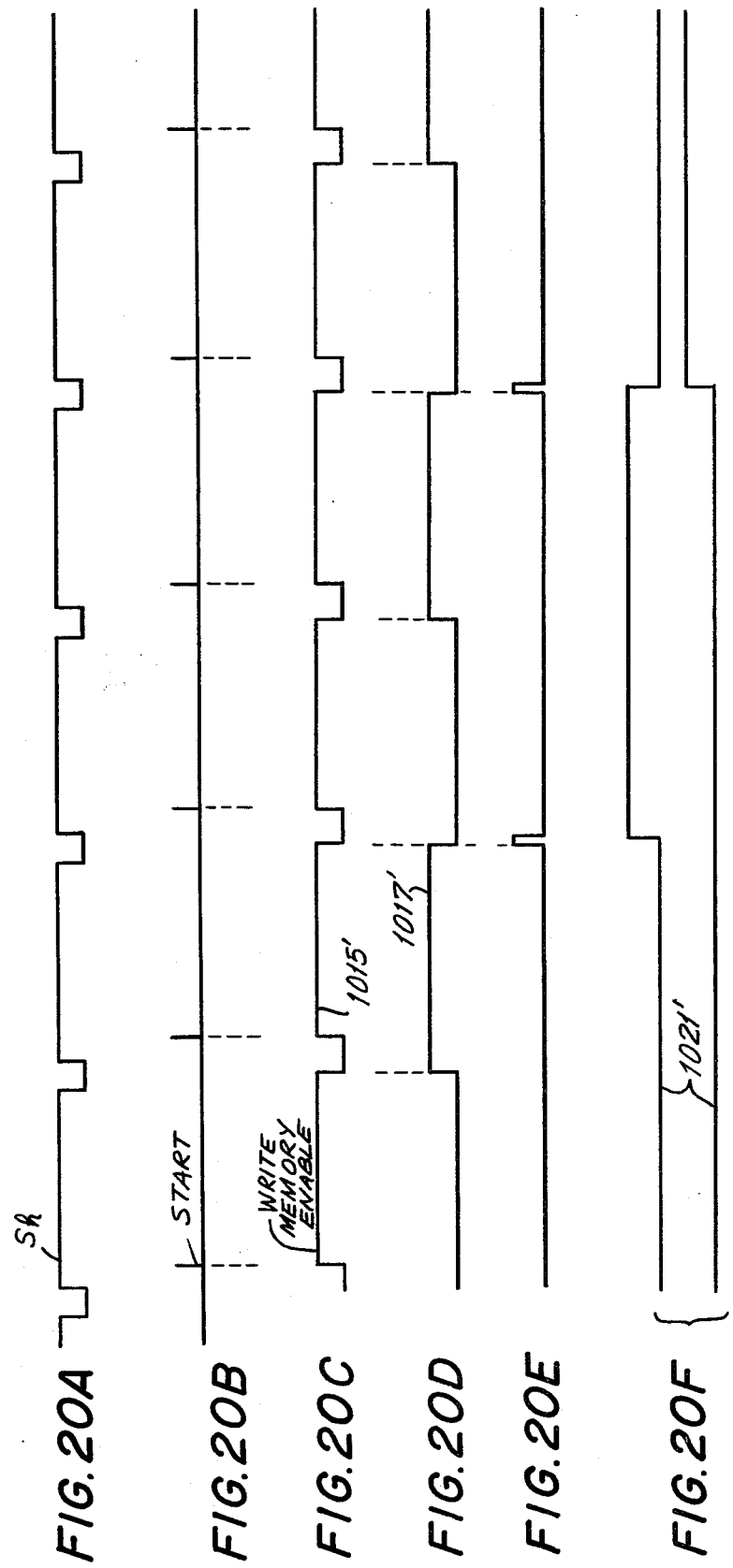

VELOCITY ERROR CONTROL APPARATUS

BACKGROUND OF THE INVENTION

This invention relates to velocity error control apparatus and, more particularly, to such apparatus which is used in a time base corrector for video signals, wherein velocity errors which are included in a video signal that is read out from a video signal reproducing device, such as a video tape recorder (VTR) are effectively eliminated.

When video signals are recorded on a magnetic medium, such as magnetic tape by a VTR, time base, or frequency and/or phase errors may be introduced into the video signals during playback because of various factors. For example, the record medium may expand or contract after the video signals have been recorded thereon. Also, the speed with which the record medium is transported in the playback device may differ slightly from its speed during recording. Similarly, there may be a slight variation between the rotary speed at which the heads scan the record medium during signal recording and during signal playback. All of these possible variations result in time base errors which appears as undesired effects in the ultimately reproduced video picture. These observable effects are perceived as jitter, brightness distortion, improper color display, and the like. If the video signal which is played back from, for example, a VTR, is to be used in connection with the transmission of a television broadcast, it is important that these time base errors be corrected.

One example of a time base corrector for use with video signals is described in U.S. Pat. No. 3,860,952. In this time base corrector, incoming video signals are converted from analog form into digital form and are temporarily stored in a digital memory. The digitized video signals are written into the memory at a write-in clock rate which varies in accordance with detected time base errors. However, the stored, digitized video signals are read out at a standard, fixed read-out clock rate, whereby the read out video signals are generally free of significant time base errors. Then, the read out digitized video signals are reconverted back into analog form. However, this time base corrector does not take velocity errors into account.

The velocity error of a video signal is the time base error which may exist over a substantial portion of a horizontal line interval, which error is not detected until the completion of that line interval and, thus, is not taken into account, or corrected, during that line interval. That is, in typical time base error correcting systems, the write-in clock signal has its frequency synchronized with the actual horizontal synchronizing pulse which is included in the played back video signal, and its phase is synchronized with the phase of the burst signal which also is included in the played back video signal. In accordance with the NTSC standard for television signals, both the horizontal synchronizing pulse and the burst signal are provided at the beginning of a horizontal line interval. Consequently, the synchronizing of the write-in clock signals to the incoming horizontal synchronizing pulse and to the incoming burst signal necessarily is achieved at the beginning of the horizontal line interval. Of course, if there is a time base error, or velocity error, in the video information portion of the horizontal line interval, there will be a phase shift between the write-in clock signals and the video signals. Since the digitized video signals are read out from the memory in the time base corrector at a standard, fixed read-out clock rate, the aforementioned phase shift during the write-in operation is not compensated during the read-out operation because of the use of such a fixed read-out clock rate. Consequently, the resultant video signal which is read out from the memory in the time base corrector may include velocity errors which are not compensated.

In copending application Ser. No. 817,662, assigned to the assignee of the present invention, a time base corrector is disclosed which includes a velocity error detector and a velocity error correcting circuit. The velocity error is detected by comparing the phase of the write clock pulses, that is, the clock pulses which are used to write the digitized video signal into the memory of the time base corrector, to the phase of the burst signals which are played back from the VTR. Any phase differential therebetween represents the shift in phase during a horizontal line interval of the played back video signal. This phase shift representation is the velocity error and is stored in a velocity error memory device at a storage location corresponding to the storage location in the memory at which the line of video signals which includes such velocity error is stored. When the stored line of video signals is read out from the memory at the constant read-out rate, the velocity error which is associated with that line of video signals also is read out of the velocity error memory. This read out velocity error signal is integrated over a line interval so as to represent a linearly changing velocity error over that line interval. The integrated velocity error signal then is used to phase modulate the read-out clock pulses, whereby the line of video signals are read out of the memory at a phase-modulated rate. It is assumed that this phase modulation of the read-out clock pulses is a close approximation of the velocity error which had been included in that line of video signals originally; and, therefore, compensates for this velocity error.

However, in the aforementioned copending application, the velocity error in the incoming line of video signals is assumed to vary linearly throughout the entire line interval. That is, the velocity error is assumed to increase gradually from a zero error at the beginning of the line interval to a maximum error at the end of that line interval. In actuality, it is believed that the velocity error does not vary in this linear manner. Although the linear approximation will, in most instances, be a sufficient approximation so as to compensate for velocity error, and thus minimize distortion in the ultimately reproduced video picture, a more accurate approximation of the actual velocity error is desired.

Another example of a time base corrector including velocity error compensating circuitry is described in U.S. Pat. No. 4,065,787. In this patent, the velocity error signal is determined by subtracting the difference between the control voltage which is applied to a voltage-controlled oscillator in the write-in clock generator phase-lock loop when one line of video signals is received from the control voltage which had been applied to the voltage-controlled oscillator when the preceding line was received. This difference is stored in a velocity error memory location corresponding to the location in the memory at which the presently received line of video signals is stored, and is read out when that line of video signals also is read out. Here too, the read out velocity error signal is integrated so as to approximate the actual velocity error as a linear function. Accordingly, this linear approximation of the velocity error in U.S. Pat. No. 4,065,787 is less accurate than desired.

A similar velocity error compensating arrangement is described in the paper "Digital Time Base Correction" by Kitson, Fletcher and Spencer, International Broadcasting Convention Technical Paper, September 1974. This arrangement also suffers from the disadvantage in that the velocity error is approximated by a linear function, which is not a highly accurate approximation.

OBJECTS OF THE INVENTION

Therefore, it is an object of the present invention to provide an improved velocity error compensating arrangement for use in a time base corrector.

Another object of this invention is to provide velocity error compensation in a time base error corrector, wherein the actual velocity error function is closely approximated by a non-linear velocity error signal.

A further object of this invention is to provide a time base error corrector including velocity error compensating apparatus wherein the magnitude of the velocity error which exists at the end of a line of video signals is modified to form a non-linear velocity error function.

An additional object of this invention is to provide improved velocity error compensating apparatus for use in a time base error corrector wherein a non-linear velocity error function is approximated by dividing a line interval into plural sections and by obtaining the velocity error function for each section by interpolating between velocity error levels which are associated with adjacent sections.

Yet another object of this invention is to provide improved velocity error compensating apparatus for use in a time base error corrector wherein a line of video signals is divided into three sections and wherein the velocity error function of the central section is approximated by the time base error which is associated with that line, the velocity error function of the beginning section is approximated by the average of the time base error associated with that line and the velocity error associated with the immediately preceding line, and the velocity error of the end section is approximated by averaging the velocity error of that line and the velocity error of the next succeeding line.

Various other objects, advantages and features of the present invention will become readily apparent from the ensuing detailed description, and the novel features will be particularly pointed out in the appended claims.

SUMMARY OF THE INVENTION

In accordance with the present invention, velocity error control apparatus is provided for a video signal time base corrector. The time base corrector is of the type which includes a main memory having addressable storage locations for storing successive lines of video signals, write-in circuitry including a write-in clock signal generator synchronized with time base errors in the video signal for writing successive lines of video signals into addressed storage locations at a write-in clock rate, and read-out circuitry including a controllable read-out clock signal generator for reading out successive lines of video signals from addressed storage locations at a substantially constant read-out clock rate. The velocity error control apparatus includes a velocity error detector for detecting velocity errors in successive lines of the video signals which are written into the main memory. A velocity error store has a plurality of storage locations, each being operative to store a signal representing the velocity error of an associated line of video signals, and a velocity error read-out circuit for reading out from the velocity error store the velocity error signal which is associated with the line of video signals which then is read out of the main memory. A modifying circuit modifies the read out velocity error signal as a function of at least one velocity error signal associated with at least one adjacent line of video signals. The modified velocity error signal modulates the read-out clock signals so as to compensate for the velocity errors in successive lines of video signals.

BRIEF DESCRIPTION OF THE DRAWINGS

The following detailed description, given by way of example, will best be understood in conjunction with the accompanying drawings in which:

FIGS. 10A-10B are waveform diagrams which are useful in understanding the operation of a portion of the circuit shown in FIG. 9;

FIGS. 11A-11I are timing diagrams which are helpful in understanding the operation of the circuit shown in FIG. 9;

FIGS. 12A-12H are timing diagrams which are helpful in understanding one type of operation of the circuit shown in FIG. 9;

FIGS. 13A-13I are timing diagrams which are helpful in understanding another operation of the circuit shown in FIG. 9;

FIGS. 20A–20F are timing waveforms which are useful in understanding the operation of a portion of the illustrated control circuit.

DETAILED DESCRIPTION OF A PREFERRED EMBODIMENT

Figure 1:
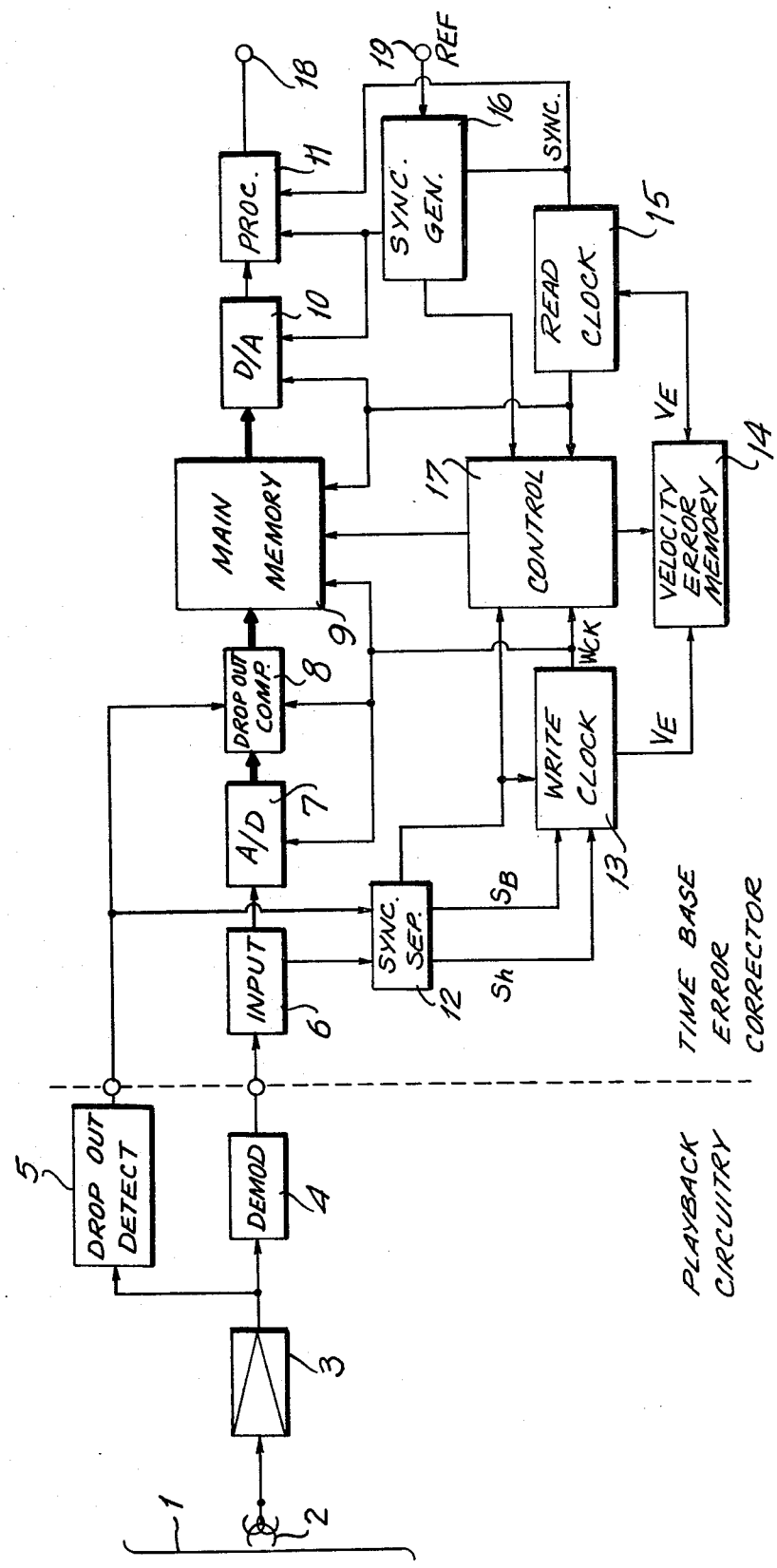
FIG. 1 is a block diagram of a time base error corrector with which the velocity error compensating apparatus of the present invention can be used.

Referring now to the drawings, and in particular to FIG. 1, there is illustrated a block diagram of one embodiment of time base error correcting apparatus with which the present invention can be used and, more particularly, such time base error correcting apparatus for use in a video recorder/playback device, such as a VTR. Only portions of the playback circuitry of the VTR are illustrated; and a magnetic tape 1 is shown as being scanned by a head 2, the head preferably being of the rotary-scan type which scans skewed tracks across tape 1. Head 2, which reproduces the video signals which had been recorded on tape 1, is connected via an amplifier 3 to a demodulator 4. The VTR with which the time base error correcting apparatus is used preferably is of the broadcast-quality type and, therefore, may be the so-called FM direct recorder or the so-called heterodyne recorder. In the FM direct recorder, a composite color video signal, for example, of the NTSC type, is recorded in frequency modulation format. In order to receover this frequency modulated color video signal, demodulator 4 is a compatible FM demodulator. The output of this demodulator thus would be a conventional NTSC color video signal $S_v$. In the heterodyne recorder, an original composite color video signal is separated into its luminance and chrominance components and, during recording, the luminance component is used to frequency modulate a carrier while the chrominance component is frequency converted down to a much lower frequency range. The FM luminance signal and frequency-converted chrominance signals then are combined and recorded. Hence, in the heterodyne type of VTR, demodulator 4 includes compatible luminance and chrominance channels whereby the FM luminance signal is demodulated and the chrominance component is frequency reconverted back to its original frequency band. Then, the demodulated luminance and recovered chrominance components are combined so as to re-form the NTSC color video signal $S_v$.

Amplifier 3 of the VTR, in addition to being coupled to demodulator 4, is coupled to a drop-out detector 5. The drop-out detector is a conventional circuit which is adapted to detect drop-outs in the signal which is reproduced from tape 1. As is known, a drop-out is the absence of a signal which may be due to an imperfection in the tape or some interference which is present during signal reproduction. In any event, drop-out detector 5 is adapted to produce a suitable signal which represents the presence of drop-out in the reproduced video signal.

Although the playback circuitry of the VTR has been described as being capable of reproducing a composite color video signal which had been recorded on tape 1, it should be appreciated that this circuitry also is well-adapted to reproduce a monochrome, or black-and-white, video signal from the tape.

Demodulator 4 and drop-out detector 5 in the VTR are connected to the time base error correcting apparatus. In the illustrated embodiment, the time base error correcting apparatus includes an input stage 6, an analog-to-digital (A/D) converter 7, a drop-out compensator 8, a main memory 9, a digital-to-analog (D/A) converter 10 and an output processing stage 11. In addition, the illustrated apparatus includes a synchronizing separator 12, a write clock generator 13, a read clock generator 15 and a synchronizing signal generator 16. Furthermore, the time base error correcting apparatus is provided with a control unit 17 and a velocity error memory 14. Input stage 6 is coupled to demodulator 4 and is adapted to establish a proper amplitude level for the video signal $S_v$ applied thereto and, in addition, to provide a time or phase adjustment in the video signal to account for certain inherent phase delays in the control signal circuitry, to be described. Furthermore, input stage 6 serves to limit the frequency band of the video signals passed therethrough so as to eliminate unwanted higher frequencies and thereby remove noise. One output of the input stage is coupled to synchronizing separator 12, and another output of the input stage is coupled to A/D converter 7.

The A/D converter is adapted to digitize the analog video signal which passes through input stage 6. To this effect, A/D converter 7 includes a sample-and-hold circuit for sampling the analog video signal, and a digitizing circuit for converting each sample to a multi-bit digital word. As an example, each line interval, or horizontal line, hereafter referred to merely as a line of video signals, is sampled 640 times, and each sample is converted into an 8-bit word. Thus, $8 \times 640$ bits are produced during each line. As shown, write clock generator 13 is coupled to A/D converter 7 for supplying sampling and digitizing clock signals thereto.

The output of A/D converter 7, which comprises successive 8-bit words, is coupled to drop-out compensator 8. The drop-out compensator includes an additional input coupled to drop-out detector 5. The purpose of the drop-out compensator is to replace a digitized sample of the dropped-out portion of a video signal with an approximate digitized sample or, in the event that drop-out affects the reproduced color burst signal in the composite color video signal, an entire line of video signals is replaced with an approximate replica. As will be described in greater detail below, drop-out compensator 8 includes a memory circuit having a two-line storage capacity which stores each a line of digitized video signals as that line is written into main memory 9. As the next line of video signals is written into the memory, a corresponding element of the second preceding line (i.e., two lines ago) is furnished from the drop-out memory circuit in the event that a drop-out is detected. That is, drop-out compensator 8 is adapted to replace individual picture elements in a line with the corresponding picture elements of the second line in the event that such picture elements are dropped out. Also, drop-out compensator 8 is adapted to replace an entire line of video signals with the second preceding line in the event that drop-out is detected in the burst signal of the incoming line. A clock input of drop-out compensator 8 is coupled to write clock generator 13 to receive write clock signals therefrom.

Main memory 9 is comprised of a plurality of memory units, each being adapted to store at least one line of video signals therein. The memory units are addressed successively so that successive lines of video signals can be written therein and, concurrently, the memory units also are addressed successively such that the stored lines of video signals are read out. Main memory 9 is coupled to drop-out compensator 8 to receive the digitized video signals, including drop-out compensated signals, and also is coupled to write clock generator 13 and to read clock generator 15 to receive the write clock and read clock signals therefrom, respectively.

While a line of video signals is written into one memory unit, the line of video signals which are stored in another memory unit are read out therefrom. Thus, although video signals are concurrently written into and read out of main memory 9, the very same memory unit is not addressed concurrently for the simultaneous writing and reading of video signals. To this effect, control unit 17 monitors the write-in and read-out operations to insure that a common memory unit is not addressed to have video signals written in and read out therefrom at the same time, and thus to avoid obliterating a line of video signals.

It may be appreciated that if the video signals are written into main memory 9 at a write clock rate which is synchronized with the time base errors which may be present in the video signals played back from the VTR, then such time base errors are substantially removed from the video signals. That is, frequency and/or phase shifts which may be present in the incoming video signal are taken into account when such video signals are written into the main memory. Then, if the stored, digitized video signals are read out of main memory 9 at a substantially constant, fixed read clock rate, then proper video signals are read out, such video signals being substantially free of time base errors. Thus, the purpose of main memory 9 is to serve as a buffer memory for retiming the played back video signals. This re-timing serves to eliminate the time base errors therefrom.

The output of main memory 9 is coupled to D/A converter 10, the latter circuit functioning to reconvert the digitized video signals back into an analog signal. The D/A converter also is adapted to establish a proper pedestal and synchronizing signal level to the reconverted analog video signal. Hence, D/A converter 10 is coupled to read clock 15 and, in addition, to synchronizing signal generator 16 so as to be synchronized with the read clock signals which are used to read out the digitized video signals from main memory 9; and with the blanking signals which are inserted into the reconverted analog video signal. The output of D/A converter 10 is coupled to output processing stage 11, this stage also being coupled to synchronizing signal generator 16. The purpose of the output processing stage is to reinsert a proper burst signal into the reconverted video signal, and also to insert the usual horizontal and vertical synchronizing signals, as well as the equalizing signals into this video signal. Furthermore, in the event that the VTR with which the time base error correcting apparatus is used in operated in a special mode, for example, in a slow motion mode, a still mode or a fast mode, output processing stage 11 is adapted to insure that the reproduced video signal, and particularly the chrominance component thereof, and the inserted burst signal are in the proper phase relation. An embodiment of output processing stage 11 is described in greater detail below.

Synchronizing separator 12, which is coupled to input stage 6 and to drop-out detector 5, is adapted to separate the horizontal synchronizing signal, the burst signal and the vertical synchronizing signal from the incoming video signal which is supplied thereto by the VTR. To this effect, the synchronizing separator is adapted to clamp the incoming video signal to a predetermined clamping level and then, once the video signal is so clamped, to detect the horizontal synchronizing signal. This detected horizontal synchronizing signal then is supplied to write clock generator 13 and, in addition, to a burst signal detector which is included within synchronizing separator 12. The burst signal detector is adapted to detect the burst signal included in the incoming video signal, and to supply this burst signal also to the write clock generator.

Write clock generator 13, described in greater detail below, is adapted to generate a write clock signal which is synchronized with the horizontal synchronizing signal and with the burst signal which are separated from the incoming video signal by snchronizing separator 12. To this effect, the write clock generator includes an automatic frequency control (AFC) circuit and an automatic phase control (APC) circuit. The AFC circuit functions to generate a write clock signal of a relatively high repetition rate, synchronized to the incoming horizontal synchronizing signal. The APC circuit functions to synchronize the phase of the write clock signal with the incoming burst signal. With this frequency and phase control over the write clock signal, the digitized incoming video signal is written into main memory 9 at a proper rate whereby time base errors in the incoming video signal are removed.

Write clock generator 13 also is adapted to detect the velocity error $V_E$ included in the incoming video signal. The velocity error represents the amount of phase error that is present between the write clock signal and the video signal at the end of a line interval. That is, and as will be described in greater detail below, since the write clock signal is synchronized in frequency and phase with the horizontal and burst signals, and since the horizontal and burst signals occur only at the beginning of a line interval, then it is possible that if a time base error exists throughout an entire line interval, the phase of the video signal at the end of that line interval may not be identical to the phase thereof at the beginning of that line interval. Hence, since the phase of the video signal may drift, or differ, from the burst signal which is furnished at the beginning of that line interval, it follows that the phase of the video signal at the end of the line interval may differ from the write clock signal which had been synchronized with the burst signal. The velocity error $V_E$ is an indication of this phase differential. This velocity error $V_E$ is supplied to and stored in velocity error memory 14.

Read clock generator 15 is coupled to synchronizing signal generator 16 and is adapted to generate read clock signals at a substantially constant rate. These read clock signals are, of course, used to read out the digitized video signals from main memory 9 and to control D/A converter 10 for reconverting the read out digitized video signals into analog form. In addition, the velocity error $V_E$ which is stored in velocity error memory 14 is supplied to read clock generator 15 for modulating the phase of the read clock signals as a function of the velocity error. In this manner, velocity errors which may be present in the digitized video signals that are stored in main memory 9 are compensated by the phase modulated read clock signals which are used to read out the stored, digitized video signals. That is, velocity errors which may be present in the video signals that are written into the main memory are compensated by reading such video signals out of the main memory in accordance with such velocity errors. As will be described in greater detail below, a velocity error signals is produced that is a close approximation of an actual velocity error. That is, the produced velocity error signal closely approximates a non-linear velocity error which is present in the incoming video signal. It is this non-linear velocity error signal which is used to memory units and, preferably, four such units, each being adapted to store two lines of video signals. While one memory unit is addressed for the writing in of digitized video signals, another unit is addressed for reading out the video signals which had been stored therein. Thus, a write-in operation can be carried out simultaneously with a read-out operation. However, control unit 17 prevents a common memory unit from being simultaneously addressed for both a write-in and a read-out operation. Each digitized sample is written into main memory 9 under the control of a write clock pulse WCK which, it is recognized, is synchronized to the horizontal synchronizing pulse and burst signal included in the incoming video signal. Thus, the digitized video samples are written into the main memory in synchronism with the time base errors which may be present in the video signals which are reproduced from tape 1. After a full line of video signals is stored in main memory 9, the memory unit in which such line is stored will be addressed, and the stored, digitized video samples are read out at the read clock rate. Since the video signals are written into the main memory in synchronism with the time base errors, but are read out therefrom at a substantially constant, fixed rate, the read out video signals are free of time base errors.

The read out digitized video signals are reconverted back to analog form by D/A converter 10; and the recovered analog video signals are supplied to output processing stage 11 wherein the usual horizontal and vertical synchronizing pulses, equalizing pulses and burst signals are reinserted. Thus, the reconstituted video signal, which now is free of time base errors, is supplied to output terminal 18.

Although the write clock pulses WCK are synchronized with the separated horizontal synchronizing pulse $S_h$ and the separated burst signal $S_B$, a velocity error still may be present in the digitized video signals which are written into main memory 9. It is recalled that this velocity error is equal to the phase shift of the video signals at the end of a line interval relative to the phase of the video signals at the beginning of that line interval. Since the horizontal synchronizing pulse and the burst signal occur at the beginning of a line interval, write clock pulses WCK are properly synchronized to the video signals only at the beginning of that line interval. The phase of the video signals may change throughout the remainder of the line interval, but the phase of the write clock pulses WCK will remain fixed. Of course, the amount of phase variation which occurs throughout a complete line interval is ascertained by comparing the phase of the write clock pulses WCK with the phase of the burst signal $S_B$ at the beginning of the next line interval. This phase differential represents the amount of which the phase of the video signals has varied from the beginning of the preceding line interval. It is this phase differential which is used as an indication of velocity error; and write clock generator 13 produces a velocity error signal $V_E$ which is a function of this phase differential. The velocity error signal $V_E$ is stored in velocity error memory 14. The velocity error memory includes a plurality of storage locations, each storage location being associated with a line of video signals. Thus, after a line of video signals is stored in main memory 9, the velocity error signal $V_E$ associated with that line is stored in a storage location in velocity error memory 14 which corresponds to the storage location in the main memory into which the associated line of video signals had been written. Control unit 17 determines the correct storage location in the velocity error memory and determines when the velocity error signal $V_E$ should be written therein.

When a line of video signals is read out main memory 9, the associated velocity error signal $V_E$ is read out of the corresponding storage location in velocity error memory 14. As will be explained in greater detail below, when the first portion of a line of video signals, for example, when a first portion of line N, is read out of the main memory, the velocity error signal $V_E$ associated with line N is read out of the velocity error memory. Then, when the next half portion of line N is read out of the main memory, the velocity error signal associated with the next succeeding line $N+1$ is read out of the velocity error memory. These velocity error signals, together with a sample of the velocity error signal which is associated with the preceding line $N-1$, all are combined to form a modified velocity error signal. This modified velocity error signal appears as an interpolated velocity error signal and varies in a non-linear manner which closely approximates the actual non-linear variation of the velocity error associated with the incoming line of video signals. This modified velocity error signal is utilized in read clock generator 15 to phase modulate the read clock pulses in a manner which compensates the original velocity errors which accompanied the incoming video signals. Thus, the video signals which are stored in main memory 9 are read out therefrom at a rate which is phase modulated in accordance with a cloe approximation of the velocity error which was included in the line of video signals which had been written into the main memory. This eliminates the effects of velocity errors in the original, incoming video signals.

Various ones of the elements shown in FIG. 1 by respective blocks now will be described in greater detail.

INPUT STAGE 6

Figure 2:
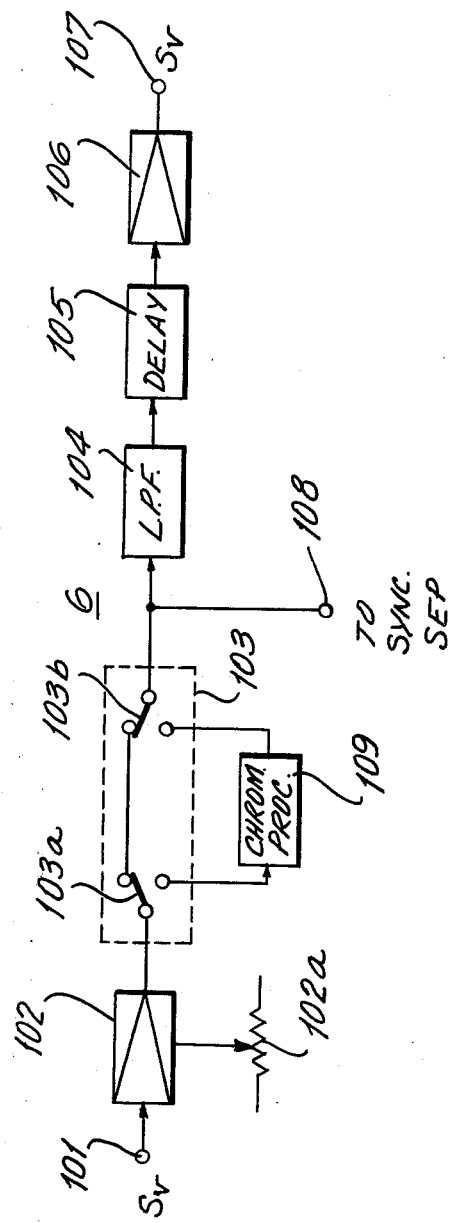
FIG. 2 is a block diagram of the input stage of the illustrated time base error corrector.

A block diagram of input stage 6 is illustrated in FIG. 2 as comprising an input amplifier 102, a switching circuit 103, a low pass filter 104 and a delay circuit 105. In addition, a chrominance processing circuit 109 is coupled to switching circuit 103. Amplifier 102 is coupled to input terminal 101 and is adapted to receive the incoming video signal supplied thereto by the playback circuitry of the VTR. Amplifier 102 preferably is a gain-adjustable amplifier and is illustrated as being coupled to an adjustable resistor 102a for this purpose. The output of amplifier 102 is coupled to switching circuit 103 which includes change-over switches 103a and 103b which are selectively operable in accordance with the type of VTR with which the time base error correcting apparatus is used. That is, if the VTR is of the so-called FM recording type, then switches 103a and 103b exhibit their illustrated positions so as to couple amplifier 102 directly to low pass filter 104. However, if the VTR is of the so-called heterodyne type, then switches 103a and 103b are switched so as to couple amplifier 102 to low pass filter 104 via chrominance processing circuit 109.

Low pass filter 104 is adapted to limit the frequencies of the video signal and, therefore, to remove an unwanted, higher frequency band. The low pass filter thus functions to filter out higher frequency noise components from the video signal. The output of the low pass filter is coupled through delay circuit 105 to output amplifier 106 and thence to output terminal 107. The phase modulate the read clock signals that are used to read out the digitized video signals from main memory 9. In addition, the non-linear velocity error signal is used to control the subcarrier signal of the read out and reconverted video signals.

Synchronizing signal generator 16 is adapted to be supplied with a reference clock signal which, for example, may be generated by a system clock (not shown). Typical horizontal, vertical, equalizing and burst signals are derived from this reference signal for insertion into the reconverted analog video signal so as to re-form a proper NTSC composite color video signal.

Control unit 17 is coupled to synchronizing separator 12, write clock generator 13, read clock generator 15 and synchronizing signal generator 16. As will be described in greater detail below, control unit 17 is adapted to establish a write memory enable signal and a read memory enable signal so as to selectively control main memory 9 for a write-in operation and a read-out operation, respectively. Furthermore, control unit 17 generates write and read addresses which are used to select the respective memory units within the main memory into which digitized video signals are written and out of which digitized video signals are read. The control unit also detects when a write-in and a read-out operation may overlap, that is, when the very same memory unit may be selected to have a video signal written therein and read out therefrom. An output of control unit 17 is coupled to main memory 9 for controlling the writing in and reading out of digitized video signals. Control unit 17 additionally is coupled to velocity error memory 14 for controlling the writing in and reading out of velocity error signals. As will be shown below, the velocity error signal which is associated with a particular line of video signals is stored in a storage compartment which corresponds with the memory unit in which that associated line of video signals is stored in main memory 9. Hence, and under the control of control unit 17, when that line of video signals is read out from the memory unit, the associated velocity error signal, which is stored in a corresponding storage compartment, also is read out. In this way, the velocity error of a particular line of video signals is corrected appropriately.

The operation of the apparatus illustrated in FIG. 1 now will be summarized. Video signals which had been recorded on tape 1 are reproduced therefrom by playback head 2, amplified by amplifier 3 and demodulated by demodulator 4. If the reproduced video signals are accompanied by drop-out, such drop-out is detected by drop-out detector 5. The resultant, reproduced video signals, which are accompanied by time base errors, are supplied to input stage 6 wherein the timing, or interleaving, of the chrominance and luminance components is adjusted in the event that the video signals are reproduced from a heterodynetype VTR. The adjusted video signal is supplied to A/D converter 7 and also to synchronizing separator 12.

The synchronizing separator separates the horizontal synchronizing pulse $S_h$ and the burst signal $S_B$ from the incoming video signal. Synchronizing separator 12 additionally is supplied with a drop-out indication from drop-out detector 5. In the event of drop-out, synchronizing separator 12 is prevented from erroneously interpreting noise as a horizontal synchronizing pulse. The horizontal synchronizing pulse $S_h$ and the burst signal $S_B$ are supplied to write clock generator 13 wherein a write clock signal WCK is frequency and phase synchronized with the horizontal synchronizing pulse and the burst signal which are separated from the incoming video signal. Thus, write clock pulses WCK exhibit the same time base errors as are included in the separated horizontal synchronizing pulse and the separated burst signal.

The write clock pulses WCK are supplied to control unit 17 and, in addition, are supplied as clock pulses to A/D converter 7, drop-out compensator 8 and main memory 9. A/D converter 7 samples the incoming video signal in response to the write clock pulses WCK and supplies an 8-bit signal through drop-out compensator 8 to main memory 9 representing each video sample. The drop-out compensator stores each line of digitized video signals on a line-by-line basis, and is responsive to a detected drop-out to replace a drop out picture element, such as a digitized sample, with a stored picture element of similar position in a preceding line. Thus, an erroneous drop-out sample is not stored in main memory 9. Rather, this dropped out sample is replaced by a close approximation, i.e., a similar sample from an adjacent line. Furthermore, if detected drop-out prevents the write clock pulses WCK from being phase synchronized to the separated burst signal $S_B$, drop-out compensator 8 replaces an entire incoming line of video signals with the preceding, stored line. This avoids any possibly mis-synchronized analog-to-digital conversion with a concomitant erroneous storage of improper digital signals.

A reference clock signal from a suitable system clock source (not shown) is supplied to reference input 19 and is applied therefrom to synchronizing signal generator 16. The synchronizing signal generator generates the usual horizontal and vertical synchronizing pulses, equalizing pulses and a burst signal, all at substantially constant rates. Synchronizing signal generator 16 also drives read clock generator 15 to generate read clock pulses which are supplied to main memory 9 and to D/A converter 10.

Control unit 17 is responsive to various synchronizing signals which are supplied thereto by synchronizing separator 12 and by synchronizing signal generator 16. The control unit additionally is responsive to the write clock pulses and the read clock pulses which are generated by write clock generator 13 and read clock generator 15. In response to these respective signals, control unit 17 produces write and read memory enable signals which are applied to main memory 9 for selectively enabling the write and read operations whereby digitized video signals are written into the main memory and stored, digitized video signals are read out therefrom. Control unit 17 also is responsive to the horizontal synchronizing pulses supplied by synchronizing separator 12 to generate write memory addresses for addressing successive memory units in main memory 9 into which respective lines of video signals are written. Similarly, the control unit is responsive to horizontal synchronizing pulses supplied by synchronizing signal generator 16 to generate read memory addresses for addressing other memory units in the main memory from which respective lines of stored video signals are read. Control unit 17 additionally monitors the respective write and read addressing operations so as to make certain that a common memory unit is not simultaneously addressed to have video signals written therein and read thereout.

In one embodiment, main memory 9 includes a plurality of memory units, for example, a minimum of three delay circuit is adapted to equalize the timing of the video signal $S_v$ which is supplied from amplifier 106 to A/D converter 107 with the write clock pulses WCK which are generated by write clock generator 13. That is, synchronizing separator 12 and write clock generator 13 exhibit an inherent time delay which, if not compensated, would result in a phase lagging relation of the write clock pulses with respect to the video signal. This phase lagging relation is eliminated by delaying the video signal $S_v$ by delay circuit 105 for an amount of time which is equal to, and thus compensates, the inherent time delay of the synchronizing separator and the write clock generator. Thus, video signal $S_v$ at output terminal 107 will be in proper phase relation with respect to the write clock pulses WCK.

The output of switching circuit 103 also is coupled to an output terminal 108 for supplying the video signal to synchronizing separator 12.

When the entire composite color video signal is recorded as a frequency modulated signal, as by an FM recording VTR, the time base errors which are present in the chrominance component generally are equal to the time base errors which are present in the luminance component. However, when the composite color video signal is recorded by a heterodyne-type VTR, then the time base errors in the luminance component may not be equal to the time base errors in the chrominance component. The playback circuitry included in the heterodyne-type VTR generally is provided with an AFC loop and with an APC loop for synchronizing a local subcarrier to the reproduced horizontal synchronizing pulses, that is, to the time base error of the luminance component. This means that, although the time base error of the luminance component is inserted into the chrominance component, the time base error now inserted into the chrominance component lags the luminance component by one horizontal line interval. This distorts the interleaving relationship between the luminance and chrominance components. The purpose of chrominance processing circuit 109 is to restore the proper interleaving relationship between the luminance and chrominance components in the event that the incoming video signal is reproduced by a heterodyne-type VTR. As an example, the chrominance processing circuit may be of the type described in copending application Ser. No. 777,542, assigned to the assignee of the present invention.

Thus, it is seen that the video signal $S_v$ which is provided at output terminal 107 is a time-adjusted video signal which is synchronized with write clock pulses WCK. Furthermore, the video signal provided at output terminal 108 includes horizontal synchronizing pulses $S_h$ and burst signals $S_B$ which exhibit a proper interleaved relation.

DROP-OUT COMPENSATOR 8

Figure 3:
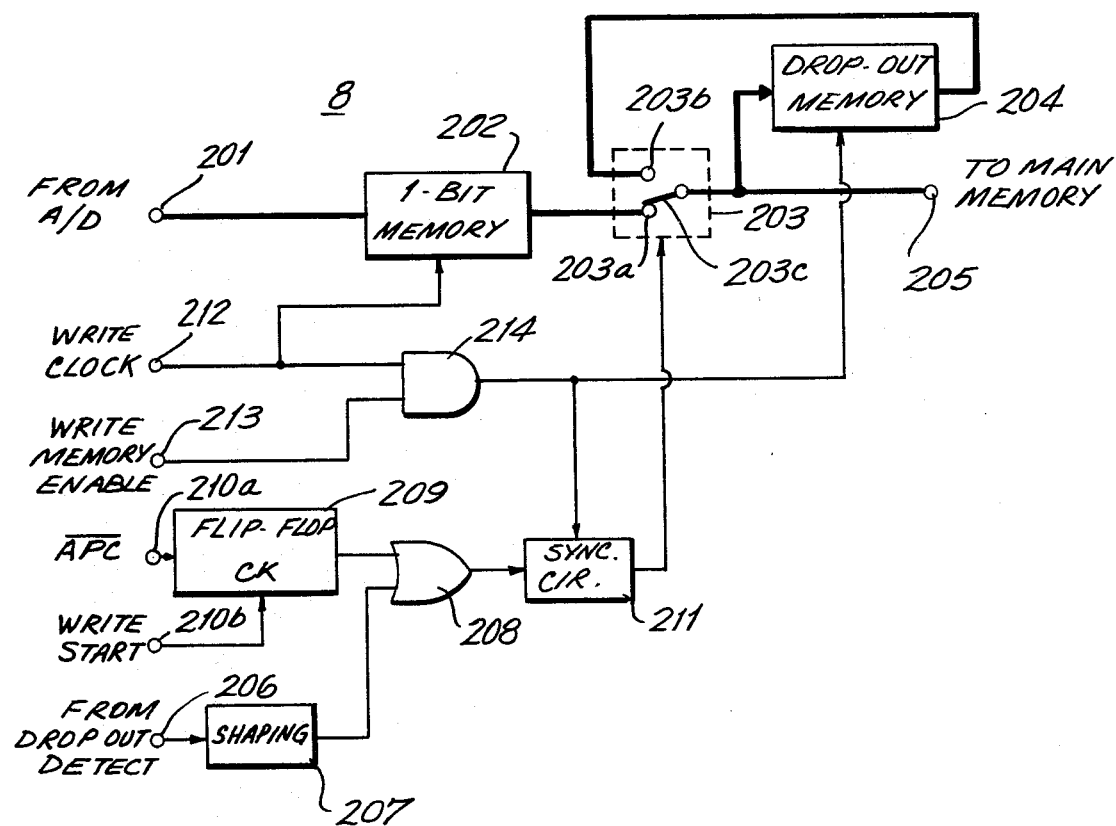
FIG. 3 is a block diagram of the drop-out compensator used in the illustrated time base error corrector.

Drop-out compensator 8 is shown in greater detail in FIG. 3. The drop-out compensator is coupled to A/D converter 7 and, therefore, receives successive digitized samples of video signal $S_v$. As a numerical example, each sample is formed of eight bits, each 8-bit sample being supplied serially to the drop-out compensator.

The drop-out compensator includes an input terminal 201, a 1-bit buffer memory 102, a switching circuit 203, a drop-out memory 204 and an output terminal 205. Terminal 201 is coupled to the output of A/D converter 7 and is adapted to receive the digitized video signal therefrom. Terminal 201 additionally is coupled to 1-bit memory 202 which provides a temporary store for each bit in the digitized video sample. A timing input of 1-bit memory 202 is coupled to an input terminal 212 and is adapted to receive the write clock pulses WCK therefrom. Hence, 1-bit memory 202 may comprise any suitable timing-controlled flip-flop circuit and functions to re-time the serially transmitted bits from A/D converter 7. That is, the re-timed digitized samples are synchronized with write clock pulses WCK. The output of 1-bit memory 202 is coupled via switching circuit 203 to output terminal 205. The switching circuit here is illustrated diagrametically as including a movable contact 203c which is selectively engageable with either one of two fixed contacts 203a and 203b. Switching circuit 203 is selectively controlled by a switch control signal produced by a synchronizing circuit 211. The output of the synchronizing circuit is shown as being coupled as a control input to switching circuit 203.

The output of switching circuit 203 additionally is coupled to drop-out memory 204. In one embodiment thereof, drop-out memory 204 has a capacity of two lines of video signals. If, as an example, each line of video signals is sampled 640 times, then 640 samples are produced for each line, each sample being formed of eight bits, resulting in a capacity of drop-out memory 204 of $640 \times 8 \times 2 = 10,240$ bits. The output of the drop-out memory is fed back to contact 203b of switching circuit 203.

During normal operation, synchronizing circuit 211 generates a switch control signal whereby movable contact 203c engages fixed contact 203a so as to couple the re-timed digitized samples of the video signals directly to output terminal 205 and, in addition, to a suitable storage location in drop-out memory 204. However, in the event of a detected drop-out, as by a drop-out signal produced by drop-out detector 5 (FIG. 1), synchronizing circuit 211 supplies a switching signal to switching circuit 203 whereby movable contact 203c engages fixed contact 203b. It is seen that, in this configuration, the digitized video signals which are supplied to input terminal 201 cannot be transmitted to output terminal 205. Rather, the video signals which are stored in drop-out memory 204 are recirculated to fixed contact 203b and thence through movable contact 203c to output terminal 205. That is, when movable contact 203c engages fixed contact 203b, digitized samples of video signals of previous lines, which are stored in drop-out memory 204, are read out therefrom and supplied to output terminal 205. On the other hand, when movable contact 203c engages fixed contact 203a, incoming digitized video signals merely are stored in drop-out memory 204, but are not read out therefrom to output terminal 205.

Synchronizing circuit 211 includes one input for receiving write clock pulses WCK and another input for receiving a binary "1" when a drop-out is detected. In this regard, an input terminal 206, which is adapted to receive a signal representing the detection of a drop-out condition, is coupled to a shaping circuit 207 for providing a binary "1" when a drop-out condition is detected. The output of the shaping circuit is coupled through an OR-gate 208 to synchronizing circuit 211. OR-gate 208 includes another input coupled to the output of a clocked flip-flop circit, such as a D-type flip-flop circuit 209. This D-type flip-flop circuit includes an input 210a adapted to receive a signal $\overline{APC}$ which, as will be described below, is generated when write clock pulses WCK cannot be phase synchronized with the incoming burst signal $S_B$. The timing pulse input of D-type flip-flop circuit 209 is coupled to an input terminal 210b to receive a WRITE START signal generated by control unit 17. In the event that write clock pulse synchronization cannot be attained, the $\overline{APC}$ signal is supplied to D-type flip-flop circuit 209. Upon the occurrence of the WRITE START signal, the D-type flip-flop circuit is set so as to supply a binary "1" through OR-gate 208 to synchronizing circuit 211.

The write clock pulses which are supplied to synchronizing circuit 211 are applied thereto from input terminal 212 via an AND gate 214. A conditioning input of AND gate 214 is coupled to input terminal 213 to receive a WRITE MEMORY ENABLE signal from control unit 17. Thus, when main memory 9 is conditioned to receive digitized video samples for storage therein, the WRITE MEMORY ENABLE signal is applied to input terminal 213 to condition AND gate 214 to supply the write clock pulses WCK to synchronizing circuit 211. In addition, these write clock pulses WCK are supplied to drop-out memory 204 so as to clock the digitized samples of the video signal thereinto.

Synchronizing circuit 211 may include gating circuitry so as to apply a switch control signal to switching circuit 203 whenever OR-gate 208 supplies a binary "1" thereto, this switching control signal being produced in synchronism with a write clock pulse WCK.

Let it be assumed that drop-out memory 204 is of similar construction to a unit of main memory 9. Hence, the drop-out memory includes a memory unit having a capacity to store two lines of digitized samples. During normal operation in the absence of drop-out, switching circuit 203 exhibits the condition illustrated in FIG. 3. Hence, when video signals are written into the main memory, write clock pulses are supplied to input terminal 212 and the WRITE MEMORY ENABLE signal is supplied to input terminal 213. Thus, each bit in a sample is re-timed in 1-bit memory 202 by the write clock pulses WCK, and the re-timed bit is supplied through switching circuit 203 to output terminal 205 and thence to main memory 9. At the same time, the re-timed bit is supplied from switching circuit 203 to drop-out memory 204. Write clock pulses WCK which are produced at the output of AND gate 214 are supplied to drop-out memory 204 so as to clock each bit into the memory. Thus, as each bit is supplied to main memory 9, it also is stored in drop-out memory 204. Successive digitized samples are stored in the drop-out memory until its capacity of two lines is reached. At that time, the oldest samples are replaced by the newest samples.

Let it be assumed that drop-out is detected in the middle of a line of video signals. That is, a picture element in an incoming line has been dropped out. A signal representing this detected drop-out is applied to input terminal 206 and is shaped by shaping circuit 207 to a binary "1". This binary "1" is supplied through OR-gate 208 to synchronizing circuit 211. As a result of this detected drop-out, the synchronizing circuit is conditioned to apply a switching signal to switching circuit 203 upon the occurrence of the next write clock pulse WCK. Hence, at the time that the drop-out condition is detected, switching circuit 203 is changed over so as to couple the output of drop-out memory 204 to output terminal 205. This means that the dropped-out picture element, which now is present at input terminal 201, is not supplied through the switching circuit to output terminal 205 and to main memory 9. Rather, a picture element in the corresponding position as the dropped-out picture element, but in the second previous line, which had been stored in drop-out memory 204 is read out therefrom and supplied to main memory 9 via output terminal 205. Thus, drop-out compensation is achieved at a picture element rate.

Let it be assumed that the write clock pulses WCK cannot be synchronized with the incoming burst signal $S_B$. This may be due to drop-out of the incoming horizontal synchronizing pulse or drop-out of the incoming burst signal. In any event, the signal $\overline{APC}$ is applied to input terminal 210a. At the commencement of a WRITE START signal, such as at the beginning of a line of video signals which are to be stored in main memory 9, D-type flip-flop circuit 209 is set to supply a binary "1" through OR-gate 208 to synchronizing circuit 211. This binary "1" is present for a complete line interval. Hence, a switching signal is applied to switching circuit 203 to change this switching circuit over so as to connect the output of drop-out memory 204 to output terminal 205, and to interrupt the connection from input terminal 201 through 1-bit memory 202 to the output terminal. Therefore, since the write clock pulses WCK cannot be synchronized with the incoming video signal, the possibility of storing erroneous digitized samples in main memory 9 is avoided. Rather, the second preceding line, which had been stored in the main memory as well as in drop-out memory 204, is read out of the drop-out memory and supplied once again to the main memory for storing in the next addressed memory unit. Accordingly, drop-out compensation is achieved at a line rate.

Of course, whenever the output from drop-out detector 5 (FIG. 1) terminates, or when the $\overline{APC}$ signal terminates, a binary "0" is supplied to synchronizing circuit 211 by OR-gate 208 so as to return switching circuit 203 to its normal, illustrated position. This ends the drop-out compensation. Hence, drop-out signals or mis-synchronized signals are not supplied to main memory 9. Instead, an identically positioned picture element in a preceding line (i.e., the second preceding line) is supplied to the main memory in the event that a picture element in the incoming line is dropped out, and an entire preceding line (or lines) is supplied to the main memory in the event that the write clock pulses for an incoming line of video signals cannot be synchronized therewith, for example, in the event that the incoming burst signal either is dropped out or is distorted. This replacement of dropped-out or mis-synchronized signals compensates for such conditions.

MAIN MEMORY 9

Figure 4:
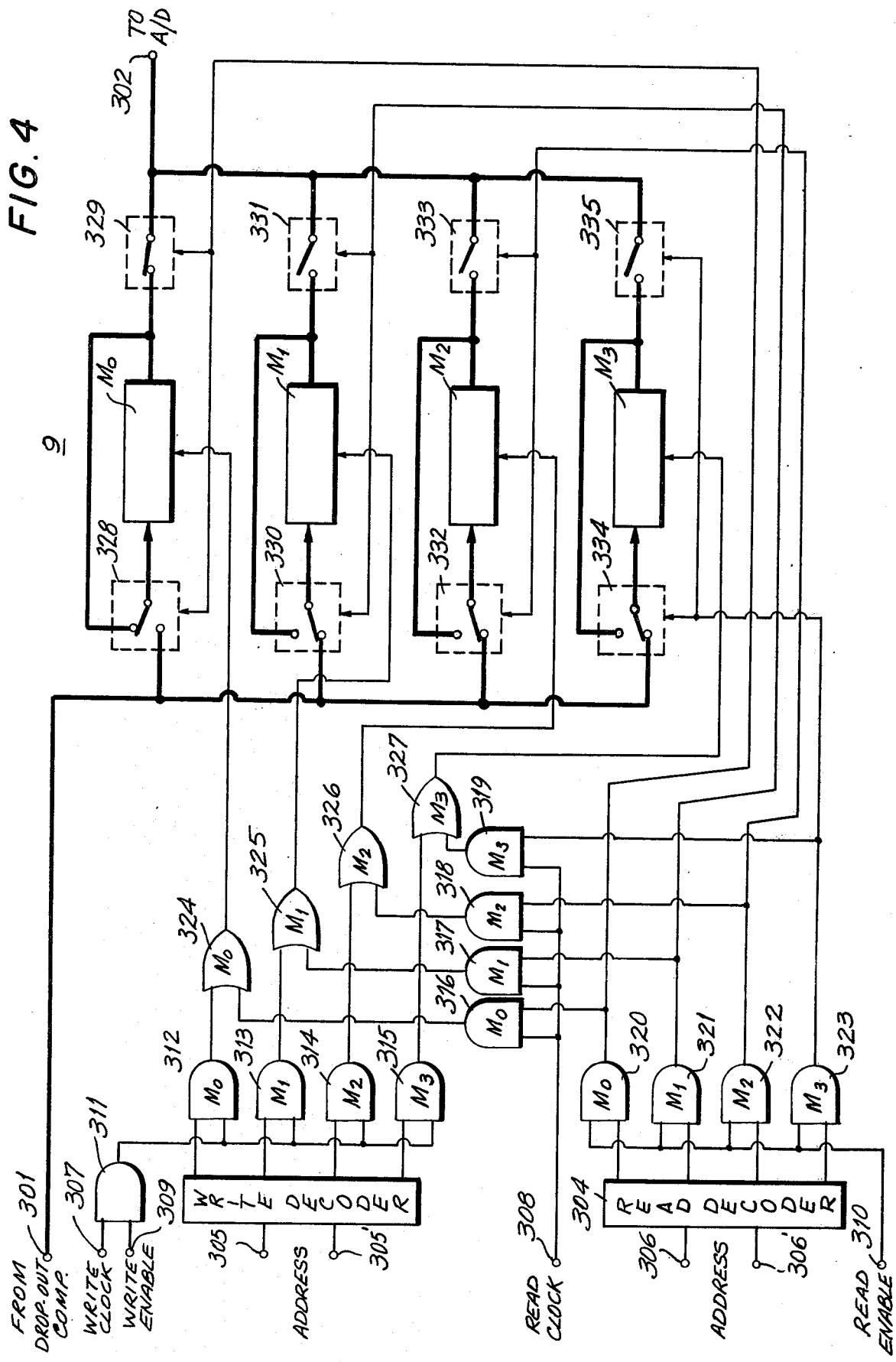
FIG. 4 is a logic diagram of the main memory which is used in the illustrated time base error corrector.

Referring now to FIG. 4, a logic diagram of a preferred embodiment of main memory 9 is illustrated. The main memory is comprised of four memory units $M_0$, $M_1$, $M_2$ and $M_3$, each memory unit having a capacity to store two lines of digitized samples of video signals (8×640 bits×2). A given memory unit is adapted to be addressed either for a write-in or a read-out operation; but both operations cannot be carried on simultaneously with the same memory unit. Of course, different memory units can be addressed for the writing in and reading out of data, respectively. An input terminal 301 is coupled via switches 328, 330, 332 and 334 to memory units $M_0$, $M_1$, $M_2$ and $M_3$, respectively. Input terminal 301 is coupled to the output of drop-out compensator 8 for receiving the (compensated) digitized samples therefrom. The outputs of memory units $M_0$, $M_1$, $M_2$ and $M_3$ are coupled via switches 329, 331, 333 and 335, respectively, to output terminal 302.

A write address decoder 303 is coupled to input terminals 305 and 305' for receiving a 2-bit write address which is supplied thereto by control unit 17. It is appreciated that four separate combinations can be formed of two bits. Hence, the two bits supplied to input terminals 305 and 305' represent a one-out-of-four address, this address being decoded by write address decoder 303. The write address decoder includes four separate outputs which are coupled to AND gates 312, 313, 314 and 315, respectively. The remaining input of each of these AND gates is connected in common to the output of an AND gate 311, this latter AND gate having inputs coupled to input terminals 307 and 309 to receive write clock pulses WCK and the WRITE ENABLE signal, respectively. The write clock pulses are supplied to input terminal 307 by write clock generator 13; and the WRITE ENABLE signal is supplied to input terminal 309 by control unit 17. It will be appreciated that, depending upon the address supplied to input terminals 305 and 305', write address decoder 303 conditions only one of AND gates 312-315 to transmit write clock pulses WCK from AND gate 311.

A read address decoder 304, which is similar to write address decoder 303, is coupled to input terminals 306 and 306' for receiving a 2-bit read address which is generated by control unit 17. The read address decoder includes four separate outputs which are coupled to AND gates 320, 321, 322 and 323, respectively. The remaining input of each of these AND gates is connected in common to an input terminal 310 to receive a READ ENABLE signal which is generated by control unit 17. AND gates 320-323 are coupled to a respective input of each of AND gates 316-319, respectively. The remaining input of each of AND gates 316-319 is connected in common to an input terminal 308 to receive read clock pulses which are generated by read clock generator 15.

AND gates 312 and 316 both are associated with memory unit $M_0$ and are coupled via an OR-gate 324 to a clock input of this memory unit. Similarly, AND gates 313 and 317 both are associated with memory unit $M_1$ and are coupled to the clock input thereof via an OR-gate 325. Also, AND gates 314 and 318 both are associated with memory unit $M_2$ and are coupled to the clock input thereof via an OR-gate 326. Finally, AND gates 315 and 319 both are associated with memory unit $M_3$ and are coupled to the clock input thereof via an OR-gate 327.

AND gate 320 also is associated with memory unit $M_0$ and the output of this AND gate is coupled to switches 328 and 329 so as to selectively control the conditions of these switches. As an example, if a binary "1" is produced by AND gate 320, then switch 328 interrupts the normal connection of input terminal 301 to memory unit $M_0$ and feeds back the output of this memory unit to its input. Also, switch 329, which normally is opened, now is closed. Similarly, AND gate 321 is associated with memory unit $M_1$ and is coupled to switches 330 and 331 for controlling the conditions thereof. AND gate 322 is associated with memory unit $M_2$ and is coupled to switches 332 and 333 to control the conditions thereof. Finally, AND gate 323 is associated with memory unit $M_3$ and is coupled to switches 334 and 335 to control the conditions thereof.

In operation, let it be assumed that the 2-bit address which is applied to input terminals 305 and 305' is the address of memory unit $M_2$, and that the 2-bit address which is applied to input terminals 306 and 306' is the address of memory unit $M_0$. Accordingly, write address decoder 203 decodes this 2-bit address to condition AND gate 314. Write clock pulses WCK are supplied to AND gate 311 via input terminal 307; and when control unit 17 determines that a write-in operation can proceed, the WRITE ENABLE signal is applied through input terminal 309 to condition AND gate 311 to supply the write clock pulses to AND gate 314. Thus, write clock pulses are supplied through AND gate 314 and OR gate 316 to the clock input of memory unit $M_2$. Hence, digitized samples which are supplied to input terminal 301 from the drop-out compensator are clocked into memory unit $M_2$. Since the capacity of each memory unit is assumed to be equal to two line intervals, memory unit $M_2$ is addressed to store two line intervals therein.

At the same time that memory unit $M_2$ is conditioned for a write-in operation, read address decoder 304 decodes the 2-bit address supplied to input terminals 306 and 306' by control unit 17 to condition AND gate 320. Control unit 17 determines that, since a different memory unit is addressed for a read-out operation than is addressed for a write-in operation, the read-out operation can proceed. Hence, the READ ENABLE signal is applied to input terminal 310, thereby energizing AND gate 320 to close switch 329 and change over switch 328. Hence, the connection from input terminal 301 to memory unit $M_0$ is interrupted, and the output of this memory unit is fed back to the input thereof.

Energized AND gate 320 also conditions AND gate 316 to apply the read clock pulses supplied thereto from input terminal 308 through OR-gate 324 to the clock input of memory unit $M_0$. Since memory unit $M_0$ is supplied with clock pulses, the contents thereof are shifted. Thus, a line of digitized video signals is read out of this memory unit and is supplied to output terminal 302 via switch 329. The read-out line of video signals also is fed back via switch 328 and thus is rewritten into memory unit $M_0$. At the same time, the line of digitized video signals which is supplied to input terminal 301 is written into memory unit $M_2$ in response to the write clock pulses which are applied to the clock input thereof via OR-gate 326 and AND gate 314.

After the contents of memory unit $M_0$ are read out therefrom, control unit 17 supplied the next successive read address to read address decoder 304. Consequently, the foregoing read-out operation now is performed with respect to memory unit $M_1$.

Similarly, after two lines of digitized video signals are stored in memory unit $M_2$, control unit 17 supplies a different write address to write address decoder 303. Accordingly, the foregoing write-in operation next is carried out with respect to the next successive memory unit $M_3$.

Since different memory units are selected for write-in and read-out operations, it is appreciated that both operations can be performed simultaneously. The control unit monitors the address of the memory units which are selected for the write-in and read-out operations and prevents the possibility of having a common memory unit be addressed simultaneously for both a write-in and a read-out operation. In the event that a memory unit which is being addressed for a write-in operation is about to be addressed for a read-out operation, the read address is not changed, thereby avoiding simultaneous addressing of the same memory unit; but, rather, the presently addressed memory unit is addressed once again to have the contents thereof re-read. This is why the output of each memory unit is fed back thereto during a read-out operation. Hence, it may be appreciated that the main memory should be provided with at least three memory units to avoid the possibility of simultaneously addressing the same memory unit for both a write-in and a read-out operation. It is preferred that four such memory units, as illustrated herein, be provided.

D/A CONVERTER 10

Figure 5:
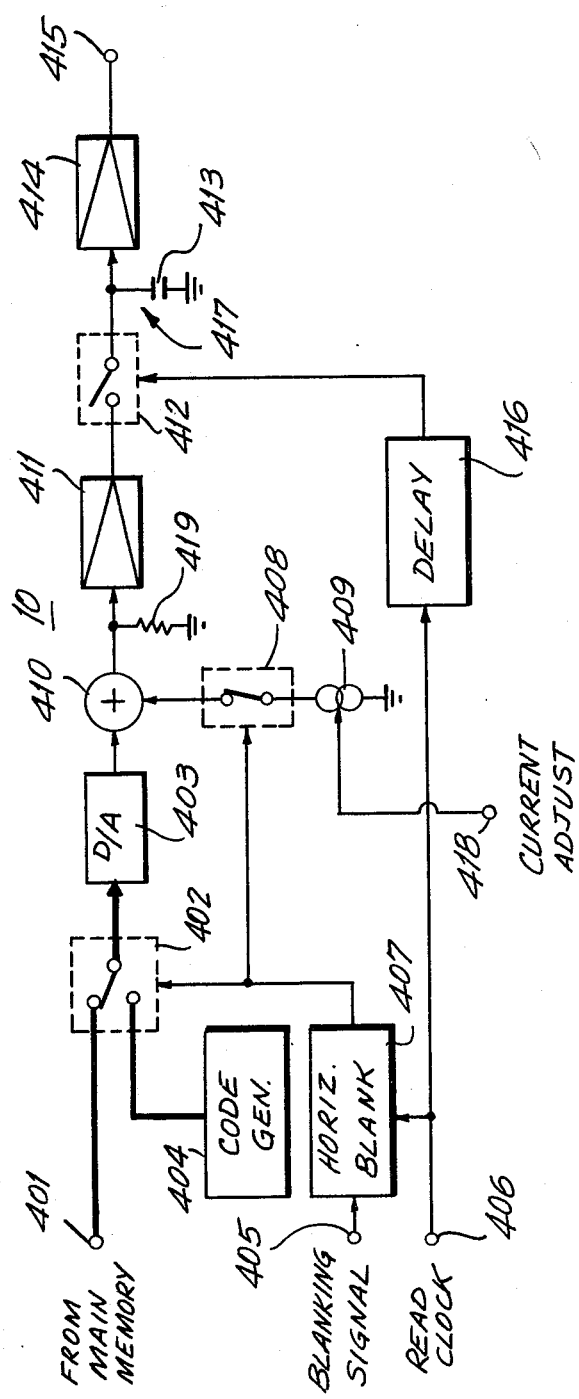
FIG. 5 is a block diagram of the digital-to-analog converter which is used with the illustrated time base error corrector.

Turning now to FIG. 5, a block diagram of D/A converter 10 is illustrated as comprising a change-over switch 402, a D/A converter 403, a code generator 404, a horizontal blanking circuit 407, an adding circuit 410 and a sample-and-hold circuit 417. Change-over switch 402 is diagramatically depicted as a mechanical switch having a fixed contact coupled to an input terminal 401 which, in turn, is supplied with read out digitized samples from main memory 9 (FIG. 1). Another fixed contact of change-over switch 402 is coupled to a code generator 404, the latter being adapted to generate a constant digital code representing the pedestal level of the video signal. The fixed contact of the change-over switch is coupled to D/A converter 403 and is selectively engageable with either of the fixed contacts so as to supply either the video signal which is read out from the main memory or the pedestal level code to the D/A converter. The condition of switch 402 is determined by horizontal blanking circuit 407 which causes the switch to couple code generator 404 to D/A converter 403 in the presence of a horizontal blanking signal. Accordingly, horizontal blanking circuit 407 may comprise a gating circuit having an input coupled to input terminal 405 to receive the horizontal blanking signal which is generated by synchronizing signal generator 16 (FIG. 1), and another input coupled to input terminal 406 to receive a read clock pulse. The read clock pulse thus is used to synchronize the timing of the horizontal blanking signal in horizontal blanking circuit 407.

D/A converter 403, which may comprise any conventional digital-to-analog converter, is coupled to one input of adding circuit 410, the other input thereof being coupled through a switch 408 to a constant current generator 409. Switch 408, diagramatically depicted herein as an electromechanical switch, includes a switch control input coupled to horizontal blanking circuit 407 and is adapated to be closed in response to the horizontal blanking signal generated thereby. When closed, switch 408 couples the constant current generated by constant current generator 409 to adding circuit 410. The constant current level produced by constant current generator 409 is determined by a manually adjustable current control signal which is supplied thereto from an input terminal 418. Thus, when switch 408 is closed, the magnitude of the constant current which is supplied to adding circuit 410 from constant current generator 409 serves to adjust the pedestal level which is determined by code generator 404 and D/A converter 403.

The output of adding circuit 410, which is provided across resistor 419, is amplified by amplifier 411 and supplied to sample-and-hold circuit 417. The sample-and-hold circuit is depicted as being comprised of a switch 412 which is selectively closed to sample the video signal supplied thereto by amplifier 411 in response to a delayed read clock pulse. To this effect, a delay circuit 416 is coupled between input terminal 406 and the sampling control input of sampling switch 412. Capacitor 413 is provided at the output of switch 412 for the purpose of storing the sampled video signal. The video signal stored across capacitor 413 then is supplied through an amplifier 414 to an output terminal 415.

Figure 6:
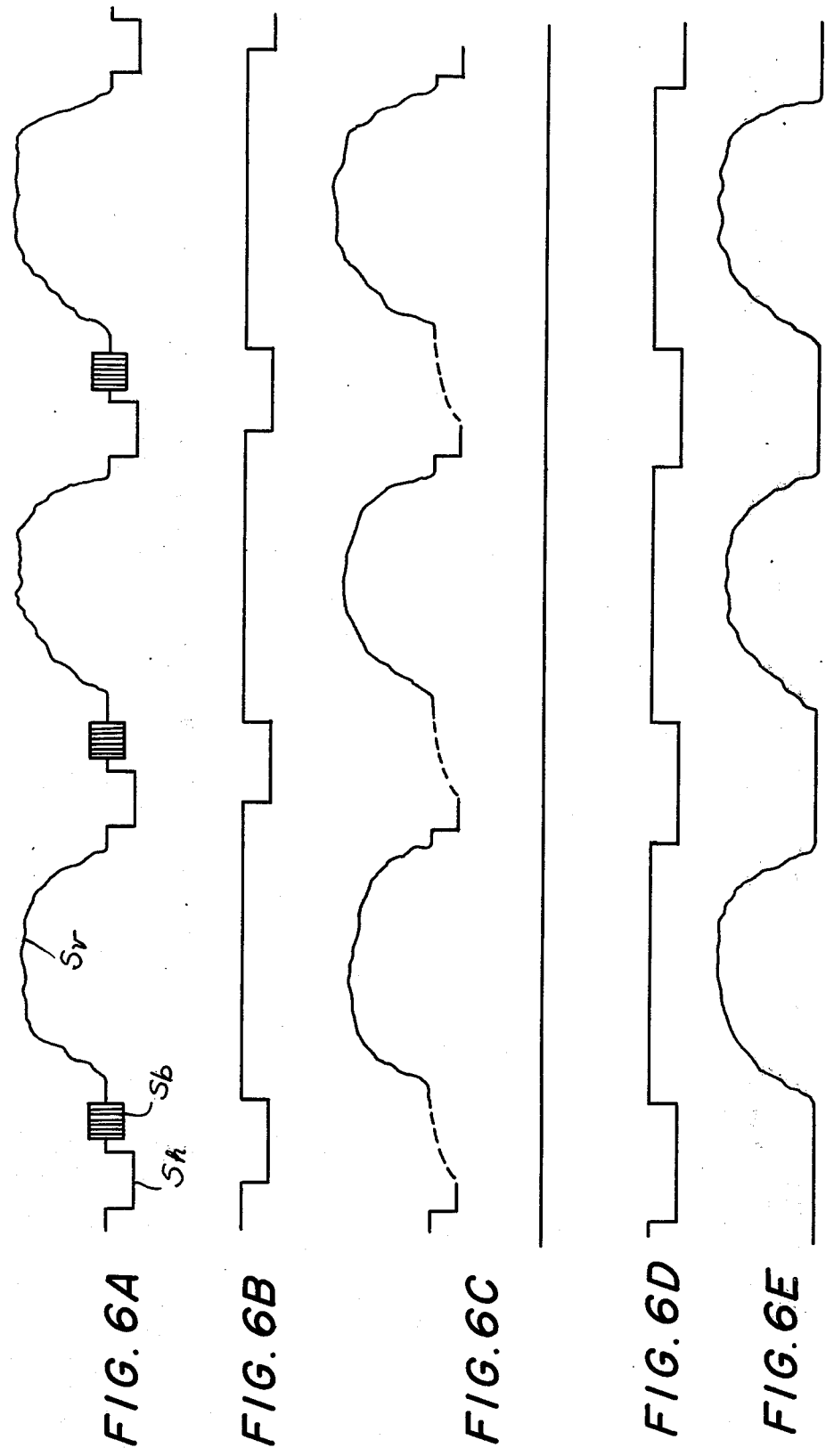
FIGS. 6A-6E are waveform diagrams which are useful in understanding the operation of the digital-to-analog converter shown in FIG. 5.

The operation of the illustrated D/A converter 10 now will be described with reference to FIGS. 6A-6E which are wave-form diagrams representing the operation of portions of the elements shown in FIG. 5. FIG. 6A represents a reconstituted composite color video signal having an information portion $S_v$, a horizontal synchronizing pulse $S_h$ and a burst signal $S_b$. This color video signal, which is similar to the incoming color video signal supplied to the time base correcting apparatus by the VTR, is digitized and stored in main memory 9. During the write-in operation of the main memory, control unit 17 generates a WRITE ENABLE signal having the waveform shown in FIG. 6. It is appreciated that the WRITE ENABLE signal inhibits a portion of the horizontal synchronizing pulse $S_h$ and the burst signal $S_b$ from being written into the main memory. Rather, all of the video information included in the composite color video signal, plus a portion of the horizontal synchronizing pulse, is written into main memory 9. Hence, during a read-out operation, only that portion which had been read into the main memory is read out therefrom. FIG. 6C represents, in analog form, the video signal which is read out from the main memory and which is supplied to input terminal 401, through switch 402 and to D/A converter 403. It may be appreciated that the waveform shown in solid lines in FIG. 6C is produced by D/A converter 403 and is supplied to adding circuit 410.

Synchronizing signal generator 16 generates a horizontal blanking pulse train, which is similar to that shown in FIG. 6D. The timing of this horizontal blanking pulse train is synchronized with the read clock pulses generated by read clock generator 15 so as to have the waveform identical to that shown in FIG. 6D. That is, the waveform in FIG. 6D is the re-timed horizontal blanking pulse which is synchronized with the read clock pulses. Thus, it is appreciated that the horizontal blanking pulses shown in FIG. 6D also are synchronized with the video signal which is read out from main memory 9 and reconverted back into analog form by D/A converter 403. During each horizontal blanking interval at the output of horizontal blanking circuit 407, that is, during the interval that the signal shown in FIG. 6D is relatively low, change-over switch 402 supplies the predetermined pedestal level code from code generator 404 to D/A converter 403. Thus, the reconverted analog video signal which is supplied to adding circuit 410 has the waveform shown in FIG. 6E wherein video information portions are separated from each other by the horizontal blanking interval.

At the time that the horizontal blanking interval in the video signal shown in FIG. 6E is supplied to adding circuit 410, switch 408 is closed to apply the constant current of adjustable magnitude to the adding circuit. This constant current serves to shift the pedestal level, that is, the blanking interval which is present between successive video information portions in the waveform of FIG. 6E, either upwardly or downwardly, depending upon the current adjustment signal supplied to input terminal 418. Thus, the output of adding circuit 410, which has the waveform of FIG. 6E, includes a properly set pedestal level. Hence, the pedestal level is adjustable relative to the video signal information level.

In many instances, the reconverted analog video signal produced by D/A converter 403 includes transient pulses. The purpose of sample-and-hold circuit 417 is to eliminate these transient pulses from the reconverted video signal. Thus, delay circuit 416 shifts the sampling time of the sample-and-hold circuit by a small amount, less than a read clock interval, whereby the transient pulses included in the reconstituted analog video signal are not sampled. Consequently, the analog video signal which is stored across capacitor 413 is substantially free of unwanted noise. Amplifier 414 then functions as a buffer amplifier to supply this reconstituted analog video signal to output terminal 415.

OUTPUT PROCESSING STAGE 11

Figure 7:
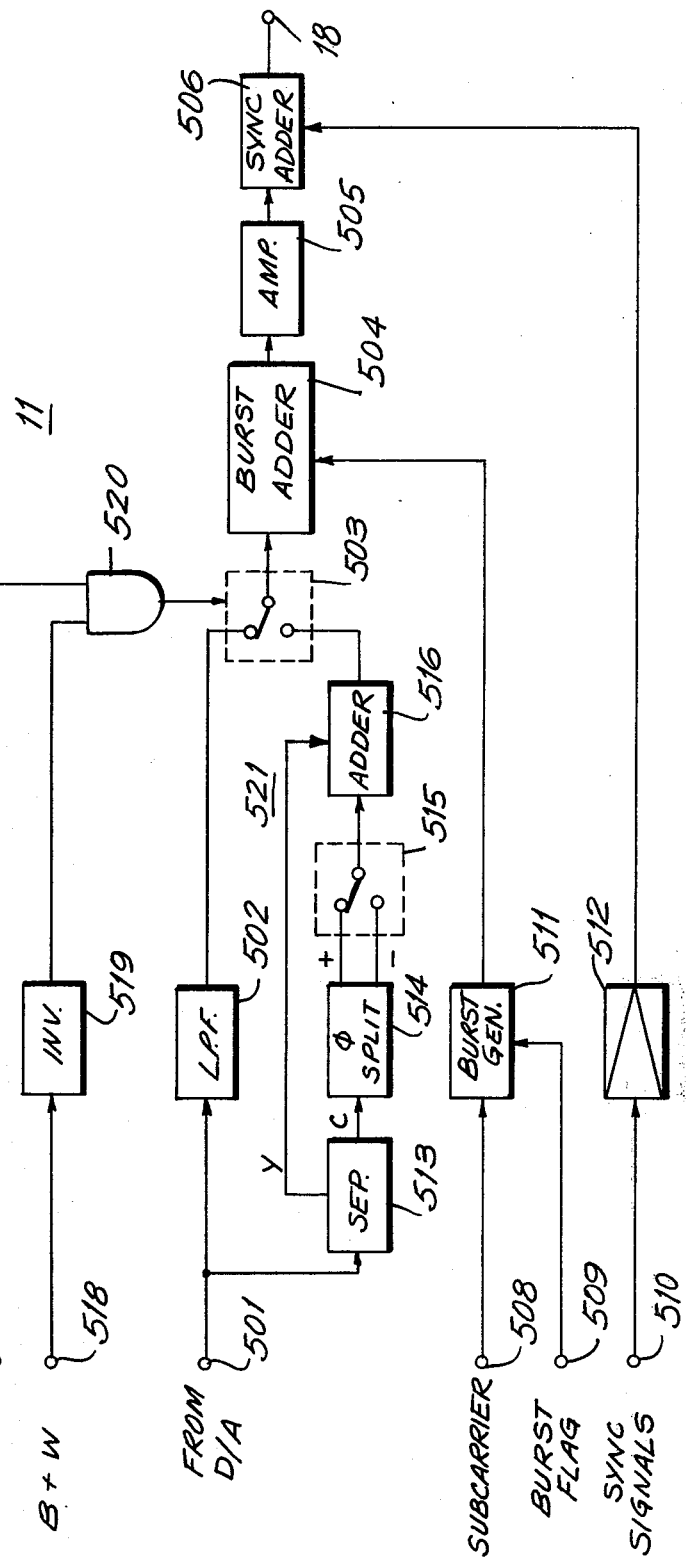
FIG. 7 is a block diagram of the output processing stage used in the illustrated time base error corrector.

FIG. 7 illustrates a block diagram of one embodiment of output processing stage 11, including a low-pass filter 502, a change-over switch 503, a burst adder 504 and a synchronizing signal adder 506. The purpose of output processing stage 11 is to insert the usual burst signal and horizontal and vertical synchronizing pulses, as well as the equalizing pulses, into the video signal which is reconverted back into analog form by the D/A converter shown in FIG. 5. Accordingly, low-pass filter 502, which is adapted to filter out higher frequency noise, is coupled to input terminal 501 and is adapted to receive the reconverted analog video signal produced at, for example, output terminal 415 of FIG. 5. The output of low-pass filter 502 is coupled through change-over switch 503, diagramatically illustrated herein as an electromechanical switch, to burst adder 504. The burst adder is adapted to insert the usual burst signal into the horizontal blanking interval of the reconverted analog video signal and, as shown, is coupled to a burst signal generator 511. The burst signal generator includes one input coupled to an input terminal 508 for receiving a subcarrier signal generated by read clock generator 15, and another input coupled to input terminal 509 to receive a burst flag signal generated by synchronizing signal generator 16. The burst generator thus functions as a gate circuit for gating the subcarrier supplied to input terminal 508 to burst adder 504 during the interval of the burst flag which is applied to input terminal 509.

The output of burst adder 504, which appears as the reconverted analog video signal having the burst signal added therein, is supplied through a buffer amplifier 505 to synchronizing signal adder 506. The synchronizing signal adder is adapted to insert the usual horizontal and vertical synchronizing pulses and equalizing pulses into the reconverted analog video signal and, to this effect, is supplied with these usual synchronizing signals from an input terminal 510 through a buffer amplifier 512. The synchronizing signals which are applied to input terminal 510 are generated by synchronizing signal generator 16.

A loop circuit 521 is coupled to input terminal 501 and is adapted to supply the reconverted analog video signal to burst adder 504 by a change-over switch 503 in the event that the VTR with which the time base error correcting apparatus is used is operated in its special mode. For example, if the VTR operates in its slow-motion, stop or fast-motion modes of play-back, there is the possibility that the phase of the subcarrier which is supplied through burst signal generator 511 to burst adder 504 is not proper with respect to the phase of the chrominance subcarrier in the played back video signal. Loop circuit 521 functions to insure proper phase coincidence. The loop circuit is comprised of a signal separator 513, adapted to separate the luminance and chrominance components from the composite color video signal, a phase splitter 514, a change-over switch 515 and an adder 516. Phase splitter 514 is coupled to receive the separated chrominance component from signal separator 513 so as to provide oppositely-phased chrominance components at its respective outputs. Change-over switch 515, illustrated diagramatically herein as an electromechanical switch, is controlled by control unit 17 (not shown) so as to couple either in-phase, or positive, polarities of the chrominance component, or out-of-phase, or negative polarities, of the chrominance component to adder 516. The particular phase, or polarity, of the chrominance component which is supplied to adder 516 corresponds with the phase of the burst signal which is supplied to burst adder 504, in accordance with the NTSC color standard. Adder 516 serves to recombine the luminance and properly phased chrominance components, and to supply these recombined components through change-over switch 503 to burst adder 504.

Normally, change-over switch 503 couples low-pass filter 502 to the burst adder. However, when the VTR is operated in one of its special playback modes, change-over switch 503 couples loop circuit 521 to the burst adder. The control over change-over switch 503 is effected by an AND gate 520 having one input coupled to an input terminal 517 and another input coupled through an inverter 519 to an input terminal 518. Input terminal 517 is adapted to receive a SPECIAL signal when the VTR is operated in its slow-motion, stop or fast-motion modes. If the played back video signal is a composite color video signal, then a binary "0" is supplied to input terminal 518, this binary "0" being inverted to a binary "1" to condition AND gate 520. This conditioned AND gate changes over change-over switch 503 from its illustrated condition to the condition wherein loop circuit 521 is coupled to burst adder 504 in the event that the SPECIAL signal is applied to input terminal 517. However, this change-over operation is not needed in the event that the reproduced video signal is a monochrome signal. Accordingly, if such a monochrome signal is played back, a binary "1" is applied to input terminal 518, this binary "1" being inverted so as to disable AND gate 520. That is, even though a SPECIAL mode of operation of the VTR is selected, if the played back video signal is a black-and-white television signal, change-over switch 503 admits of its normal, illustrated condition whereby low-pass filter 502 is coupled thereby to burst adder 504.

The output of synchronizing signal adder 506 is coupled to an output terminal 18 so as to provide a time base corrected video signal in accordance with NTSC standards.

SYNCHRONIZING SEPARATOR 12

Figure 8:
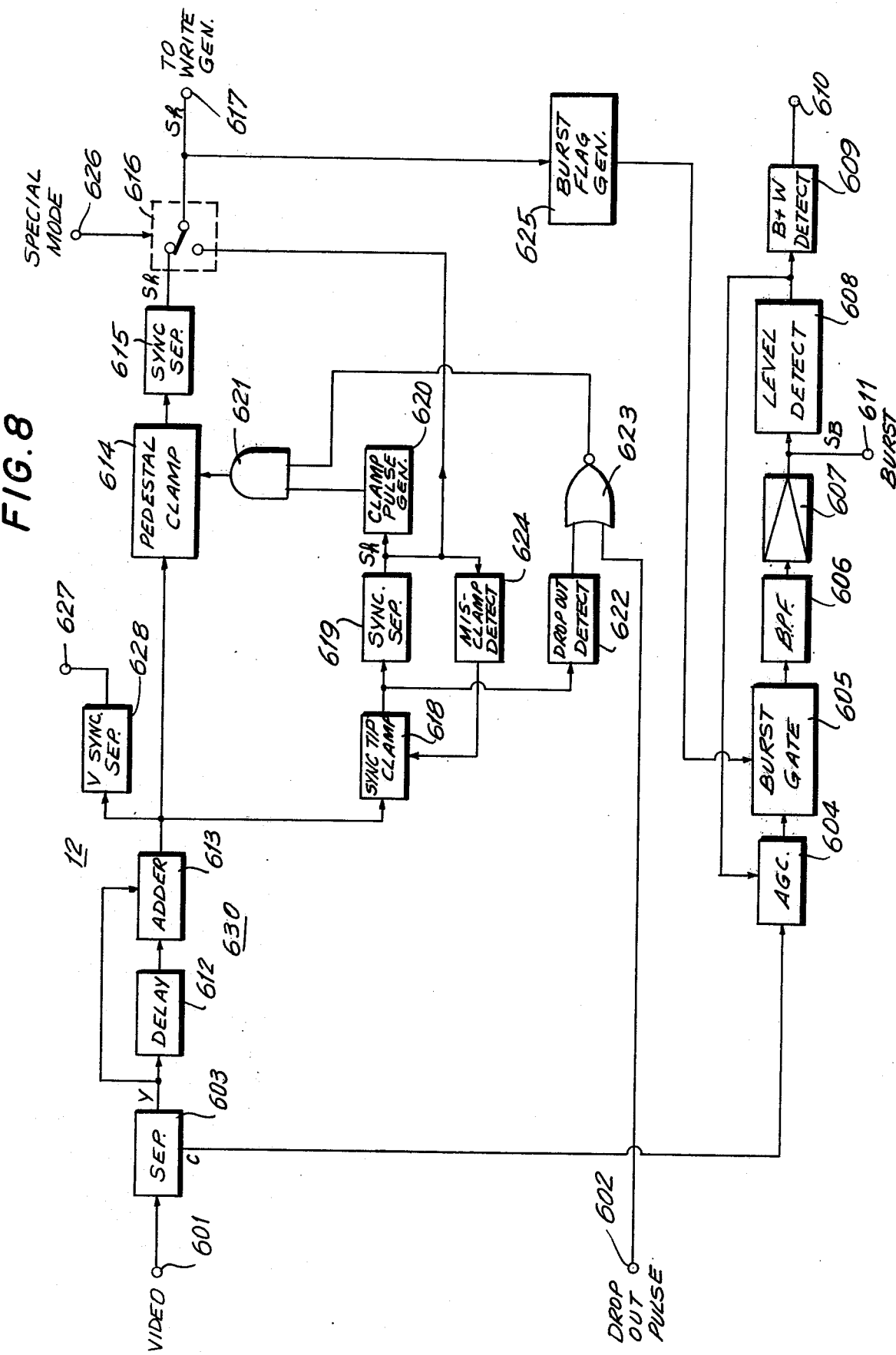
FIG. 8 is a block diagram of the synchronizing separator used in the illustrated time base error corrector.

The synchronizing separator is illustrated in FIG. 8 as comprising a signal separator circuit 603, a noise filter, or eliminating circuit 630, a pedestal clamping circuit 614, a synchronizing separator 615, a change-over switch 616, a burst flag generator 625 and a burst gate 605. Signal separator circuit 603 is coupled to input terminal 601 and is adapted to receive the composite video signal supplied thereto by input stage 6 (FIG. 1) and to separate this video signal into its luminance and chrominance components, respectively. Noise filter 630 is coupled to receive the luminance component from signal separator circuit 603, and the noise filter includes a delay circuit 612 and an adder 613. The delay circuit is adapted to delay the luminance component and to supply the delayed luminance component to adder 613 whereat the delayed component is added to the presently received luminance component. This has the effect of providing a higher signal-to-noise (S/N) ratio to the luminance component.

Adder circuit 613 is coupled to pedestal clamp circuit 614 and, in addition, to vertical synchronizing separator 628. The vertical synchronizing separator is adapted to separate the usual vertical synchronizing signals from the luminance component and to apply these vertical synchronizing signals to an output terminal 627.

Pedestal clamp circuit 614 functions to clamp the received luminance component supplied from noise filter 630 to the pedestal level so as to facilitate separating the horizontal synchronizing pulse $S_h$ from the clamped luminance signal. Synchronizing separator 615, which may comprise a clipping circuit, or the like, is coupled to pedestal clamp circuit 614 and separates the horizontal synchronizing pulse $S_h$ from the luminance signal. The output of synchronizing separator 615 is coupled through change-over switch 616 to an output terminal 617 so as to supply the separated horizontal synchronizing pulse $S_h$ to the write clock generator and, in addition, to control unit 17.

The separated horizontal synchronizing pulse $S_h$ at the output of change-over switch 616 also is supplied to burst flag generator 625, whereby the usual burst flag pulse is produced. The output of burst flag generator 625 is coupled to burst gate 605, this burst gate having another input coupled to receive the separated chrominance component from signal separator circuit 603 via AGC circuit 604. Thus, the burst flag supplied to burst gate 605 by burst flag generator 625 is adapted to separate the burst signal $S_B$ from the chrominance component.

The output of burst gate 605 is coupled via a band pass filter 606 and an amplifier 607 to an output terminal 611 whereat the separated burst signal $S_B$ is provided. This separated burst signal is supplied to the write clock generator for phaselocking the memory write clock pulses thereto. These separated burst signals additionally are coupled to a level detector 608 and then to a black-and-white detector 609. Level detector 608 is adapted to detect the level of the separated burst signals and to feed back an indication of this detected burst signal level to AGC circuit 604 as a gain-controlling signal therefor. Hence, the combination of AGC circuit 604, burst gate 605 and level detector 608 functions as an automatic gain controlling circuit for maintaining a substantially constant gain, and thus signal level, for the burst signal. Black-and-white detector 609 is adapted to sense the absence of a burst signal and, therefore, to provide an indication at its output terminal that the received video signal, in the absence of the burst signal, is a black-and-white signal. This black-and-white indication may be supplied to, for example, control unit 17, whereby the black-and-white signal which is supplied to input terminal 518 (FIG. 7), described above, is derived.

Pedestal clamp circuit 614 is controlled by an AND gate 621, this AND gate having one input which normally is conditioned by a binary "1" supplied thereto by a NOR gate 623, and another input which is supplied with a clamping pulse produced by clamping pulse generator 620. The clamping pulse generator is controlled by a sync tip clamping circuit 618, having an input coupled to receive the luminance signal from noise filter 630, and a synchronizing separator circuit 619 having an input coupled to sync tip clamp 618 and an output coupled to clamping pulse generator 620. Sync tip clamp 618 is adapted to detect the synchronizing signal included in the luminance signal, and to clamp onto the detected synchronizing signal. The clamped signal, supplied from sync tip clamp 618, has the horizontal synchronizing pulse separated therefrom by synchronizing signal separator 619. Clamp pulse generator 620 is adapted to generate a pulse signal in response to the horizontal synchronizing pulse which is separated by synchronizing separator circuit 619. The pulse generated by clamp pulse generator 620 is supplied through AND gate 621 to pedestal clamp circuit 614 so as to energize this circuit to clamp the received luminance signal to the proper pedestal level. It is appreciated that pedestal clamp circuit 614 thus is energized during the horizontal blanking interval so as to clamp the luminance signal to the pedestal level at the proper time.

The output of sync tip clamp 618 additionally is coupled to a drop-out detector 622 which produces a binary "1" when drop-out is detected in the clamped signal produced at the output of the sync tip clamp. The output of drop-out detector 622 is coupled to one input of NOR gate 623, this NOR gate including another input which is coupled to an input terminal 602 to receive a drop-out pulse from, for example, drop-out detector 5 (FIG. 1).

The output of synchronizing separator circuit 619 also is fed back to sync tip clamp 618 via a mis-clamp detector 624. The mis-clamp detector comprises, for example, a retriggerable monostable multivibrator whose time constant is equal to about 1.5H (1.5 times a horizontal line interval). Sync tip clamp 618 includes an adjustable time constant which is controlled by mis-clamp detector 624. In the event that synchronizing separator circuit 619 fails to separate a horizontal synchronizing pulse from the clamped signal supplied thereto, mis-clamp detector 624 reduces the time constant of the sync tie clamp so as to speed up its recovery time.

In operation, the incoming video signal which is played back by the VTR and which passes through input stage 6 is supplied to input terminal 601. Signal separator circuit 603 separates this video signal into its luminance component Y and into its chrominance component C. The luminance component Y is passed through noise filter 630, and vertical synchronizing separator 628 separates the usual vertical synchronizing pulses from the luminance component Y.

The luminance component additionally is supplied to pedestal clamp 614 and to sync tip clamp 618. The sync tip clamp normally clamps to the horizontal synchronizing pulse included in the luminance component Y, and the clamped signal is supplied to synchronizing separator 619. Accordingly, the horizontal synchronizing pulse $S_h$ is separated from the clamped signal, and this separated horizontal synchronizing pulse is supplied to clamp pulse generator 620 which, in turn, generates a clamping pulse in response to the horizontal synchronizing pulse, that is, during the horizontal blanking interval. AND gate 621 normally is conditioned to transmit this clamping pulse to pedestal clamp 614, whereby the luminance component Y is properly clamped to the pedestal level during the horizontal blanking interval. Hence, synchronizing separator 615 is enabled to separate the horizontal synchronizing pulse $S_h$ easily from the pedestal-clamped luminance component. This separated horizontal synchronizing pulse $S_h$ is supplied from synchronizing separator 615 to output terminal 617.

In addition, the separated horizontal synchronizing pulse $S_h$ is supplied to burst flag generator 625 which generates a burst flag pulse that is supplied to burst gate 605. The separated chrominance component C, after having its gain suitably adjusted by AGC circuit 604, has the burst signal $S_B$ included therein separated therefrom by burst gate 605. The separated burst signal $S_B$ then is filtered and amplified and supplied to output terminal 611. The burst signal also is level-detected for controlling the gain of AGC amplifier 604. In the absence of a burst signal, for example, when a black-and-white video signal is played back from the VTR, detector 609 applies a black-and-white signal to output terminal 610.

In the event that the horizontal synchronizing pulse included in the incoming video signal is dropped out, sync tip clamp 618 will attempt to clamp onto a noise signal in the absence of the horizontal synchronizing pulse. Consequently, a synchronizing pulse $S_h$ will not be produced by synchronizing separator 619. This means that clamp pulse generator 620 will not generate a clamping pulse, and pedestal clamp circuit 614 will not be properly activated. Therefore, a horizontal synchronizing pulse $S_h$ will not be detected by synchronizing separator 615. Furthermore, since sync tip clamp 618 attempts to clamp onto a noise signal, drop-out detector 622 detects the dropped-out horizontal synchronizing pulse to supply a binary "1" to NOR gate 623. This binary "1" is inverted by the NOR gate so as to de-energize AND gate 621.

It is recalled that mis-clamp detector 624 is comprised of a retriggerable monostable multivibrator. Whenever a horizontal synchronizing pulse $S_h$ is produced by synchronizing separator 619, this monostable multivibrator is triggered so as to supply a binary "1" to sync tip clamp 619. Accordingly, if a horizontal synchronizing pulse is detected during each horizontal blanking interval, a constant binary "1" is supplied to the sync tip clamp. Now, when a horizontal synchronizing pulse is not detected by synchronizing separator 619, the monostable multivibrator included in mis-clamp detector 624 returns to its binary "0" state. This signal, when supplied to sync tip clamp 618, speeds up the recovery time of this sync tip clamp so as to accurately clamp onto the next horizontal synchronizing pulse which is supplied thereto from signal separator circuit 603. That is, in the event of a drop-out in the horizontal synchronizing pulse, sync tip clamp 618 is rapidly prepared for another clamping operation so as to rapidly and accurately clamp onto the next horizontal synchronizing pulse following this drop-out.

Furthermore, in the event that drop-out detector 5 detects a dropped out condition, a binary "1" is supplied from input terminal 602 to NOR gate 623, whereupon the NOR gate disables AND gate 621. Thus, when drop-out detector 5 detects this dropped out condition, pedestal clamp circuit 614 and synchronizing separator circuit 615 are prevented from erroneously operating upon noise and, therefore, an erroneous horizontal synchronizing pulse is prevented from being supplied to output terminal 617. Thus, it is appreciated that AND gate 621 functions to prevent a pedestal clamping operation in the presence of a drop-out condition.

Change-over switch 616 includes a switch control input coupled to an input terminal 626 for receiving a SPECIAL control signal in the event that the VTR is operated in one of its special playback modes, e.g. slow motion, still or quick-motion. When such a SPECIAL playback mode is selected, change-over switch 616 connects the output of synchronizing separator 619 to output terminal 617 and, therefore, interrupts the connection of pedestal clamp circuit 614 and synchronizing separator circuit 615 to the output terminal. This insures a more accurate indication of the horizontal synchronizing pulse during these SPECIAL modes of operation.

Write Clock Generator 13

Write clock generator 13 is formed of an automatic frequency control (AFC) section and an automatic phase control (APC) section. The AFC section is shown in block diagram form in FIG. 9, while the APC section is shown in block diagram form in FIG. 14. The purpose of the AFC section is to generate a higher frequency timing signal which is frequency-synchronized with the incoming horizontal synchronizing pulse, as supplied to output terminal 617 by the synchronizing separator shown in FIG. 8.

Figure 9:
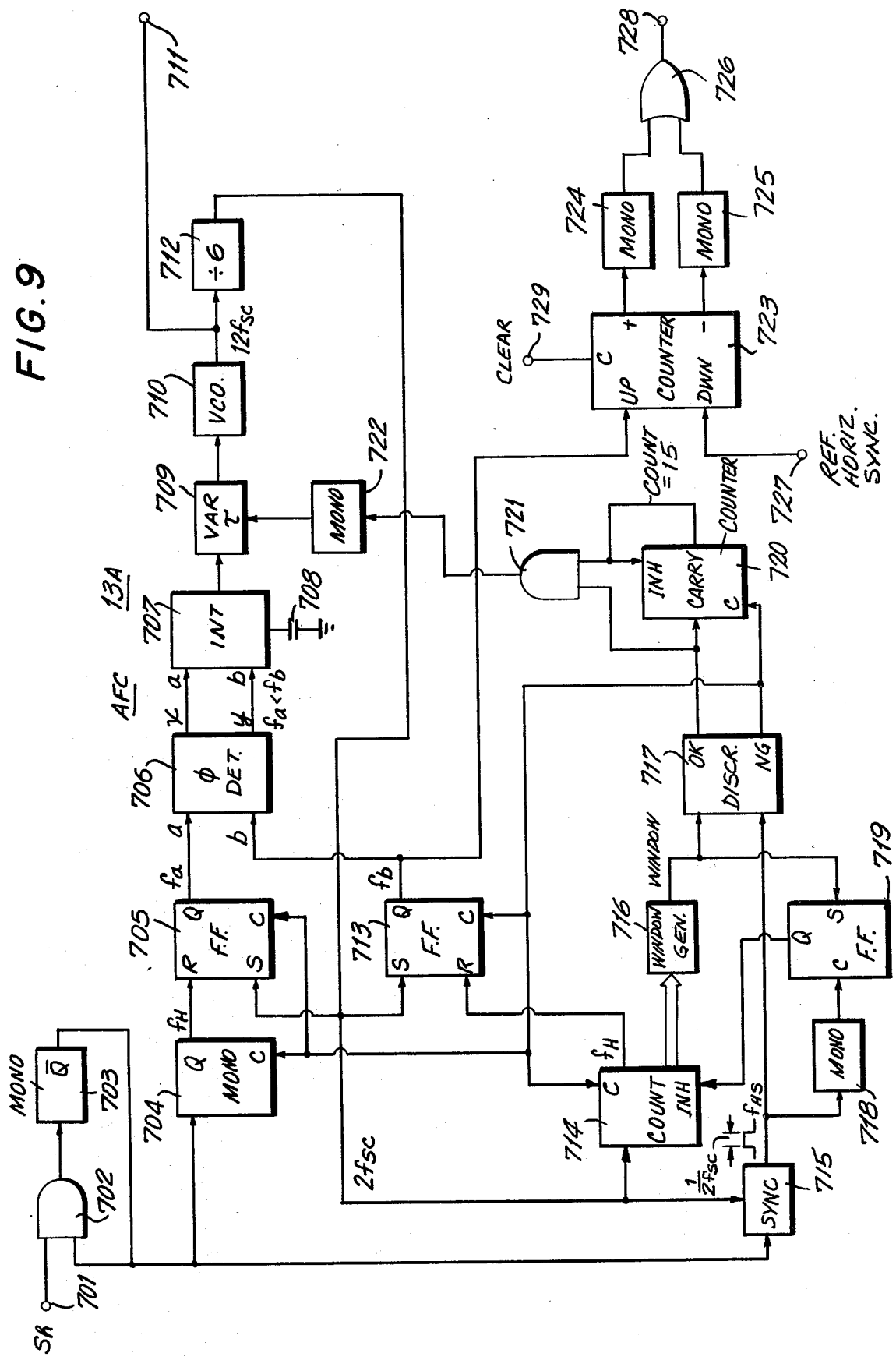
FIG. 9 is a block diagram of the automatic frequency control circuit incorporated into the write clock generator used in the illustrated time base error corrector.

The AFC section shown in FIG. 9 includes a monostable multivibrator 703, flip-flop circuit 705, phase detector 706, integrator 707, voltage-controlled oscillator (VCO) 710, counter 714, window generator 716, discriminator 717 and flip-flop circuit 719. Monostable multivibrator 703 has its input terminal coupled to an AND gate 702, the AND gate having one input coupled to an input terminal 701 for receiving the separated horizontal synchronizing pulse $S_h$, and its other input connected to the $\overline{Q}$ output of the monostable multivibrator. The purpose of this connection between AND gate 702 and monostable multivibrator 703 is to generate pulses which are triggered only in response to the horizontal synchronizing pulses and not in response to equalizing pulses. That is, the connection of AND gate 702 and monostable multivibrator 703 serves to eliminate, or filter out, the equalizing pulses which are included in the incoming video signal.

The output of monostable multivibrator 703 is coupled to a monostable multivibrator 704 whose Q output is, in turn, connected to the reset input R of flip-flop circuit 705. Monostable multivibrator 704 is adapted to produce a pulse signal $f_H$ of predetermined duration, in synchronism with the received horizontal synchronizing pulse $S_h$. Flip-flop circuit 705, which is triggered in response to the negative transition in the signal applied either to its reset input R or to its set input S, has its Q output connected to input a of phase detector 706.

VCO 710, which has a center frequency equal to about twelve times the chrominance subcarrier frequency, generates a high frequency timing pulse $12f_{sc}$, the frequency of this timing pulse being controlled by a control voltage applied to the VCO. The output of VCO 710 is coupled to a frequency divider 172 which serves to divide the frequency of the timing pulse by a factor of six. Hence, divider 712 produces a divided timing pulse $2f_{sc}$, and the output of this divider is connected to the set input S of flip-flop circuit 705. The output of divider 712 is further connected to counter 714, wherein the divided timing pulse $2f_{sc}$ is counted, and also to synchronizing circuit 715 which serves to produce a synchronized horizontal sync pulse $f_{HS}$. Still further, divided timing pulse $2f_{sc}$ also is coupled to the set input S of flip-flop circuit 713, the reset input R thereof being coupled to an output of counter 714.

The Q output of flip-flop circuit 713 generates a pulse signal $f_b$ which is applied to the b input of phase detector 706 whereat it is compared in phase to the pulse signal $f_a$ supplied to input a of the phase detector by flip-flop circuit 705. Phase detector 706 includes two outputs x and y, respectively. A signal whose pulse width is proportional to the phase difference between pulses $f_a$ and $f_b$ is produced at output x in the event that the frequency of pulses $f_a$ is greater than the frequency of pulses $f_b$. Similarly, a signal whose pulse width is proportional to the phase difference between pulses $f_a$ and $f_b$ is provided at output y in the event that the frequency of pulses $f_a$ is less than the frequency of pulses $f_b$. Outputs x and y are coupled to inputs a and b, respectively, of an integrator 707, the latter being provided with an integrating capacitor 708. The integrator is adapted to generate an output voltage which is proportional to the pulse width of the signal supplied either to its input a or to its input b. That is, the output of integrator 707 is a voltage which is proportional to the phase difference between pulses $f_a$ and $f_b$.

An adjustable time constant circuit 709 has its input coupled to the output of integrator 707 for receiving the phase difference voltage produced by the integrator. The adjustable time constant circuit includes a control input coupled to a monostable multivibrator 722 which functions to change the time constant of the adjustable time constant circuit in the event that VCO 710 is not frequency-locked to the incoming horizontal synchronizing pulse $S_h$. The output of adjustable time constant circuit 709 is applied as a control voltage to VCO 10. That is, the phase difference voltage produced by integrator 707 is supplied through the adjustable time constant circuit as the control voltage. It is appreciated that, depending upon the time constant of the adjustable time constant circuit, the oscillating frequency of VCO 710 will vary as the phase difference signal produced by integrator 707 varies, but this change in the VCO oscillating frequency will lag the change in the phase difference voltage by a delay determined by adjustable time constant circuit 709. The output of VCO 710 ($12f_{sc}$) is supplied to an output terminal 711 and is used in the APC section of the write clock generator.

As aforesaid, counter 714 is adapted to count the divided timing pulse $2f_{sc}$. When a predetermined number of these divided timing pulses are counted, counter 714 generates an output pulse $f_h$ which has a repetition frequency equal to the expected horizontal sychronizing frequency. This output pulse $f_h$ is applied to the reset input R of flip-flop circuit 713. In addition, the count of counter 714, which is a digital count, for example, a binary count, is supplied in parallel to window generator 716. The window generator comprises a decoding circuit for determining when the count of counter 714 is within a preset counting range from, for example, A to B. A window pulse is generated by window generator 716 when the count of counter 714 is within this range. The output of the window generator is coupled to discriminator 717 and, additionally, to the set input S of a flip-flop circuit 719.

Discriminator 717 is adapted to sense when the horizontal synchronizing pulse $S_h$ included in the incoming video signal is within the window generated by window generator 716. As will be appreciated, the window generated by the window generator represents an approximate range within which the horizontal synchronizing pulse is expected. If the incoming horizontal synchronizing pulse does, in fact, occur within this range, then it also occurs within the locking range of the illustrated AFC section. Discriminator 717 thus is adapted to determine whether the incoming horizontal synchronizing pulse does fall within the locking, or pull-in range of the AFC section. Accordingly, another input of the discriminator is coupled to synchronizing circuit 715 and is adapted to receive the synchronized, or timed horizontal synchronizing pulse $f_{HS}$. Discriminator 717 includes a first output, designated as the OK output, which is provided with a binary "1" when the re-timed horizontal synchronizing pulse $f_{HS}$ falls within the pulse window generated by window generator 716. The discriminator also includes another output, designated as the NG output, which is provided with a binary "1" when the re-timed horizontal synchronizing pulse $f_{HS}$ falls outside of the pulse window. The OK outut of the discriminator is coupled to one input of an AND gate 721 and, in addition, to an input of a counter 720. The NG output of the discriminator is coupled in common to the clear input C of monostable multivibrator 704, flip-flop circuits 705 and 713 and counter 714. Thus, when a binary "1" is provided at the NG output of discriminator 717, monostable multivibrator 704, flip-flop circuits 705 and 713 and counter 714 are all reset to their initial or quiescent states.

Counter 720 is adapted to detect when VCO 710 is synchronized to the incoming horizontal synchronizing pulse $S_h$. This synchronized condition is detected when a predetermined number of incoming horizontal synchronizing pulses falls within the pulse window generated by window generator 716. Thus, counter 720 is adapted to count each binary "1" provided at the OK output of discriminator 717 and to produce a counter output signal when a predetermined count has been reached. As a numerical example, it is assumed that VCO 710 is synchronized with the incoming horizontal synchronizing pulse when fifteen successive horizontal synchronizing pulses fall within the pulse window produced by window generator 716. Accordingly, when the count of fifteen is reached thereby, counter 720 produces a carry output binary "1". This carry output is coupled to another input of AND gate 721 and, in addition, to an inhibit input of the counter so as to prevent the count of fifteen therein from being incremented further. The clear input C of counter 720 is coupled to the NG output of discriminator 717. Thus, counter 720 will be cleared, or reset to its initial count of, for example, zero, whenever an incoming horizontal synchronizing pulse $S_h$ occurs outside of the pulse window produced by window generator 716. Of course, once counter 720 is reset, another fifteen consecutive incoming horizontal synchronizing pulses must occur within the pulse window before it can be determined that VCO 710 is synchronized with the incoming horizontal synchronizing pulses.

The output of AND gate 721 is coupled to retriggerable monostable multivibrator 722. The retriggerable monostable multivibrator is coupled to adjustable time constant circuit 709 and is adapted to reduce the time constant of this circuit in the event that VCO 710 is not synchronized with the incoming horizontal synchronizing pulses. Accordingly, if the monostable multivibrator is triggered to its unstable state, the time constant exhibited by adjustable time constant circuit 709 is relatively high. This means that if the VCO is synchronized with the incoming horizontal synchronizing pulses, more than a mere transient disturbance is needed to interrupt this synchronized relation. However, once VCO 710 "falls out of sync", then monostable multivibrator 722 returns to its stable state, whereby the time constant of adjustable time constant circuit 709 is reduced so as to accelerate the lock-on time for the VCO. That is, VCO 710 follows changes in the output of integrator 707 more rapidly.

The illustrated AFC section also includes a monostable multivibrator 718 coupled to the output of synchronizing circuit 715, this monostable multivibrator circuit in turn being coupled to the clear input C of flip-flop circuit 719. The Q output of flip-flop circuit 719 is coupled to an inhibit input of counter 714. The combination of monostable multivibrator 718 and flip-flop circuit 719 functions to inhibit counter 714 from continuing its counting operation in the event that flip-flop circuit 719 is set. Accordingly, the set input of this flip-flop circuit is coupled to the output of window generator 716, whereby the flip-flop circuit is adapted to be set in response to the negative transition in the window pulse. Monstable multivibrator 718 is adapted to be triggered in response to the negative transition of the synchronized horizontal synchronizing pulse $f_{HS}$, and when so triggered, flip-flop circuit 719 is cleared and, furthermore, is disabled from responding to a negative transition applied to its set input S.

The illustrated AFC section also includes a 4-bit counter 723, monostable multivibrators 724 and 725 and an OR gate 726, all adapted to produce a SPECIAL output signal when the VTR is operated in one of its SPECIAL playback modes. Counter 723 is an UP/DOWN counter having a count-up input coupled to the Q output of flip-flop circuit 713 so as to count pulses $f_b$, and a count-down input coupled to an input terminal 727 to receive a reference horizontal synchronizing pulse supplied thereto by synchronizing signal generator 16 (FIG. 1). Counter 723 additionally includes a clear input C coupled to an input terminal 729 to receive a clock signal of a relatively low frequency. As an example, a clock pulse is applied to input terminal 728 every 0.5 seconds.

Counter 723 includes a positive carry output terminal coupled to monostable multivibrator 724; and also includes a negative carry output terminal coupled to monostable multivibrator 725. These monostable multivibrators are of the retriggerable type, and both are coupled to respective inputs of OR gate 726. In the event that either of these monostable multivibrators is triggered, a binary "1" is supplied by OR gate 726 to output terminal 728 as the SPECIAL playback signal. Since counter 723 is a 4-bit counter, it exhibits a maximum count of sixteen. If the count of counter 723 exceeds this count in a positive direction, that is, if sixteen pulses $f_b$ are supplied for each reference horizontal synchronizing pulse, then monostable multivibrator 724 is triggered. On the other hand, if a negative count of sixteen is reached by counter 723, for example, is sixteen or more reference horizontal synchronizing pulses are supplied thereto for each pulse $f_b$, then monostable multivibrator 725 is triggered.

The operation of the AFC section shown in FIG. 9 now will be described with reference to the waveform diagrams shown in FIGS. 10-13. Horizontal synchronizing pulses $S_h$, which have been separated from the incoming video signal by synchronizing separator 12, are supplied to input terminal 701. These horizontal synchronizing pulses are shown in FIG. 10A, and as also shown therein, equalizing pulses also may be present during, for example, the vertical blanking interval of the video signal. At each negative transition of a horizontal synchronizing pulse, AND gate 702 supplies a binary "0" to monostable multivibrator 703. When this "0" is produced, that is, at the negative transition in the output of AND gate 702, monostable multivibrator 703 is triggered to provide an output signal at its $\overline{Q}$ output having the waveform shown in FIG. 10B. Monostable multivibrator 703 remains in its unstable condition for a duration which is greater than one-half of a line interval, as also shown in FIG. 10B. Then, the monostable multivibrator returns to its stable condition, as represented by the relatively higher output signal level in FIG. 10B, awaiting the next negative transition in the incoming horizontal synchronizing pulse. Since the time constant of the monostable multivibrator is greater than one-half of a line interval, it is seen that monostable multivibrator 703 is not responsive to incoming equalizing pulses. Thus, the monostable multivibrator serves to eliminate the effect of equalizing pulses from the incoming synchronizing signals.

The $\overline{Q}$ output of monostable multivibrator 703, as shown in FIG. 10B, is reproduced in FIG. 11A. The negative transition in this $\overline{Q}$ output triggers monostable multivibrator 704 to produce a pulse $f_H$, as shown in FIG. 11B. It is appreciated that pulse $f_H$ has a repetition rate equal to the horizontal synchronizing rate, and exhibits a negative transition in time-coincidence with the negative transition in the incoming horizontal synchronizing pulse $S_h$. Thus, pulse $f_H$, having a duration shown in FIG. 11B, is produced at each incoming horizontal synchronizing pulse. This pulse $f_H$ resets flip-flop circuit 705 to produce the negative pulse $f_a$, as shown in FIG. 11G. More particularly, it it the negative transition in pulse $f_H$ which resets flip-flop circuit 705. Thus, pulse $f_a$ is produced at a predetermined time (i.e., the duration of pulse $f_H$) following the occurrence of an incoming horizontal synchronizing pulse $S_h$. Pulse $f_a$ is applied to input a of phase detector 706, and represents the time of occurrence of an incoming horizontal synchronizing pulse.

VCO 710 supplies timing pulses $12f_{sc}$ to frequency divider 712, the latter generating divided timing pulses $2f_{sc}$, as shown in FIG. 11C. These divided timing pulses are counted by counter 714 and, additionally, are used by synchronizing circuit 715 to produce a synchronized horizontal synchronizing pulse $f_{HS}$, as shown in FIG. 11D. The synchronized horizontal synchronizing pulse $f_{HS}$ is produced in response to the first negative transition is divided timing pulses $2f_{sc}$ following the occurrence of the horizontal synchronizing pulse $S_h$, and extends for a duration equal to one complete cycle of the divided timing pulse.

Counter 714 counts the divided timing pulses $2f_{sc}$ until a predetermined count is reached. When this predetermined count is attained, window generator 716 produces an output signal, as shown in FIG. 11E. This output signal is present until counter 714 reaches another, higher predetermined count, at which time the signal produced by window generator 716, designated the window pulse, terminates, as shown in FIG. 11E. It may be appreciated that the window pulse is present for a number of cycles of the divided timing pulse $2f_{sc}$, and normally recurs at a frequency equal to the horizontal synchronizing frequency. This window pulse is supplied to discriminator 717 to condition the discriminator to detect the synchronized horizontal synchronizing pulse $f_{HS}$.

In accordance with the example described herein, it is assumed that the incoming horizontal synchronizing pulse $S_H$ falls within the pull-in range of the illustrated AFC section. Consequently, the synchronized horizontal synchronizing pulse $f_{HS}$ is produced during the duration of the window pulse. This is shown by FIGS. 11D and 11E. Discriminator 717 detects the occurrence of the synchronized horizontal synchronizing pulse $f_{HS}$ during the duration of the window pulse to produce an output signal, for example, a binary "1" at its OK output. This means that a binary "0" is produced at the NG output of the discriminator. This binary "0+ is supplied to the clear input C of each of monostable multivibrator 704, flip-flop circuits 705 and 713 and counter 714, and has no effect thereon.

At some predetermined time following the termination of the window pulse, counter 714 is further incremented to yet another predetermined count, resulting in an output $f_h$ which is applied to the reset input of flip-flop circuit 713. As a consequence thereof, this flip-flop circuit is reset to supply the negative-going pulse $f_b$ to input b of phase detector 706, as shown in FIG. 11F. In the illustrated example, it is assumed that counter 714 reaches its predetermined count to produce pulse $f_h$ in advance of the termination of pulse $f_H$ by monostable multivibrator 704. Thus, as shown in FIGS. 11F and 11G, pulse $f_b$ leads pulse $f_a$ by some amount. Depending upon whether the frequency of pulses $f_a$ is greater than or less than the frequency of pulses $f_b$, an output pulse having a duration proportional to the phase differential between pulses $f_a$ and $f_b$ is provided either at output x or at output y of phase detector 706, as shown in FIG. 11H. This pulse duration is integrated by integrator 707, as shown by FIG. 11I, and the integrated voltage, which is an error voltage related to the phase differential between the timing pulses $12f_{sc}$ and the incoming horizontal synchronizing pulse $S_h$, is supplied through adjustable timing circuit 709 to VCO 710. This control voltage adjusts the frequency of the VCO in a direction whereby the phase differential between pulses $f_a$ and $f_b$ is cancelled.

At the next negative transition in the divided timing pulses $2f_{sc}$ following the resetting of flip-flop circuits 705 and 713, these flip-flop circuits are set, as shown in FIGS. 11G and 11F, respectively. The AFC section thus is prepared for a subsequent comparison of the timing of VCO 710 with the incoming horizontal synchronizing pulse. If the next horizontal synchronizing pulse $S_h$ falls within the pull-in range of the illustrated AFC section, that is, if the next horizontal synchronizing pulse occurs during the duration of the window pulse, another binary "1" is produced at the OK output of discriminator 717.

As each binary "1" is produced at the OK output of discriminator 717, it is counted by counter 720. When a count of, for example, fifteen is attained thereby, a binary "1" carry output is supplied to condition AND gate 721 to transmit the binary "1" which is produced at the OK output of discriminator 717 to monostable multivibrator 722. At the same time, this carry output inhibits counter 720 from being incremented further. AND gate 721 now is energized to trigger monostable multivibrator 722. The monostable multivibrator, when in its triggered or quasistable state, increases the time constant of adjustable time constant circuit 709. This means that transient variations in the error voltage produced by integrator 707 will not pass through the time constant circuit and, therefore, will not disturb the synchronized condition of VCO 710.

Monostable multivibrator 722 is retriggerable and has a time constant of about 150H. This means that if, because of an abrupt time base error, an incoming horizontal synchronizing pulse $S_h$ does not occur during the generated window pulse, resulting in a binary "1" at the NG output of discriminator 717, and further resulting in clearing counter 720, the time constant of adjustable time constant circuit 709 nevertheless remains at its relatively higher value for a duration of 150 line intervals. Consequently, the AFC section is provided with 150 line intervals in which to synchronize VCO 710 with the incoming horizontal synchronizing pulses. That is, during this 150 line interval, fifteen successive horizontal synchronizing pulses must occur during fifteen window pulses in order to retrigger monostable multivibrator 722. If resynchronization cannot be attained during this 150 line interval, the time constant of adjustable time constant circuit 709 is reduced to enable VCO 710 to follow rapidly changes in the error voltage produced by integrator 707.

Let it be assumed that the incoming horizontal synchronizing pulse $S_h$ occurs in advance of the window pulse, wherein pulse $f_H$ (FIG. 12B), which is initiated upon the occurrence of the incoming horizontal synchronizing pulse, precedes the expected window pulse shown in broken lines in FIG. 12E. At the first negative transition in the divided timing pulses $2f_{sc}$ following pulse $f_H$, synchronizing circuit 715 generates the synchronized horizontal synchronizing pulse $f_{HS}$, as shown in FIG. 12D. This synchronized horizontal synchronizing pulse is detected by discriminator 717 as occurring prior to the occurrence of the expected window pulse whereupon the discriminator generates a binary "1" pulse output as its NG output, as shown in FIG. 12F. This pulse output from discriminator 717 clears monostable multivibrator 704, as shown by the negative transition in pulse $f_H$ in FIG. 12B, and also clears flip-flop circuit 705 to reset this flip-flop circuit, whereby pulse $f_a$ is produced, as shown in FIG. 12G. Furthermore, the NG pulse produced by discriminator 717 clear flip-flop circuit 713, whereby pulse $f_b$ (FIG. 12H) is produced thereby, and counter 714 is cleared so as to reset the count thereof to an initial value.

Since flip-flop circuits 705 and 713 are cleared substantially simultaneously, pulses $f_a$ and $f_b$ are initiated at the same time. Thus, phase detector 706 detects no phase differential between the pulses $f_a$ and $f_b$; and integrator 707 does not change the value of the integrated error signal produced thereby. Consequently, the frequency of VCO 710 is not disturbed. This is preferred because, in the example assumed herein wherein the incoming horizontal synchronizing pulse is in advance of the window pulse, this occurrence of the horizontal synchronizing pulse is outside of the pull-in range of the illustrated AFC section.

Flip-flop circuits 705 and 713 remain cleared, or reset, for the duration of the NG pulse (FIG. 12F). After the termination of this NG pulse, flip-flop circuits 705 and 713 are returned to their set conditions in response to the first negative transition in the divided timing pulse $2f_{sc}$, as shown in FIGS. 12G and 12H, respectively.

If the incoming horizontal synchronizing pulse $S_h$ occurs at a time following the window pulse, it is appreciated that synchronized horizontal synchronizing pulse $f_{HS}$, as shown in FIG. 13D, is applied to discriminator 717 subsequent to the termination of the window pulse shown in FIG. 13E. Here again, discriminator 717 produces the NG pulse (FIG. 13G) which clears monostable multivibrator 704 so as to terminate pulse $f_H$ (FIG. 13B), and also clears flip-flop circuits 705 and 713 so as to initiate pulses $f_a$ and $f_b$ (FIGS. 13H and 13I). In addition, the NG pulse produced by discriminator 717 clears counter 714 to an initial count. At the completion of the NG pulse, flip-flop circuits 705 and 713 are enabled to respond to the next negative transition in the divided timing pulse $2f_{sc}$ so as to be set thereby, as shown in FIGS. 13H and 13I. Since pulses $f_a$ and $f_b$ are produced by the NG pulse in time coincidence, phase detector 706 does not detect any phase differential therebetween, and integrator 707 does not alter the integrated error signal supplied thereby to VCO 710.

It is preferred that if the window pulse is produced prior to the occurrence of the incoming horizontal synchronizing pulse $S_h$, the count of counter 714 is prevented from further incrementing its count until the NG pulse is produced so as to clear this counter. This prevents pulse $f_h$ from being produced by counter 714 which could reset flip-flop circuit 713 prior to the clearing thereof by the NG pulse. It is appreciated that if pulse $f_h$ is inhibited, then it would not be possible for pulse $f_b$ to occur in phase advance of pulse $f_a$. That is, counter 714 should be inhibited in the event tht the incoming horizontal synchronizing pulse $S_h$ is delayed beyond the window pulse so as to prevent a false phase differential in pulses $f_a$ and $f_b$ from being supplied to phase detector 706. To this effect, the negative transition in the window pulse is supplied to flip-flop circuit 719 so as to set this flip-flop circuit, as shown in FIG. 13F. Once set, flip-flop circuit 719 inhibits counter 714 from further incrementing its count. When synchronized horizontal synchronizing pulse $f_{HS}$ is initiated, monostable multivibrator 718 is triggered so as to clear, or reset, flip-flop circuit 719, as shown in FIG. 13F. It is seen that at the time that flip-flop circuit 719 is cleared, the NG pulses produced by discriminator 717 to clear counter 714.

Thus, the frequency of VCO 710 is not disturbed in the event that the incoming horizontal synchronizing pulse $S_h$ occurs at some time outside of the window pulse which is produced by window generator 716. That is, the frequency of the VCO is not varied in the event that the incoming horizontal synchronizing pulse falls outside of the pull-in range of the illustrated AFC section.

Although flip-flop circuit 719 is effective to inhibit counter 714 in response to the negative transition in the window pulse when the incoming horizontal synchronizing pulse $S_h$ occurs at some time following the window pulse, this flip-flop circuit is not so triggered in the event that the horizontal synchronizing pulse occurs during the duration of the window pulse. Referring to FIG. 11D, when synchronized horizontal synchronizing pulse $f_{HS}$ is produced, monostable multivibrator 718 is triggered. This monostable multivibrator has a time constant which is greater than the duration of the window pulse. Hence, even if the synchronized horizontal synchronizing pulse $f_{HS}$ is produced at about the same time that the window pulse is produced, monostable multivibrator 718 nevertheless will maintain flip-flop circuit 719 in its cleared state even when the window pulse terminates, as shown in FIG. 11E. This maintains the flip-flop circuit from being set in response to the negative transition in the window pulse. Consequently, flip-flop circuit 719 is prevented from applying an inhibit signal to counter 714, provided that the incoming horizontal synchronizing pulse $S_h$ occurs within the duration of the window pulse.

It should be appreciated that if the incoming horizontal synchronizing pulse occurs in advance of the expected window pulse, as shown by the waveforms of FIGS. 12A-12H, then it is not necessary to prevent flip-flop circuit 719 from being set in response to the negative transition in the window pulse. This is because discriminator 717 applies the NG pulse to clear counter 714 before the counter has had sufficient time to reach the predetermined count which initiates the window pulse. Since the counter is cleared, the window pulse never is produced.

Thus, it is seen that when VCO 710 is in substantial synchronization with the incoming horizontal synchronizing pulse $S_h$, that is, when this horizontal synchronizing pulse occurs during the duration of the window pulse, an OK pulse is produced by discriminator 717. After a predetermined number, for example, fifteen, of such OK pulses are produced, counter 720 enables AND gate 721 to gate the OK pulse to monostable multivibrator 722, whereupon the time constant of adjustable time constant circuit 709 is increased. This prevents the synchronized VCO from losing synchronization in response to transient disturbances, such as drop-out, guardband noise, and the like. That is, it is relatively more difficult for VCO 710 to become unlocked once this synchronized condition is attained.

Figure 14:
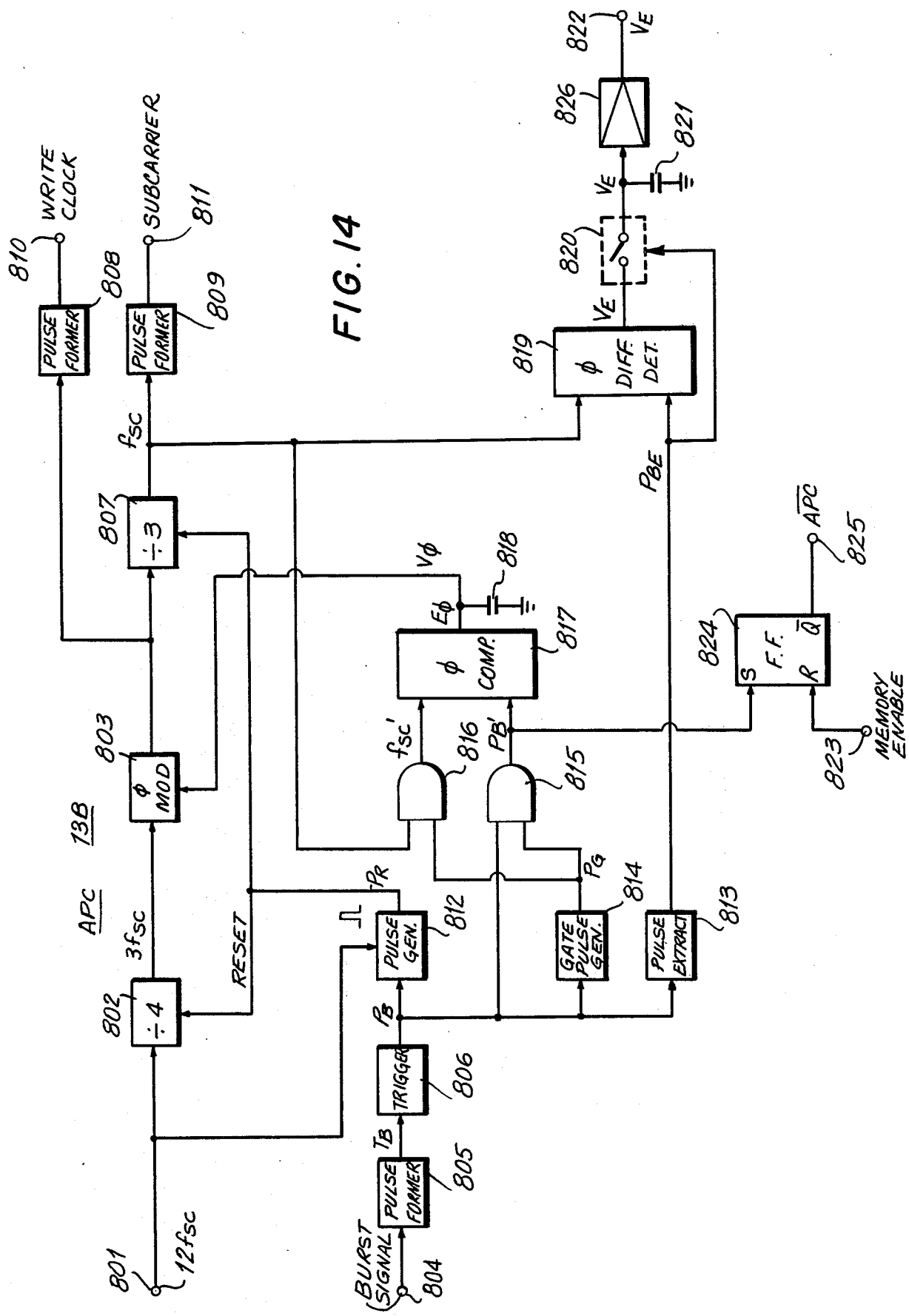
FIG. 14 is a block diagram of the automatic phase control circuitry incorporated into the write clock generator used in the illustrated time base error corrector.

The synchronized timing pulses $12f_{sc}$ produced by VCO 710 and applied to output terminal 711 of the AFC section are supplied to an input terminal 801 of the APC section which is illustrated in FIG. 14. The APC section includes a frequency divider 802, a phase modulator 803, another frequency divider 807, a pulse former 805, a trigger circuit 806, a gate pulse generator 814, AND gates 815 and 816 and a phase comparator 817. Frequency divider 802 is coupled to input terminal 801 and is adapted to divide the frequency of timing pulses $12f_{sc}$ by a factor of four. The output of divider 802 is coupled to phase modulator 803, this phase modulator being responsive to a control signal, such as a control voltage, applied thereto, for modulating the phase of divided timing pulses $3f_{sc}$. The output of phase modulator 803 is coupled to frequency divider 807 which is adapted to divide the frequency of the phase-modulated timing pulses by a factor of three. The output of divider 807 is coupled to a pulse forming circuit 809 which serves to shape the pulses $f_{sc}$, and also to AND gate 816.

Pulse forming circuit 805 is coupled to an input terminal 804 and is adapted to receive the burst signal $S_B$ separated from the incoming video signal by synchronizing separator 12 (FIG. 1) and to generate a trigger pulse $T_B$ in response to the received burst signal. The output of pulse forming circuit 805 is coupled to trigger circuit 806 which is responsive to trigger pulse $T_B$ to pass the received burst signal. The output of the trigger circuit is coupled to gate pulse generator 814 and, in addition, to an input of AND gate 815. Furthermore, the output of the trigger circuit also is coupled to a pulse generator 812, the latter having an input coupled to input terminal 801 for receiving the timing pulses $12f_{sc}$ and being adapted to generate a reset pulse $P_R$ having a duration equal to the duration of a timing pulse in response to a burst pulse which passes through trigger circuit 806. Pulse generator 812 has its output coupled in common to frequency dividers 802 and 807 to reset these frequency dividers.

Gate pulse generator 814 is adapted to generate a gating pulse of predetermined duration in response to the completion of a cycle of burst pulses which are supplied thereto by a trigger circuit 806. The output of the gate pulse generator is connected in common to AND gates 815 and 816 and serves to condition these AND gates to gate the respective signals which are supplied thereto by trigger circuit 806 and by frequency divider 807, respectively. AND gates 815 and 816 gate pulse signals to phase comparator 817 which is adapted to determine the phase differential between the pulses gated thereto by these AND gates. A pulse signal $E_\phi$ having a pulse duration determined by the phase differential between the pulses supplied to the phase comparator is generated thereby, this pulse duration signal being integrated by an integrating capacitor 818. The output of capacitor 818 is coupled as a phase modulating voltage $V_\phi$ to phase modulator 803.

The output of AND gate 815 additionally is coupled to the set input S of a flip-flop circuit 824. This flip-flop circuit has its reset input R coupled to an input terminal 823 to receive a MEMORY ENABLE signal produced by control unit 17 (FIG. 1). Whenever this flip-flop circuit admits of its reset state, the $\overline{Q}$ output thereof generates a signal which is supplied to an output terminal 825 as a $\overline{APC}$ signal. As will be explained below, the $\overline{APC}$ signal represents that an automatic phase control operation cannot be attained, that is, the divided timing pulses $3f_{sc}$ cannot be phase-locked to the incoming burst signal.

The operation of the APC section, thus far described, now will be explained with reference to the waveform diagrams shown in FIGS. 15A–15K. The timing pulses $12f_{sc}$ produced by VCO 710 (FIG. 9) are supplied to input terminal 801 and are divided by frequency divider 802, phase modulated by phase modulator 803 and further divided by frequency divider 807 to produce divided, phase-modulated pulses $f_{sc}$ of a frequency equal to the frequency of the incoming burst signal. The burst signal frequency $f_{sc}$ is, for example, 3.58 MHz.

Figure 15:
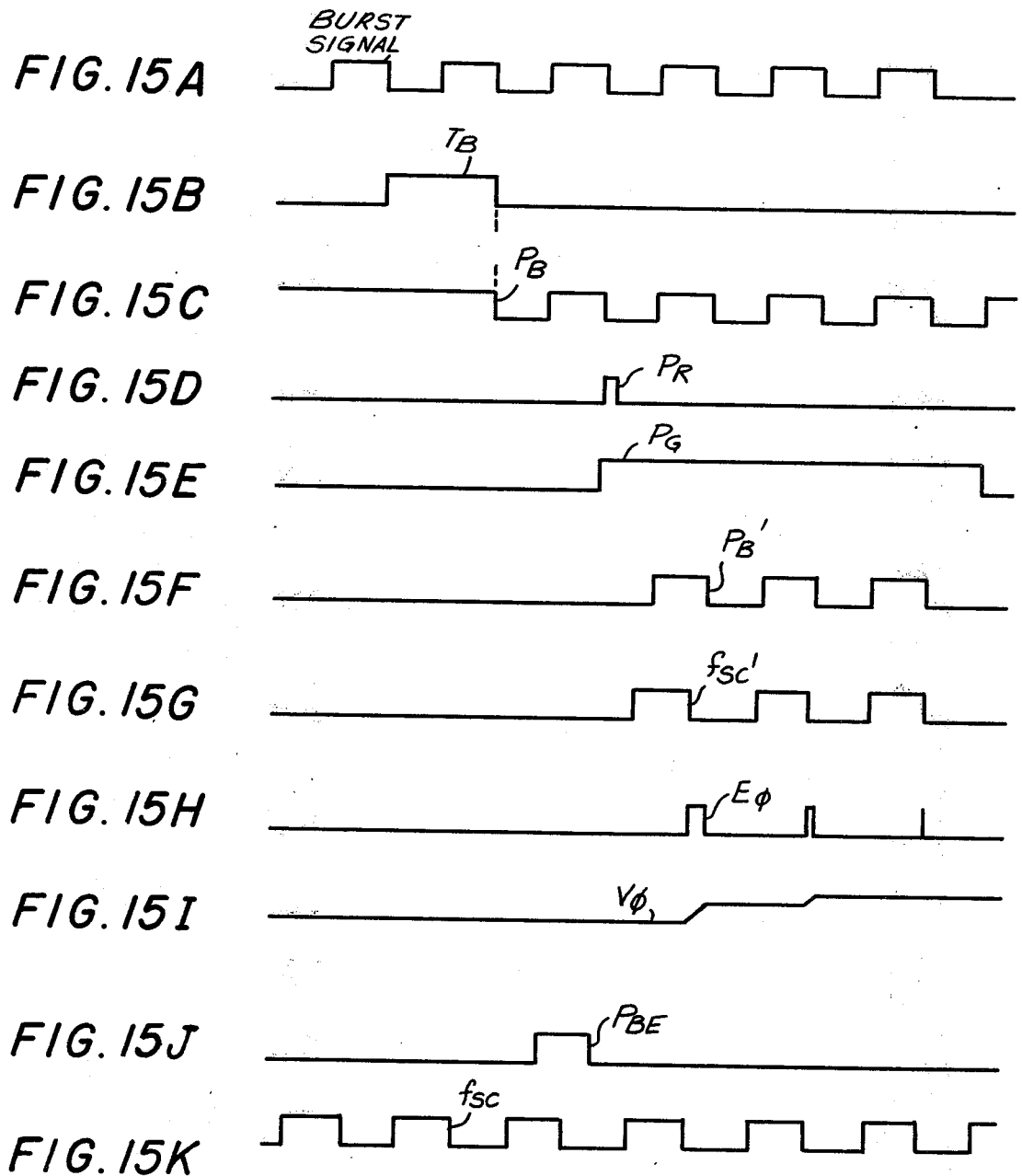
FIGS. 15A-15K are timing waveforms which are useful in understanding the operation of the circuit shown in FIG. 14.

The incoming burst signal $S_B$, which is separated from the incoming video signal by synchronizing separator 12 (FIG. 1) is as shown in FIG. 15A. As is conventional, the received burst signal consists of a few cycles, for example, about eight cycles in the NTSC system, of the chrominance subcarrier superimposed onto the back porch of each horizontal synchronizing signal. Thus, as shown in FIG. 15A, the received burst signal is a repetitive signal which occurs for a limited duration during each horizontal line interval. Pulse forming circuit 805 is responsive to the first negative transition in the received burst signal to generate a trigger pulse $T_B$, as shown in FIG. 15B. The pulse forming circuit may comprise a triggerable flip-flop circuit and gating circuit so as to produce only a single trigger pulse $T_B$ having a duration equal to the period of the burst signal during each horizontal line interval. The trigger pulse triggers, or "turns on" trigger circuit 806 in response to the negative transition in this trigger pulse, thereby enabling trigger circuit 806 to pass the received burst signal therethrough. Accordingly, trigger circuit 806 supplies burst pulses $P_B$, shown in FIG. 15C, to pulse generator 812, gate pulse generator 814 and AND gate 815.

The negative transition in burst pulses $P_B$ at the conclusion of the first complete cycle thereof is used in pulse generator 812 to gate a timing pulse $12f_{sc}$ as a reset pulse $P_R$ (FIG. 15D) to frequency dividers 802 and 807. This serves to reset the frequency dividers.

Gate pulse generator 814 is responsive to the negative transition in burst pulses $P_B$ following the completion of the first full cycle thereof to generate gate pulse $P_G$, as shown in FIG. 15E. Gate pulse generator 814 may include a monostable multivibrator. The gate pulse $P_G$ generated by gate pulse generator 814 conditions AND gates 815 and 816 to gate burst pulses $P_B$ and pulses $f_{sc}$ to phase comparator 817. The gated burst pulses $P_B'$, shown in FIG. 15F, are assumed to lag the gated pulses $f_{sc}'$. The latter pulses are derived from pulses $f_{sc}$, shown in FIG. 15K. Phase comparator 817 detects the phase lagging relationship between gated burst pulses $P_B'$ and gated pulses $f_{sc}'$ to produce an output pulse $E_\phi$ (FIG. 15H) whose duration is representative of this phase lagging relation. This error pulse $E_\phi$ produced by phase comparator 817 is integrated by integrating capacitor 818 to form an error voltage $V_\phi$ (FIG. 15I) which is used as a phase modulating control voltage by phase modulator 803. It is appreciated that, in the illustrated example, phase modulating voltage $V_\phi$ delays the phase of pulses $3f_{sc}$ produced by frequency divider 802 so as to reduce the phase differential between gated burst pulses $P_B'$ (FIG. 15F) and gated pulses $f_{sc}'$ (FIG. 15G). Phase control voltage $V_\phi$ continues to vary until the output of frequency divider 807 (FIG. 15K) is phase-locked to the received burst signal (FIG. 15A). At that time, the output of phase comparator 817 is zero, and a constant voltage $V_\phi$ is maintained across integrating capacitor 818.

Thus, pulses $f_{sc}$ are seen to be frequency-locked to the incoming horizontal synchronizing pulse $S_h$ and phase-locked to the incoming burst signal $S_B$. The synchronized pulses $f_{sc}$ are supplied through a pulse forming circuit 809 to an output terminal 811 for use as a SUB-CARRIER signal to be utilized by control unit 17, as described in greater detail with respect to FIG. 19. Also, it is appreciated that the output of phase modulator 803 is frequency- and phase-locked to the incoming horizontal and burst signals, respectively. The output of this phase modulator is shaped by a pulse forming circuit 808 and is supplied to an output terminal 810 for use as the write clock pulses by main memory 9, as described above with respect to FIG. 4.

During normal operation of the write clock generator and of control unit 17, a MEMORY ENABLE signal is produced, followed by gated burst pulses $P_B'$, followed by a WRITE START signal. Thus, flip-flop circuit 824 is reset by the MEMORY ENABLE signal to supply the $\overline{APC}$ to output terminal 825. However, prior to the occurrence of the WRITE START signal, a gated burst pulse $P_B'$ sets the flip-flop circuit to terminate the $\overline{APC}$ signal. In the event of, for example, drop-out wherein the burst signal is not supplied to input terminal 804, gated burst pulses $P_B'$ do not set flip-flop circuit 824 and, therefore, the $\overline{APC}$ signal remains at the time that the WRITE CLOCK signal is produced. Therefore, and with respect to FIG. 3, during normal operation, flip-flop circuit 209 remains reset. However, if an APC operation cannot be performed, the $\overline{APC}$ signal is supplied to flip-flop circuit 209 at the time that the WRITE START signal is produced, thereby setting this flip-flop circuit and triggering synchronizing circuit 211 to change over change-over switch 203, as described above.

FIG. 14 also illustrates the velocity error signal generator, which is comprised of a phase difference detector 819, a sample-and-hold circuit formed of sampling switch 820 and holding capacitor 821, and an output amplifier 826. Phase difference detector 819 has one input coupled to receive pulses $f_{sc}$ and another input coupled to a pulse extracting circuit 813. The pulse extracting circuit, which may comprise a gating circuit including a flip-flop circuit, is adapted to extract a single burst pulse $P_{BE}$ which passes through trigger circuit 806. THis extracted burst pulse $P_{BE}$ is coupled to phase difference detector 819 and, in addition, is used as the sampling signal to close sampling switch 820. The output of sampling switch 820 is coupled to capacitor 821 which, in turn, is coupled through output amplifier 826 to an output terminal 822.

In operation, the phase of extracted burst pulse $P_{BE}$ (FIG. 15J) is compared to the phase of a corresponding pulse $f_{sc}$ (FIG. 15K). It is appreciated that, sine the extracted burst pulse $P_{BE}$ occurs just prior to reset pulse $P_R$, dividers 802 and 807 are not yet reset. This means that the phase of pulse $f_{sc}$ is locked to the phase of the burst signal which had been received during the preceding line interval; but the phase of the extracted burst pulse $P_{BE}$ represents the phase of the presently received burst signal. Therefore, any phase difference between extracted burst pulse $P_{BE}$ and pulse $f_{sc}$ represents the phase drift of the incoming video signal over the entire preceding line interval. It is recalled that this phase difference represents the velocity error of the incoming video signal.

Phase difference detector 819 detects this phase difference between extracted burst pulse $P_{BE}$ and pulse $f_{sc}$ to produce a corresponding velocity error voltage $V_E$. This velocity error voltage is sampled by sampling switch 820 and stored across capacitor 821. This stored velocity error signal $V_E$ is supplied to output terminal 822, and thence to velocity error memory 14 (FIG. 1).

VELOCITY ERROR MEMORY 14

Figure 16:
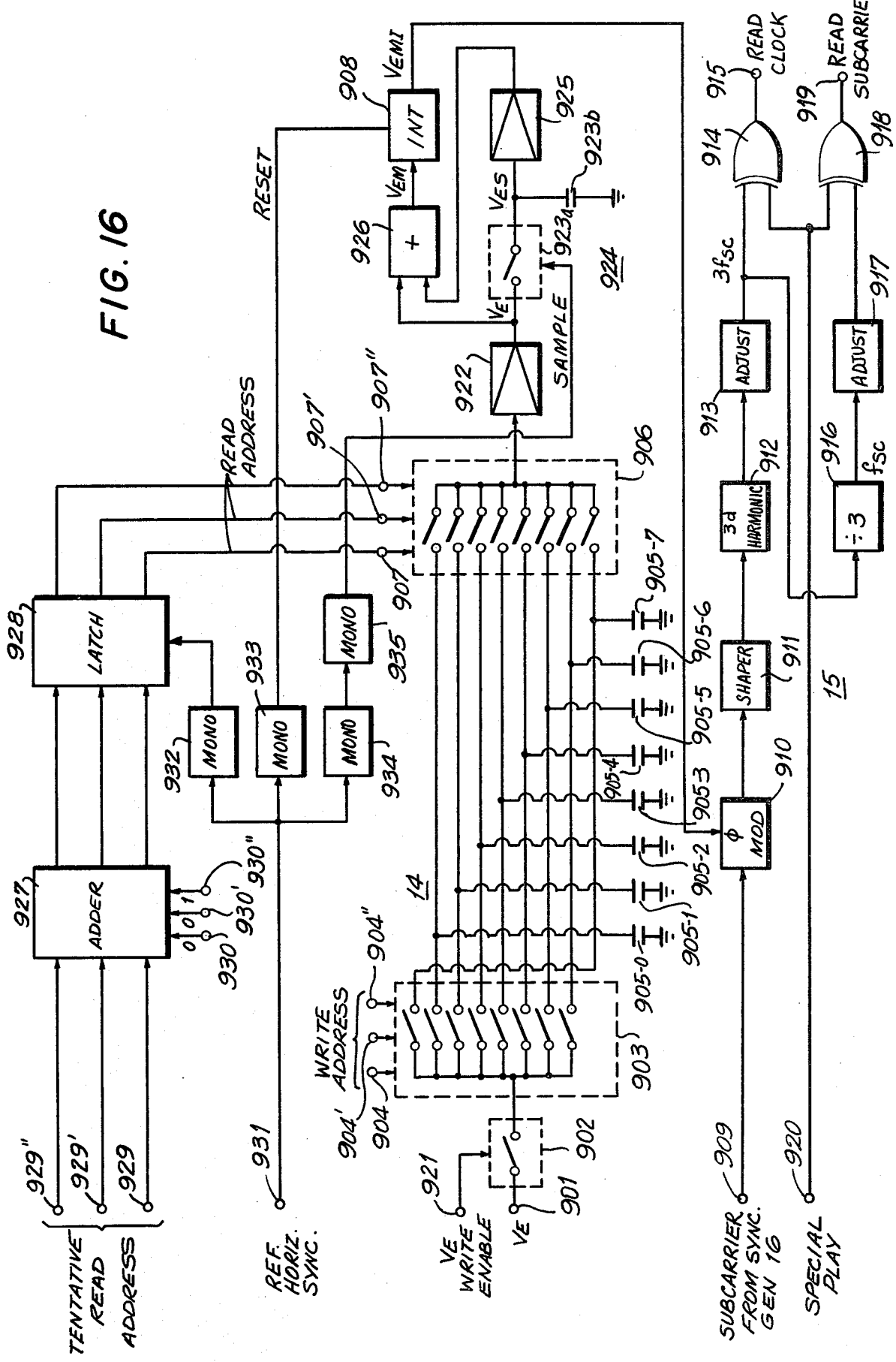
FIG. 16 is a circuit diagram of the velocity error memory and the read clock generator which are used in the illustrated time base error corrector.

The velocity error signal $V_E$, produced at output terminal 822 in FIG. 14, is supplied to the velocity error memory shown in FIG. 16. THe velocity error memory is comprised of a plurality of capacitors 905-0, 905:1, . . . . 905-7, a write-in circuit 903 and a read-out circuit 906. It is recalled that, in main memory 9, described in detail with respect to FIG. 4, each memory unit $M_0$-$M_3$ is capable of storing two lines of video signals. Thus, a total of eight lines of video signals can be stored. Each of capacitors 905-0 to 905-7 is adapted to store a velocity error signal $V_E$ which is associated with the line of video signals that is stored in a corresponding portion of memory units $M_0$-$M_3$. For example, capacitor 905-0 may be adapted to store the velocity error signal which is associated with the line of video signals that is stored in the first section of memory unit $M_0$, while capacitor 905-1 may be adapted to store the velocity error signal which is associated with the line of video signals that is stored in the second section of memory unit $M_0$. Similarly, capacitor 905-2 may be adapted to store the velocity error signal which is associated with the line of video signals that is stored in the first section of memory unit $M_1$, while capacitor 905-3 may be adapted to store the velocity error signal which is associated with the line of video signals that is stored in the second section of memory unit $M_1$. The remaining capacitors are similarly related to memory units $M_2$ and $M_3$.

An input terminal 901 is adapted to be supplied with the velocity error signal $V_E$ produced at output terminal 822 of the velocity error signal generator shown in FIG. 14. Input terminal 901 is coupled via switch 902 to write-in circuit 903. Switch 902 includes a control input coupled to input terminal 921 for receiving a velocity WRITE ENABLE signal which is generated by control unit 17 (FIG. 1).

Write-in circuit 903 is diagramatically represented herein as a plurality of switches, each switch being adapted to be closed in response to a respective 3-bit address supplied to the write-in circuit. Accordingly, write address inputs 904, 904' and 904" are provided to receive the 3-bit write-in address which is produced by control unit 17. Depending upon the particular address which is produced, a corresponding one of the write-in switches is closed. It is recalled that the velocity error signal $V_E$ is produced at the end of a line of video signals (or, more accurately, at the beginning of the next line of video signals). Accordingly, the write-in address which is supplied to address terminals 904, 904' and 904" actually may be the next successive address than the address which is supplid to the write address decoder 303, shown in FIG. 4. This insures that the velocity error signal which is received at input terminal 901 is stored in the correct capacitor which is associated with the line of video signals which already has been written into the main memory. For example, if the velocity error signal which is supplied to input terminal 901 is associated with line N, it is appreciated that, at the time that the velocity error signal is produced, line $N+1$ is written into the main memory. Therefore, the write-in address which is supplied to write address input terminals 904, 904' and 904" should be associated with the main memory storage location in which line N had been stored and not the storage location in which the presently received line $N+1$ is being stored.

Read-out circuit 906 is diagramatically represented as being similar to write-in circuit 903 and is shown as being comprised of a plurality of switches, each being coupled to a respective capacitor 904-0 to 904-7, and each being adapted to be closed in response to a particular 3-bit read-out address which is supplied to read address terminals 907, 907' and 907".

FIG. 16 also shows one embodiment of the velocity error signal modifying circuit in accordance with the present invention. This modifying circuit includes tentative read address terminals 929, 929' and 929" an adder circuit 927, a latch circuit 928, a sample-and-hold circuit 924, an adding circuit 926 and an integrating circuit 908. Adder circuit 927 includes one set of inputs coupled to tentative read address input terminals 929, 929' and 929", and another set of inputs coupled to input terminals 930, 930' and 930". The latter input terminals are adapted to be supplied with a fixed digital signal representing a count of one. As an example, these input terminals may be supplied with the binary notation 001. Adder circuit 927 is adapted to add the fixed amount 001 to the tentative read address which is supplied to input terminals 929, 929' and 929".

The output of adder circuit 927, which is appreciated as being equal to the tentative read address plus one, is coupled to latch circuit 928. The latch circuit includes a control input coupled to the output of a monostable multivibrator 932, this monostable multivibrator being connected to an input terminal 931 so as to be triggered in response to a reference horizontal synchronizing pulse which is generated by synchronizing generator 16

(FIG. 1). When monostable multivibrator 932 is triggered, latch circuit 928 latches, or stores, the output of adder circuit 927. The output of latch circuit 928 is utilized as the 3-bit read address, and is coupled to read address input terminals 907, 907′ and 907″. It is appreciated that the read address which is stored in latch circuit 928 determines the particular capacitor 905-0 to 905-7 which is accessed for reading out the velocity error $V_E$ stored thereon.

The output of read-out circuit 906 is coupled through an amplifier 902 to sample-and-hold circuit 924 which is comprised of a sampling switch 923a and a storage capacitor 923b. Switch 923a is adapted to be closed in response to a sampling signal generated by monostable multivibrators 934 and 935, connected in cascade between input terminal 931 and the sampling control input of sampling circuit 923a. The sum of the time constants of monostable multivibrators 934 and 935 is equal to an amount $\alpha + H/4$. The output of capacitor 923b is coupled via an amplifier 925 to one input of adding circuit 926. The outer input of this adding circuit is coupled to the output of amplifier 922 for receiving the velocity error signal $V_E$ which is read out from the storage capacitors by read-out circuit 906. The output of adding circuit 926 is coupled to integrator 908, this integrator being adapted to be reset in response to a reset pulse generated by monostable multivibrator 933, the latter monostable multivibrator being coupled to input terminal 931. Integrator 908 is adapted to produce an integrated modified velocity error signal $V_{EMI}$, which is used by read clock generator 15 to compensate velocity errors which are present in the original, incoming video signal which had been played back by the VTR.

Figure 17:
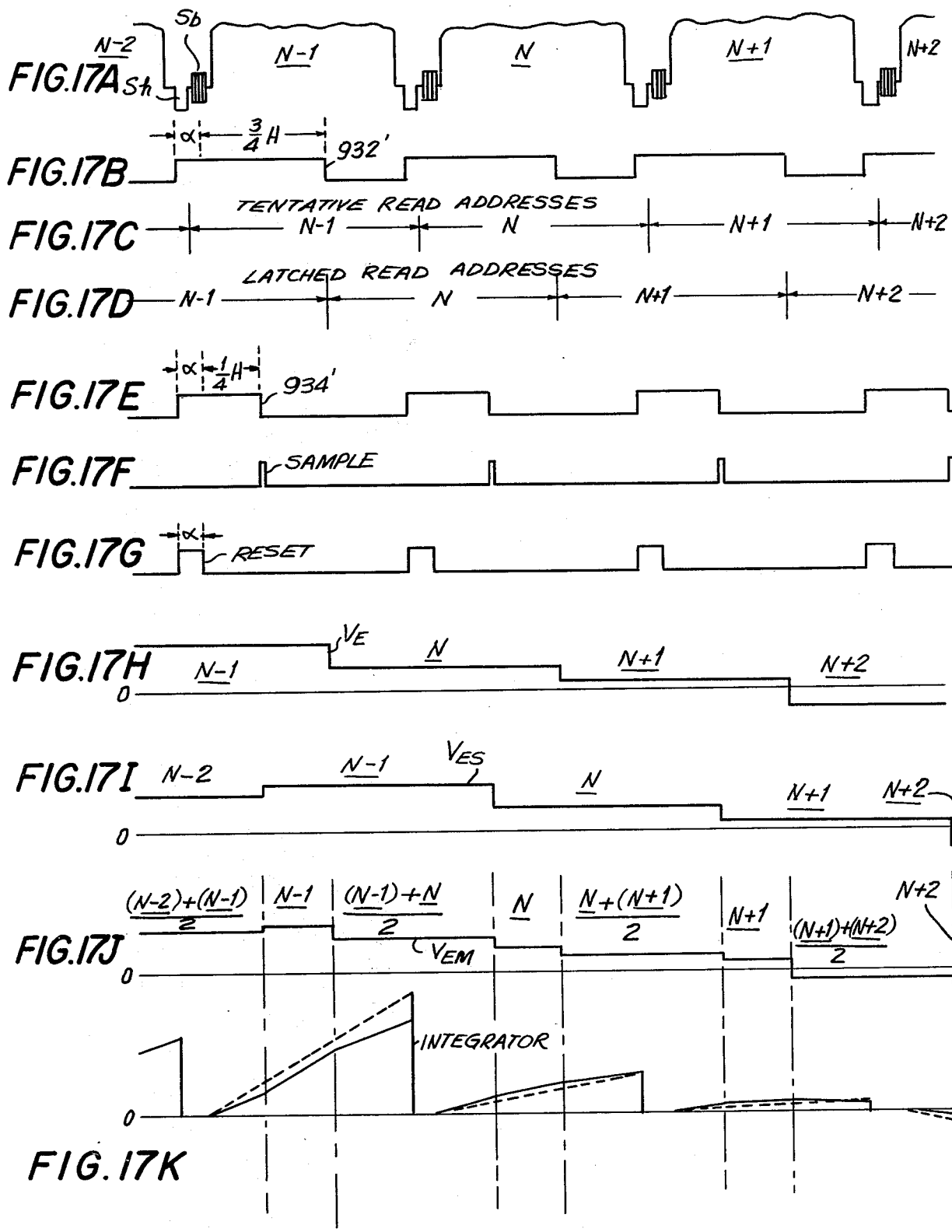
FIGS. 17A-17K are timing waveforms which are useful in understanding the operation of the velocity error signal generator shown in FIG. 16.

The manner in which the velocity error modifying circuit operates now will be described with reference to FIGS. 17A–17K. Let it be assumed that the output composite video signal which is read out from main memory 9, reconverted back into analog form by D/A converter and having the usual synchronizing signals reinserted therein is as illustrated in FIG. 17A. Three successive lines of video signals $N-1$, N and $N+1$ are illustrated, each line of video signals including the video signal information portion, the burst signal $s_b$ and the horizontal synchronizing pulse $s_h$. Let it be assumed that the interval from the commencement of the horizontal synchronizing pulse $s_h$ to about the middle of the burst signal $s_b$ is represented as $\alpha$. Accordingly, the duration H, which is equal to one horizontal line interval, extends between the termination of two successive horizontal synchronizing pulses.

Let it be assumed that control unit 17 generates a 3-bit tentative read address corresponding to line $N-1$, this line being stored in a particular location in main memory 9. This tentative read address is shown in FIG. 17C. Adder 927 adds the binary number 001 to the tentative read address supplied thereto by control unit 17 so as to increment the tentative read address by a count of one. Thus, the tentative read address corresponding to line $N-1$ is changed in adder 927 to the address corresponding to the next successive line N. The address for line N is stored in latch circuit 928.

Reference horizontal synchronizing pulses, corresponding to horizontal synchronizing pulses $s_h$ shown in FIG. 17A, are supplied to input terminal 931. The reference horizontal synchronizing pulse triggers monostable multivibrator 932 in response to the negative transition in this reference horizontal synchronizing pulse. Accordingly, monostable multivibrator 932 supplies a latching pulse having a duration equal to $\alpha + \frac{3}{4}H$, as shown in FIG. 17B. The negative transition in this latching pulse 932′ latches the incremented read address produced by adder 927 in latch circuit 928. Thus, the read address which is stored in latch circuit 928 is as illustrated in FIG. 17D. It is appreciated that this latched read address changes at each negative transition in latching pulse 932′, and that the latched read address which is stored in latch circuit 928 is equal to the tentative read address plus one and is stored at the beginning of the last quarter of each line interval.

The latched read address stored in latch circuit 928 is used to read out the velocity error signal from an addressed capacitor 905-0 to 905-7 by read out circuit 906. Thus, as shown in FIG. 17H, when the latched read address changes from an addressed capacitor associated with line $N-1$ to a capacitor associated with line N, the velocity error signal $V_E$ which is associated with line N is read out by read out circuit 906. Then, when the latched read address changes from a storage location associated with line N to a storage location associated with line $N+1$, the velocity error signal which is associated with line $N+1$ is read out by read out circuit 906. Further, when the latched read address changes from the storage location associated with line $N+1$ to a storage location associated with line $N+2$ (FIG. 17D), read out circuit 906 reads out the stored velocity error signal $V_E$ which is associated with line $N+2$ (FIG. 17H).

The read out velocity error signals (FIG. 17H) are supplied by amplifier 922 to sample-and-hold circuit 924. The combination of monostable multivibrators 934 and 935 is responsive to the reference horizontal synchronizing pulse $s_h$ for generating the sampling pulse which is applied to the sample-and-hold circuit. In particular, monostable multivibrator 934 is triggered by the reference horizontal synchronizing pulse to produce an output pulse 934′, shown in FIG. 17E, having a duration equal to $\alpha + \frac{1}{4}H$. Thus, it seen that the negative transition in pulse 934′ occurs at the completion of the first quarter of a horizontal line interval. Monostable multivibrator 935 is triggered by the negative transition in pulse 934′ so supply the sampling pulse (FIG. 17F) to sample-and-hold circuit 924. Thus, the velocity error signal $V_E$ which is supplied to the sample-and-hold circuit at the time that the sampling pulse is produced, that is, at the end of the first quarter of a line of video signals, is sampled and stored across capacitor 932b and is supplied therefrom to adding circuit 926 by amplifier 925. The sampled velocity error signal which is stored across capacitor 932b is illustrated in FIG. 17I. In particular, the waveform shown in FIG. 17I corresponds to successive samples of the waveform shown in FIG. 17H, these samples being derived at the sampling times established by the sampling pulses shown in FIG. 17F.

Adding circuit 926 adds the read out velocity error signal $V_E$ (FIG. 17H) with the sampled velocity error signal $V_{ES}$ (FIG. 17I) to produce a modified velocity error signal $V_{EM}$, as shown in FIG. 17J. This waveform will be considered with respect to the modified velocity error signal $V_{EM}$ which is produced in association with the reading out of line N. At the beginning of line N, that is, at the completion of the horizontal synchronizing pulse $S_h$, the velocity error signal $V_E$ which then is being read out of the storage capacitors is the velocity error signal associated with line N (FIG. 17H). At this same time, the velocity error signal which is stored across capacitor 932b is the sampled velocity error signal $V_{ES}$ which had been sampled by the previous sampling pulse shown in FIG. 17F. Thus, the stored velocity error signal sample $V_{ES}$ is associated with the preceding line $N-1$ (FIG. 17I). Thus, during the first quarter of the reading out of line N, adding circuit 926 adds the read out velocity error signal $V_E$, associated with line N, with the sampled velocity error signal $V_{ES}$, associated with the preceding line $N-1$. Furthermore, adding circuit 926 serves to average the read out and sampled velocity error signals which are supplied thereto. Thus, as shown in FIG. 17J, during the first quarter of line N, the modified velocity error signal $V_{EM}$ which is produced by adding circuit 926 is the average of the velocity error signal associated with line N and the velocity error signal associated with line $N-1$. As shown in FIG. 17J, this modified velocity error signal $V_{EM}$ which is produced during the first quarter of line N is equal to $\frac{1}{2}[(N-1)+N]$.

The next sampling pulse which is produced occurs at the end of the first quarter of line N, as shown in FIG. 17F. At this time, the velocity error signal $V_E$ which then is being read out of the storage capacitors, is associated with line N. This velocity error signal is sampled and stored across capacitor 932b as sampled velocity error signal $V_{ES}$ (FIG. 17I). Since the sampled velocity error signal now is associated with line N, and the read out velocity error signal also is associated with line N, adding circuit 926 produces the average of these signals which, as shown in FIG. 17J, is equal to N. This modified velocity error signal $V_{EM}$, which is produced as a function of the velocity error signal associated only with line N, exists for a duration equal to one-half of line N. That is, and as shown in FIG. 17J, the modified velocity error signal is present from the end of the first quarter of line N to the beginning of the third quarter of this line.

At the beginning of the third quarter of line N, the negative transition in pulse 932' produced by monostalbe multivibrator 932 triggers latch circuit 928 to store the next incremented address corresponding to line $N+1$, as shown in FIG. 17D. Consequently, at the beginning of the fourth quarter of line N, the velocity error signal associated with the next line $N+1$ is read out of the storage capacitors and is supplied as one input to adding circuit 926. Nevertheless, the sampled velocity error signal $V_{ES}$ at this time still is the velocity error signal associated with line N (FIG. 17I). Thus, adding circuit 926 averages the velocity error signal which associated with line $N+1$ and the velocity error signal which is associated with line N to produce the modified velocity error signal $V_{EM}$ which is represented in FIG. 17J as equal to $\frac{1}{2}[N+(N+1)]$.

Thus, in accordance with the velocity error signal modifying circuit described herein, the modified velocity error signal which is produced is equal to the average, or interpolated value of the velocity error signal associated with the presently read out line and the velocity error signal associated with the preceding line during the first quarter of the line interval; followed by the velocity error signal associated with the read out line during the next two quarters of the line interval; and followed by the average, or interpolated value, of the velocity error signals associated with the present and succeeding read out lines during the last quarter of the line interval. Hence, during the first and fourth quarters of a line of video signals, the velocity error signal which is produced therefor is an interpolated value based upon the velocity error signal associated with the present line and the velocity error signal associated with an adjacent line. Of course, the velocity error signal which is produced during the second and third quarters of the line of video signals may be thought of as being an interpolated value based upon the velocity error signals which are produced during the first and fourth quarters of that line.

The aforedescription of the manner in which the modified velocity error signal $V_{EM}$ is produced during the reading out of line N is the same for all other lines, as shown in FIG. 17J. This modified velocity error signal $V_{EM}$ is supplied to integrator 908 and is integrated thereby to form the integrated modified velocity error signal $V_{EMI}$, as shown in FIG. 17K. Since the velocity error which may be present during the interval that the horizontal synchronizing pulse and burst signal occur is cancelled by the APC section of the write clock generator shown in FIG. 14, there is no need to produce a velocity error signal during that interval. This interval is shown as $\alpha$ (FIG. 17B), and monostable multivibrator 933 generates a reset pulse (shown in FIG. 17G) having a duration equal to $\alpha$ in response to the reference horizontal synchronizing pulse. This reset pulse is supplied to integrator 908 to reset it to its quiescent state, for example, zero, during the interval $\alpha$ at which a velocity error signal is not needed. As shown in FIG. 17K, the integrated modified velocity error signal $V_{EMI}$ reaches its maximum level at the end of a line interval and then is reset to a zero value at the beginning of the next line interval. It also is appreciated that the integrated modified velocity error signal $V_{EMI}$ is formed of three separate sections: the first section being the velocity error signal which is produced during the first quarter of the read-out line of video signals, the second section being equal to the velocity error signal which is produced during the reading out of the second and third quarters of the line of video signals, and the third section being equal to the velocity error signal which is produced during the reading out of the fourth quarter of the line of video signals. As will be described, this integrated modified velocity error signal $V_{EMI}$, shown by the solid line in three sections in FIG. 17K, is used to compensate the velocity error by phase modulating the read clock pulses and the read subcarrier signal which are generated by read clock generator 15.

A comparison between the improved results which are attained by using the modified velocity error signal produced in accordance with the present invention and the velocity error signal which used by the prior art now will be described with respect to FIG. 18. The curve shown by the solid line in FIG. 8 is a graphical representation of the actual velocity error included in a video signal played back by a VTR. This velocity error signal is shown for lines $N-1$ and N, which extend between intervals $t_n-1$ and $t_n$, and between $t_n$ and $t_n+1$, respectively. The velocity error characteristic is further divided into half-sections, that is, sections equal to one-half of a line interval, these sections designated as $T'_{n-2}$, $T_{n-1}$, $T'_{n-1}$, $T_n$ and $T'_n$. Section $T'_{n-2}$ has its mid-point at time $t_{n-1}$, corresponding to point $P_{n-1}$ on the velocity error characteristic curve, while adjacent section $T_{n-1}$ has its mid-point corresponding to point $B_{n-1}$ on the velocity error characteristic curve. Similarly, section $T'_{n-1}$ has its mid-point occurring at time $t_n$ which corresponds to point $P_n$ on the velocity error characteristic curve, while section $t_n$ has its mid-point corresponding to point $B_n$ on the velocity error characteristic curve. Finally, section $T'_n$ has its mid-point corresponding to time $t_{n+1}$, or point $P_{n+1}$, on the velocity error characteristic curve.

The velocity error characteristic may be mathetmatically expressed as F(t). Hence, the velocity error which is associated with line N−1 is the velocity error from time $t_{n-1}$ to time $t_n$, which is equal to the slope of curve F(t) during this interval. This slope is expressed as the difference between F(t) at times $t_n$ and $t_{n-1}$, divided by the line interval H. Stated otherwise, the velocity error function associated with line N−1 may be expressed as $$\frac{F(t_n) - F(t_{n-1})}{H} \quad (a)$$

Similarly, the velocity error function which is associated with line N may be expressed as $$\frac{F(t_{n+1}) - F(t_n)}{H} \quad (b)$$

Point $B_{n-1}$ on curve F(t) is at the mid-point of line N−1. Similarly, point $B_n$ is at the mid-point of line N. The slope of curve F(t) at these respective mid-points will be assumed to be the velocity error function associated with lines N−1 and N. Accordingly, the velocity error function at point $B_{n-1}$ is the average F'(t) of the velocity error function of the line N−1; and the velocity error function at point $B_n$ is the average F'(t) of the velocity error associated with line N. Since the velocity error at point $B_{n-1}$ is assumed to be equal to the velocity error associated with the entire line N−1, this velocity error function may be expressed as:

$$F'(\frac{t_{n-1} + t_n}{2}) \approx \frac{F(t_n) - F(t_{n-1})}{H}. \quad (1)$$

Similarly, the velocity error at point $B_n$, which is assumed to be equal to the velocity error associated with the entire line N, may be expressed as:

$$F'(\frac{t_n + t_{n+1}}{2}) \approx \frac{F(t_{n+1}) - F(t_n)}{H}. \quad (2)$$

Equations (1) and (2) are the prior art assumptions wherein the velocity error associated with line N−1 is assumed to be equal to the slope of a straight line drawn between points $P_{n-1}$ and $P_n$; while the velocity error associated with line N has been assumed by the prior art to be equal to the slope at point $B_n$ which is equal to the slope of a straight line drawn between point $P_n$ and $P_{n+1}$. These prior art velocity error characteristics which are expressed by equations (1) and (2) above, that is, the assumption that the velocity error is a linear, or straight line function, is represented by the dashed lines shown in FIG. 17K. In FIG. 18, the assumed linear velocity error characteristics are shown by the straight lines drawn between points $P_{n-1}$ and $P_n$, and between points $P_n$ and $P_{n+1}$. The deviation between these straight lines and the actual non-linear velocity error characteristic F(t) is the error which is inherent in prior art velocity error compensating techniques.

Figure 18:
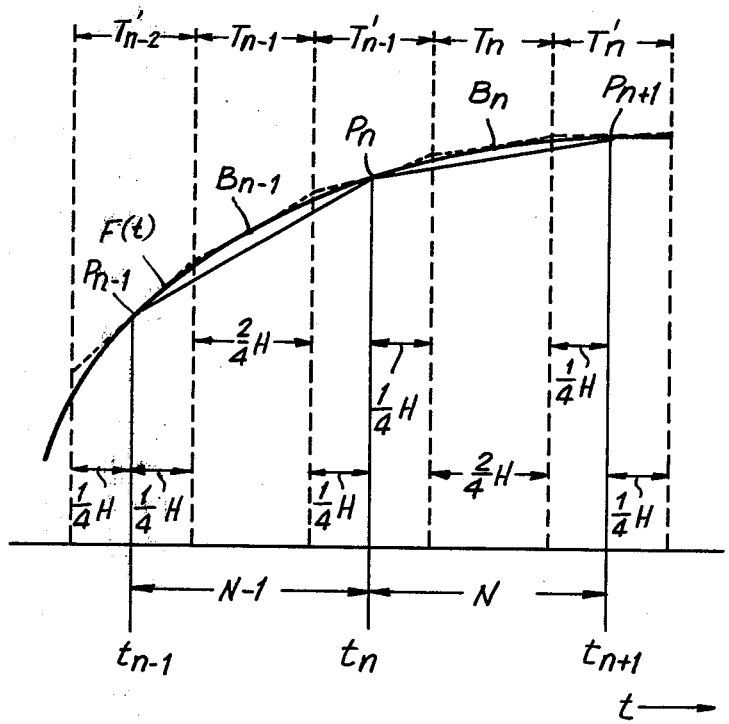
FIG. 18 is a graphical representation of the manner in which the non-linear velocity error is approximated by the present invention.

In accordance with the present invention, the non-linear velocity error characteristic F(t) is approximated by the dashed lines shown in FIG. 18. Each dashed line has a slope which is equal to the slope of a tangent to the curve F(t) at respective points $P_{n-1}$, $B_{n-1}$, $P_n$, $B_n$ and $P_{n+1}$. These points of tangency are seen to be the mid-points of each ¼H section.

The slope of a tangent to curve F(t) at point $P_n$ is equal to the slope of a straight line drawn between points $P_{n-1}$ and $P_{n+1}$. Hence, the approximated velocity error F'($t_n$) at point $P_n$ may be expressed as:

$$F'(t) \approx \frac{F(t_{n+1}) - F(t_{n-1})}{2H} \quad (3)$$

$$\approx \frac{F(t_n) - F(t_{n-1}) + F(t_{n+1}) - F(t_n)}{2H}. \quad (4)$$

Now, substituting equations (1) and (2) into equation (4) results in:

$$F'(t) \approx \frac{1}{2} [F'(\frac{t_n + t_{n+1}}{2}) + F'(\frac{t_{n-1} + t_n}{2})]. \quad (5)$$

The slope of the tangent to curve F(t) at point $B_{n-1}$, shown by the dashed line in FIG. 18, as expressed as:

$$\frac{F(t_n) - F(t_{n-1})}{H} \quad (a)$$

Similarly, the slope of the tangent to curve F(t) at point $B_n$ may be expressed as:

$$\frac{F(t_{n+1}) - F(t_n)}{H} \quad (b)$$

Therefore, it is appreciated that curve F(t) can be closely approximated by the respective straight lines which are drawn in sections $T_{n-1}$, $T'_{n-1}$ and $T_n$, respectively. These straight lines have slopes which may be expressed by the following equations:

$$F'(T_{n-1}) = \frac{F(t_n) - F(t_{n-1})}{H} \quad (6)$$

$$F'(T'_{n-1}) = \frac{1}{2} [\frac{F(t_n) - F(t_{n-1})}{H} + \frac{F(t_{n+1}) - F(t_n)}{H}] \quad (7)$$

$$F'(T_n) = \frac{F(t_{n+1}) - F(t_n)}{H}. \quad (8)$$

Similar equations can be derived for the straight lines which are drawn in sections $T'_{n-2}$ and $T'_n$, shown in FIG. 18. It may be appreciated that the approximated velocity error signal F'(t) which associated with line N is equal to a portion (¼H) of the slope of the line which is tangent to point $P_n$ in section $T'_{n-1}$, followed by the slope of the line which is tangent to point $B_n$ in section $T_n$ (of ½H duration), followed by a portion (¼H) of the slope of the line which is tangent to point $P_{n+1}$ during section $T_n$. These three line segments, shown by the dashed lines in FIG. 18, are close approximations of the actual velocity error function F(t) from time $t_n$ to time $t_{n+1}$, and these three segments are represented by the corresponding three segments shown in FIG. 17K as the integrated modified velocity error signal $V_{EMI}$. The velocity error signal represented by these three segments is seen to be a closer approximation of the actual velocity error function F(t) than is the prior art velocity error signal which is represented by the dashed lines shown in FIG. 17K.

It has been assumed that each line of video signals is divided into a beginning section, a middle section and an end section; and the velocity error signal of each section is a close approximation of the actual velocity error function. The approximated velocity error function for each section is seen to be an interpolated value based upon the velocity error function of adjacent sections. if desired, each line interval can be divided into still further sections with the velocity error function of each such section being a close linear approximation of the actual velocity error function F(t).

READ CLOCK GENERATOR 15

Returning to FIG. 16, a block diagram of one embodiment of read clock generator 15 is illustrated as comprising phase modulator 910, shaping circuit 911, harmonic generator 912, frequency divider 916 and exclusive-OR gates 914 and 918. Phase modulator 910 is coupled to an input terminal 909 to receive a subcarrier which is generated by synchronizing signal generator 16. The phase modulator is adapted to modulate the phase of this subcarrier with the integrated modified velocity error signal $V_{EMI}$ produced by integrator 908 and shown in FIG. 17K. Thus, the phase of the generated subcarrier is modulated in accordance with the velocity error signal so as to cancel, or compensate, the velocity error which is present in the incoming video signal which had been played back by the VTR.

The phase-modulated subcarrier produced by phase modulator 910 is supplied to shaping circuit 911 which is adapted to shape the phase-modulated subcarrier into a pulse signal having a duty cycle of 50%. It is appreciated that such a pulse signal has a fundamental frequency $f_{sc}$ equal to the subcarrier frequency, and also includes odd harmonics thereof. Harmonic extracting circuit 912 is coupled to shapng circuit 911 and is adapted to extract the third harmonic from the shaping circuit. As an example, harmonic extracting circuit 912 may comprise a band-pass filter capable of extracting a signal whose frequency is equal to 3 $f_{sc}$. This extracted signal, which is the third harmonic of the chrominance subcarrier, is shaped by adjusting circuit 913 to form a pulse signal having a duty cycle of 50% and a frequency equal to 3 $f_{sc}$. This shaped pulse signal is supplied to exclusive-OR gate 914 and, in addition, to frequency divider 916. The frequency of this frequency divider, which is equal to the frequency of the chrominance subcarrier $f_{sc}$, is supplied to another adjusting circuit 917 which, in turn, supplies a pulse signal having a duty cycle of 50% and a frequency equal to the chrominance subcarrier frequency $f_{sc}$ to exclusive-OR gate 918.

Exclusive-OR gates 914 and 918 include additional inputs which are connected in common to an input terminal 920. Input terminal 920 is adapted to receive a SPECIAL signal in the event that the VTR is operated in one of its SPECIAL playback modes. It may be appreciated that exclusive-OR gates 914 and 918 essentially invert the polarity of the read clock and read subcarrier signals which are produced thereby and supplied to output terminals 915 and 918, respectively. The read clock signals, which are phase modulated to compensate for velocity errors, are used to address main memory 9 and to read out digitized video signals therefrom. The read subcarrier signals, which also is phase modulated by the velocity error signal to compensate for velocity errors in the incoming video signal, is used to read out the digitized video signals from the main memory.

CONTROL UNIT 17

Figure 19:
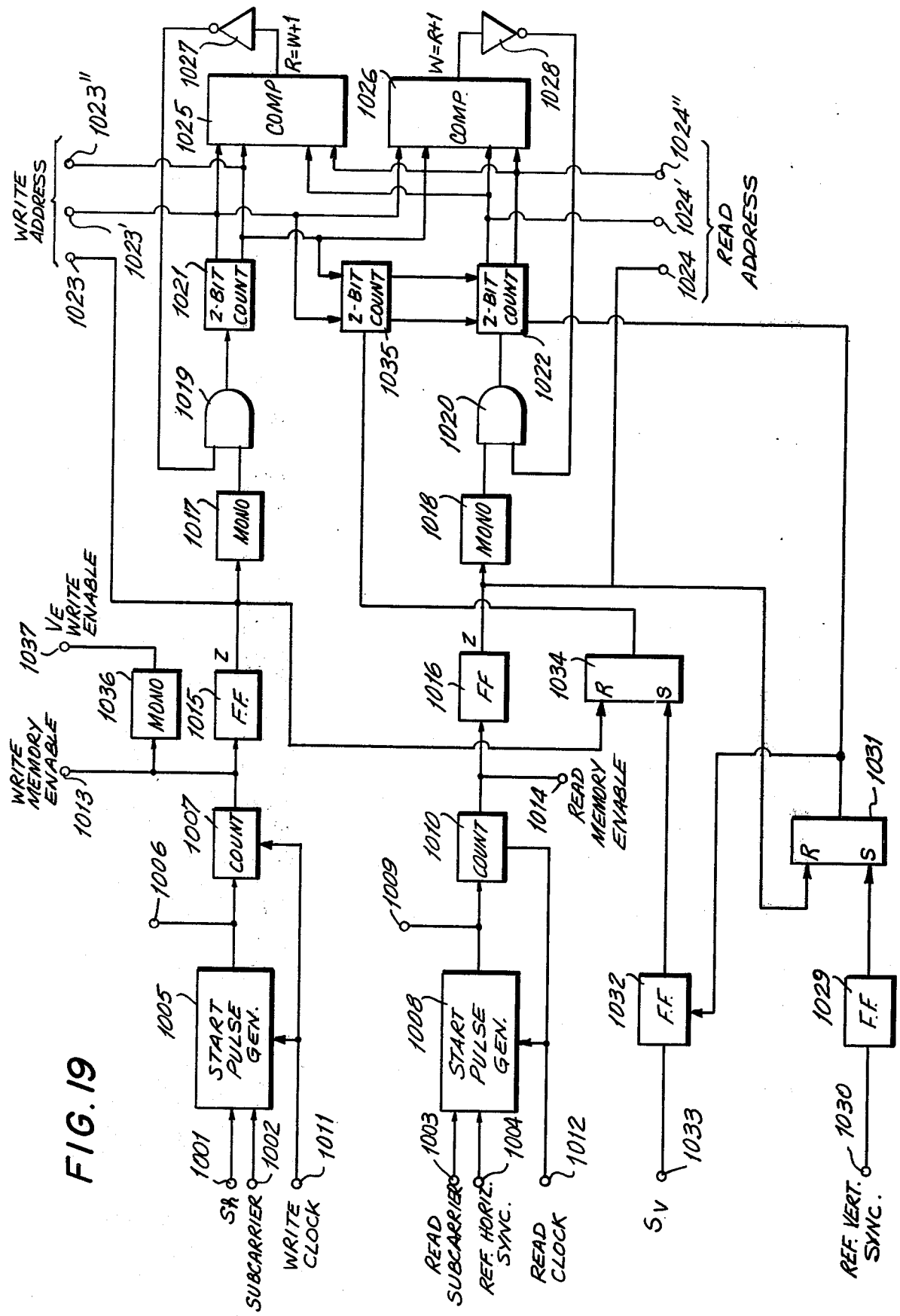
FIG. 19 is a block diagram of the control circuit used in the illustrated time base error corrector.

Referring now to FIG. 19, control unit 17 is shown as being comprised of a write control section and a read control section. The write control section is comprised of a start pulse generator 1005, a counter 1007, a flip-flop circuit 1015, a monostable multivibrator 1017 and a 2-bit counter 1021. Start pulse generator 1005, which may comprise a gating circuit, includes inputs coupled to input terminals 1001 and 1002 which receive the horizontal synchronizing pulse $s_h$ from the synchronizing separator shown in FIG. 8 and the subcarrier signal produced by the APC section of the write clock generator shown in FIG. 14, respectively. The start pulse generator additionally is coupled to an input terminal 1011 which receives the write clock signal produced by the APC section shown in FIG. 14. In response to the horizontal synchronizing pulse, the subcarrier and the write clock signal, start pulse generator 1005 is adapted to produce a write start signal at a predetermined time following the reception of the imcoming horizontal synchronizing pulse.

The output of start pulse generator 1005, which can be derived at output terminal 1006, is coupled to counter 1007. The counter, which is activated in response to the write start signal produced by the start pulse generator, is adapted to count write clock pulses until a predetermined count is attained. For example, if each line of video signals is digitized as 640 samples, each sample being formed of eight bits, then counter 1007 is adapted to count 8×640 write clock pulses. The output of counter 1007 is coupled to a flip-flop circuit 1015 which is adapted to divide the frequency of the output of counter 1007 by a factor of two. To this effect, flip-flop circuit 1015 may comprise a conventional T-type, or timing input, flip-flop circuit.

The output of flip-flop circuit 1015 is used to trigger a monostable multivibrator 1017, the output of which being connected through an AND gate 1019 to 2-bit counter 1021. Counter 1021 is adapted to count the output pulses produced by monostable multivibrator 1017, and comprises a two stage counter for providing a 2-bit address. The output of counter 1021 is derived at output terminals 1023' and 1023", and additionally is coupled to a comparator 1025. This 2-bit address produced by counter 1021 is used as the write address and is supplied to write address decoder 303 described hereinabove with respect to FIG. 4. It may be appreciated that this 2-bit address is changed for every other output pulse produced by counter 1007. This means that the 2-bit address is changed at alternate line intervals in the incoming video signal. Of course, counter 1007 produces an output pulse at the beginning of each line interval, and the state of flip-flop circuit 1015 thus is changed at each line interval. Hence, the combination of the output of flip-flop circuit 1015 and the output of counter 1021 all of which are provided at output terminals 1023, 1023' and 1023", constitute a 3-bit write address which is used by write-in circuit 903 in velocity error memory 14 (FIG. 16).

The output of counter 1007 additionally is coupled to a monostable multivibrator 1036 which generates a velocity error write enable signal at output terminal 1037. It is this velocity error write enable signal which is used to close write-in switch 902 in velocity error memory 14, shown in FIG. 16.

The read address section shown in FIG. 19 is of similar construction as the write address section and includes a start pulse generator 1008, a counter 1010, a flip-flop circuit 1016, an AND gate 1020 and a 2-bit counter 1022. Start pulse generator 1008, which may be similar to start pulse generator 1005, is coupled to an input terminal 1003 to receive the read subcarrier produced by read clock generator 15 (FIG. 16) and another input coupled to input terminal 1004 to receive the reference horizontal synchronizating pulse produced by synchronizing signal generator 16. In addition, the start pulse generator is coupled to an output terminal 1012 to receive the read clock pulses which are produced by the read clock generator shown in FIG. 16.

Start pulse generator 1008 is adapted to produce a read start signal at a predetermined time following the occurrence of the reference horizontal synchronizing pulse. The read start signal is derived at output terminal 1009 and, in addition, is used to activate counter 1010. This counter is coupled to receive the read clock pulses supplied to input terminal 1012 and is adapted to produce an output pulse when a predetermined count is attained. Consistent with counter 1007, counter 1010 is adapted to produce an output pulse, shown as a read memory enable pulse, when 640 read clock pulses have been counted. That is, the read memory enable pulse is produced at the beginning of a read-out operation for reading out a line of video signals from main memory 9.

Counter 1010 is coupled to flip-flop circuit 1016, which may comprise a T-type flip-flop circuit, adapted to divide the frequency of the read memory enable pulses by a factor of two. That is, the state of the flip-flop circuit changes in response to each read memory enable pulse. The output of flip-flop circuit 1016 is coupled to monostable multivibrator 1018 for triggering the latter. The pulse produced by this monostable multivibrator is coupled through AND gate 1020 to 2-bit counter 1022. The output of this 2-bit counter is coupled to output terminals 1024' and 1024", respectively, and constitutes the 2-bit read-out address which is supplied to the read decoder shown in FIG. 4. Similar to the 2-bit address produced by 2-bit counter 1021, the 2-bit read address changes after each two lines of video signals are read out from the main memory.

The output of flip-flop circuit 1016 additionally is coupled to an output terminal 1024 and comprises the least significant bit in a 3-bit read address. It may be appreciated that this 3-bit address at output terminals 1024, 1024' and 1024" is supplied to adder circuit 927 shown in FIG. 16 and is used for establishing the tentative read address for reading out an appropriate velocity error signal.

The output of 2-bit counter 1022 also is coupled to comparator 1026 and, furthermore, to comparator 1025. Comparator 1025 is adapted to compare the 2-bit write-in address produced by counter 1021 with the 2-bit read-out address produced by counter 1022. Similarly, comparator 1026, which is connected to receive the 2-bit output of counter 1021, is adapted to compare the 2-bit write-in address with the 2-bit read-out address, the latter being produced by counter 1022. In the event that the read-out address is equal to the write-in address plus one (R=W+1), there is the possibility that, when counter 1021 is incremented, it may address for a write-in operation the very same memory unit which then is being addressed for a read-out operation. To prevent this possibility, comparator 1025 produces a binary "1" when the read-out address is equal to the write-in address plus one. This binary "1" is inverted by an inverter 1027 and supplied as a binary "0" to disable AND gate 1019. This prevents counter 1021 from being incremented, and thus prevents this counter from generating the very same address as the read-out address counter 1022.

Similarly, comparator 1026 is adapted to detect when the write-in 2-bit address is equal to the read-out 2-bit address plus one. When this condition is detected, comparator 1026 produces a binary "1" which is inverted by inverter 1028 to disable AND gate 1020. This prevents counter 1022 from being incremented to the very same count which then is being produced by counter 1021. Hence, comparator 1026 prevents the read-out address from being incremented to be equal to the write-in address. As a consequence of comparators 1025 and 1026, a common memory unit in main memory 9 cannot be simultaneously addressed for a write-in and a read-out operation.

Since the write address section and the read address section of control unit 17, as shown in FIG. 19, are of substantially similar construction, only the operation of the write address section will be described with reference to FIGS. 20A–20F. It is recalled that start pulse generator 1005, which is supplied with the incoming horizontal synchronizing pulse $S_h$ (FIG. 20A), generates a write start signal at a predetermined time following the occurrence of this horizontal synchronizing pulse, in accordance with the subcarrier and write clock pulses which are supplied thereto. This write start pulse is shown in FIG. 20B, and is used to activate counter 1007 to count successive write clock pulses. When counter 1007 attains a count of 640, the WRITE MEMORY ENABLE pulse, shown in FIG. 20C, is produced. This pulse is shown as a negative pulse and continues until the next write start pulse is produced. Thus, during the positive duration of the illustrated WRITE MEMORY ENABLE pulse, main memory 9 can be addressed for a write-in operation which can then be performed.

At the negative transition in the WRITE MEMORY ENABLE pulse, that is, when counter 1007 attains a count of 640, flip-flop circuit 1015 is triggered to change state, as shown in FIG. 20D. Thus, it is appreciated that flip-flop circuit 1015 assumes its first state during one line interval, its second state during the next line interval, and so on. When the output of this flip-flop circuit undergoes a negative transition, monostable multivibrator 1017 is triggered to produce the pulse 1017' shown in FIG. 20E. It is this pulse which is gated through AND gate 1019 to increment the count of 2-bit counter 1021. As shown in FIG. 20E, 2-bit counter 1021 is incremented at every other, or alternate, line interval. The contents of 2-bit counter 1021, which serve as the write-in address, are shown in FIG. 20F. Of course, in the event that comparator 1025 produces a binary "1", AND gate 1019 is disabled to prevent a pulse 1017' from incrementing the count of 2bit counter 1021.

The illustrated control unit shown in FIG. 19 additionally includes R-S flip-flop circuits 1031 and 1034, timing-pulse controlled flip-flop circuits 1029 and 1032 and a 2-bit memory 1035. Timing-pulse controlled flip-flop circuit 1029 has its input coupled to an input terminal 1030 for receiving the reference vertical synchronizing signal produced by synchronizing signal generator 16. This flip-flop circuit is adapted to divide the frequency of the generated reference vertical synchronizing signal by a factor of two, and to apply this frequency-divided signal to the set input S of R-S flip-flop 1031. The reset input R of R-S flip-flop 1030 is coupled to the output of flip-flop circuit 1016 and is adapted to receive a signal therefrom whose frequency is equal to one-half the frequency of the reference horizontal synchronizing signal.

Of similar construction is timing-pulse controlled flip-flop circuit 1032 whose input is coupled to an input terminal 1033 for receiving the incoming, separated vertical synchronizing signal from synchronizing separator 12. The output of flip-flop circuit 1032 is a frequency-divided signal whose frequency is equal to one-half the frequency of the incoming vertical synchronizing signal. This frequency-divided signal is coupled to the set input S of R-S flip-flop 1034. The reset input R of this R-S flip-flop is coupled to the output of flip-flop circuit 1015 for receiving a periodic pulse signal whose frequency is equal to one-half the frequency of the incoming horizontal synchronizing pulse, as shown in FIG. 20D. The output of R-S flip-flop 1034 is coupled to 2-bit memory 1035 and is adapted to gate into this 2-bit memory the 2-bit write-in address which then is being produced by counter 1021. The output of R-S flip-flop 1031 is coupled to counter 1022 for energizing this counter to receive the contents of 2-bit memory 1035, the output of which memory is coupled to the counter. In addition, the output of R-S flip-flop 1031 is coupled to a clear input of flip-flop circuit 1032.

In operation, flip-flop circuit 1031 is set in response to every alternate reference vertical synchronizing pulse, and is reset in response to the output of flip-flop circuit 1016 which follows this vertical synchronizing pulse. Hence, the output of R-S flip-flop 1031 is a pulse whose duration is about one horizontal line interval, and this pulse occurs in synchronism with every other reference vertical synchronizing pulse. Similarly, R-S flip-flop 1034 is set in response to each alternate incoming vertical synchronizing pulse, and is reset in response to the output of flip-flop circuit 1015. Accordingly, R-S flip-flop 1034 produces an output pulse whose duration is about one horizontal line interval, which pulse is generated in synchronism with the incoming vertical synchronizing pulse.

The pulse produced by R-S flip-flop 1034 gates the address then being produced by counter 1021 into 2-bit memory 1035. Upon the subsequent occurrence of the pulse produced by R-S flip-flop 1031, the contents of the 2-bit memory are gated into counter 1022 and used therein as a read-out address. Thus, the write-in address which is produced at the time that an incoming vertical synchronizing signal is received is used as the read-out address at the time that the reference vertical synchronizing signal is received. It may be appreciated that this properly determines the vertical positioning of the video signal which is derived at the output of the time base error correcting apparatus to be in alignment with the vertical position of the video signal which is played back from the VTR. That is, at the beginning of each frame of a corrected video signal, the same address location in main memory 9 is read out as was written in at the start of that frame for the incoming video signal. Hence, and with respect to a displayed television picture, the top (or bottom) of that picture is properly positioned in the vertical direction.

While the present invention has been particularly shown and described with reference to a preferred embodiment thereof, it should be readily apparent to those of ordinary skill in the art that various changes and modifications in form and details can be made without departing from the spirit and scope of the invention. It is intended that the appended claims be interpreted as including all such changes and modifications.

What is claimed is:

1. Velocity error control apparatus for use in a video signal time base corrector of the type including a main memory having addressable storage locations for storing successive lines of video signals, write-in means including a write-in clock signal generator synchronized with time base errors in said video signal for writing successive lines of video signals into addressed storage locations at a write-in clock rate, and read-out means including a controllable read-out clock signal generator for reading out successive lines of video signals from addressed storage locations at a substantially constant read-out clock rate, said velocity error control apparatus comprising:

velocity error detecting means for detecting velocity errors in successive lines of said video signals written into said main memory;

velocity error storage means having a plurality of storage locations, each being operative to store a signal representing the velocity error of an associated line of video signals;

velocity error read-out means for reading out from said velocity error storage means the velocity error signal associated with a line of video signals when said associated line of video signals is read out from said main memory;

modifying means for modifying said read out velocity error signal with the velocity error signal associated with at least one adjacent line of video signals, said modifying means including means for defining a plurality of sections of a read out line of video signals and interpolating means for combining said read out velocity error signal with the velocity error signal associated with said at least one adjacent line of video signals to produce interpolated velocity error signals for respective ones of said sections of said read out line; and modulating means for modulating the read-out clock signals with said modified velocity error signal to compensate for the velocity errors in successive lines of said video signals.

2. The apparatus of claim 1 wherein said means for defining defines beginning, middle and end sections of a read out line of video signals; and said interpolating means combines the velocity error signals associated with said read out line and the immediately preceding line of video signals to produce an interpolated velocity error signal for said beginning section, combines the velocity error signals associated with said read out line and the next following line of video signals to produce an interpolated velocity error signal for said end section, and uses the velocity error signal associated with said read out line of video signals to produce an interpolated velocity error signal for said middle section.

3. The apparatus of claim 2 wherein said interpolating means comprises averaging means for averaging the combined velocity error signals.

4. The apparatus of claim 3 wherein said means for defining comprises switch means for defining a beginning section of about one-fourth of a line of video signals, a middle section of about two-fourths of a line of video signals and an end section of about one-fourth of a line of video signals, said switch means supplying to said averaging means the velocity error signals associated with said read out line of video signals and said immediately preceding line of video signals during said beginning section, the velocity error signal associated only with said read out line of video signals during said middle section, and the velocity error signals associated with said read out line of video signals and said next following line of video signals during said end section.

5. The apparatus of claim 4 wherein said modifying means further comprises integrating means coupled to said averaging means for integrating the averaged velocity error signals during said beginning, middle and end sections.

6. The apparatus of claim 5 wherein said modulating means comprises phase modulating means for modulating the phase of said read-out clock signals with said integrated, averaged velocity error signals.

7. Velocity error control apparatus for use in a video signal time base corrector of the type including a main memory having addressable storage locations for storing successive lines of video signals, write-in means including write-in address generating means for selecting a write-in address in said main memory and a write-in clock signal generator synchronized with time base errors in said video signal for writing successive lines of video signals into addressed storage locations at a write-in clock rate, and read-out means including read-out address generating means for selecting a read-out address in said main memory and a controllable read-out clock signal generator for reading out successive lines of video signals from addressed storage locations at a substantially constant read-out clock rate, said velocity error control apparatus comprising:

velocity error detecting means for detecting the velocity error in each line of video signals written into said main memory;

velocity error storage means having addressable storage locations corresponding to the addressable storage locations in said main memory to store a velocity error signal therein associated with a line of video signals, said velocity error signal representing the velocity error in said associated line of video signals;

velocity error address means for generating, when the end section of a line of video signals is read out, the address of a velocity error storage location corresponding to the address of a storage location in said main memory from which the next line of video signals will be read;

velocity error read-out means responsive to the address generated by said velocity error address means for reading out from said velocity error storage means the velocity error signal associated with said next line of video signals, said velocity error signal being read out from the time that said end section of a line of video signals is being read out until the time that the end section of the next line of video signals is read out;

sampling means for sampling the velocity error signal read out from said velocity error storage means following the reading out of a beginning section of a line of video signals from said main memory and for storing the sampled velocity error signal for a line interval;

combining means for combining the velocity error signal read out from said velocity error storage means and the sampled velocity error signal to produce a modified velocity error signal which is a function of the sampled velocity error signal associated with the previously read out line of video signals and the read out velocity error signal associated with the presently read out line of video signals during said beginning section of the presently read out line of video signals, a function of the sampled velocity error signal associated with the presently read out line of video signals and the read out velocity error signal associated with the presently read out line of video signals during a middle section of the presently read out line of video signals, and a function of the sampled velocity error signal associated with the presently read out line of video signals and the read out velocity error signal associated with the next read out line of video signals during said end section of the presently read out line of video signals; and modulating means for modulating the read-out clock signals with said modified velocity error signal to compensate for the velocity errors in successive lines of said video signals.

8. The apparatus of claim 7 wherein said combining means comprises averaging means for averaging the velocity error signal read out from said velocity error storage means and said sampled velocity error signal.

9. The apparatus of claim 8 wherein said combining means further comprises integrating means for integrating said modified velocity error signal.

10. The apparatus of claim 9 wherein said modulating means comprises phase modulating means responsive to the integrated modified velocity error signal for phase modulating said read-out clock signals.

11. The apparatus of claim 7 wherein said addressable storage locations in said velocity error storage means are individually selectable capacitor means for storing analog levels.

* * * * *